US012760212B2

(12) United States Patent
Bauer et al.

(10) Patent No.: US 12,760,212 B2
(45) Date of Patent: Oct. 13, 2026

(54) ABRASIVE ARTICLE INCLUDING SHAPED ABRASIVE PARTICLES

(71) Applicant: SAINT-GOBAIN CERAMICS & PLASTICS, INC., Worcester, MA (US)

(72) Inventors: Ralph Bauer, Niagara Falls (CA); Jennifer H. Czerepinski, Framingham, MA (US); Lucie Fraichard, Boston, MA (US); Flavien Fremy, Belmont, MA (US); Jun Jia, Newton, MA (US); Frederic Josseaux, Marseilles (FR); David F Louapre, Paris (FR); Samuel S. Marlin, Plan d'Orgon (FR); Doruk O. Yener, Bedford, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 238 days.

(21) Appl. No.: 17/130,051

(22) Filed: Dec. 22, 2020

(65) Prior Publication Data

US 2021/0108117 A1 Apr. 15, 2021

Related U.S. Application Data

(63) Continuation of application No. 16/900,732, filed on Jun. 12, 2020, now Pat. No. 11,879,087, which is a (Continued)

(51) Int. Cl.

*B01J 2/00* (2006.01)
*B01J 2/20* (2006.01)

(Continued)

(52) U.S. Cl.

CPC .............. *C09K 3/1409* (2013.01); *B24D 3/00* (2013.01); *C04B 35/1115* (2013.01); *B01J 2/006* (2013.01);

(Continued)

(58) Field of Classification Search

CPC ...... C09K 3/1409; C09K 3/1436; C09K 3/14; B01J 2/006; B01J 2/20; B24D 11/00;

(Continued)

(56) References Cited

U.S. PATENT DOCUMENTS 345,604 A 7/1886 Semper
1,910,444 A 5/1933 Nicholson (Continued)

FOREIGN PATENT DOCUMENTS

CA 743715 A 10/1966
CA 2423788 A1 7/2002

(Continued)

OTHER PUBLICATIONS

Maplesoft. Triangles: Interior and Exterior Angles [retrieved from the internet on Oct. 17, 2025 from <URL:https://www.maplesoft.com/support/help/maple/view.aspx?path=MathApps%2FTrianglesInteriorAndExteriorAngles>]. (Year: 2021).*

(Continued)

*Primary Examiner* — Marites A Guino-O Uzzle
(74) *Attorney, Agent, or Firm* — Abel Schillinger, LLP; Jermaine Lawrence

(57) ABSTRACT

A shaped abrasive particle including a body having a first major surface, a second major surface, and a side surface joined to the first major surface and the second major surface, and the body has at least one partial cut extending from the side surface into the interior of the body.

12 Claims, 21 Drawing Sheets

Related U.S. Application Data continuation of application No. 15/178,121, filed on Jun. 9, 2016, now Pat. No. 10,711,171.

(60) Provisional application No. 62/174,304, filed on Jun. 11, 2015.

(51) Int. Cl.
*B24D 3/00* (2006.01)
*B24D 11/00* (2006.01)
*C04B 35/111* (2006.01)
*C09K 3/14* (2006.01)

(52) U.S. Cl.
CPC ................ *B01J 2/20* (2013.01); *B24D 11/00* (2013.01); *B24D 2203/00* (2013.01); *C04B 2235/3208* (2013.01); *C09K 3/1436* (2013.01)

(58) Field of Classification Search
CPC ... B24D 2203/00; B24D 3/00; C04B 35/1115; C04B 2235/3208; C04B 35/10; C04B 35/111
See application file for complete search history.

(56) References Cited

U.S. PATENT DOCUMENTS

| | | | |
|---|---|---|---|
| 2,033,991 | A | 3/1936 | Melton et al. |
| 2,036,903 | A | 4/1936 | Webster |
| 2,049,874 | A | 8/1936 | Sherk |
| 2,148,400 | A | 2/1939 | Crompton, Jr. |
| 2,248,064 | A | 7/1941 | Carlton et al. |
| 2,248,990 | A | 7/1941 | Heany |
| 2,290,877 | A | 7/1942 | Heany |
| 2,318,360 | A | 5/1943 | Benner et al. |
| 2,376,343 | A | 5/1945 | Carlton |
| 2,563,650 | A | 8/1951 | Heinemann |
| 2,880,080 | A | 3/1959 | Rankin et al. |
| 3,041,156 | A | 6/1962 | Rowse et al. |
| 3,067,551 | A | 12/1962 | Maginnis |
| 3,079,242 | A | 2/1963 | Glasgow |
| 3,079,243 | A | 2/1963 | Ueltz |
| 3,123,948 | A | 3/1964 | Kistler et al. |
| 3,141,271 | A | 7/1964 | Fischer et al. |
| 3,276,852 | A | 10/1966 | Lemelson |
| 3,377,660 | A | 4/1968 | Marshall et al. |
| 3,379,543 | A | 4/1968 | Norwalk |
| 3,387,957 | A | 6/1968 | Howard |
| 3,454,385 | A | 7/1969 | Amero |
| 3,477,180 | A | 11/1969 | Robertson, Jr. et al. |
| 3,480,395 | A | 11/1969 | McMullen et al. |
| 3,481,723 | A | 12/1969 | Kistler et al. |
| 3,491,492 | A | 1/1970 | Ueltz |
| 3,495,359 | A | 2/1970 | Smith et al. |
| 3,536,005 | A | 10/1970 | Derrickson |
| 3,590,799 | A | 7/1971 | Guuchowicz |
| 3,608,050 | A | 9/1971 | Carman et al. |
| 3,608,134 | A | 9/1971 | Cook |
| 3,615,308 | A | 10/1971 | Amero |
| 3,619,151 | A | 11/1971 | Sheets, Jr. et al. |
| 3,637,360 | A | 1/1972 | Ueltz |
| 3,670,467 | A | 6/1972 | Walker |
| 3,672,934 | A | 6/1972 | Larry |
| 3,808,747 | A | 5/1974 | Kenagy |
| 3,819,785 | A | 6/1974 | Argyle et al. |
| 3,859,407 | A | 1/1975 | Blanding et al. |
| 3,874,856 | A | 4/1975 | Leeds |
| 3,909,991 | A | 10/1975 | Coes, Jr. |
| 3,940,276 | A | 2/1976 | Wilson |
| 3,950,148 | A | 4/1976 | Fukuda et al. |
| 3,960,577 | A | 6/1976 | Prochazka |
| 3,977,132 | A | 8/1976 | Sekigawa |
| 3,986,885 | A | 10/1976 | Lankard |
| 3,991,527 | A | 11/1976 | Maran |
| 4,004,934 | A | 1/1977 | Prochazka |
| 4,037,367 | A | 7/1977 | Kruse |
| 4,045,919 | A | 9/1977 | Moritomo |
| 4,055,451 | A | 10/1977 | Cockbain et al. |
| 4,073,096 | A | 2/1978 | Ueltz et al. |
| 4,114,322 | A | 9/1978 | Greenspan |
| 4,150,078 | A | 4/1979 | Miller et al. |
| 4,194,887 | A | 3/1980 | Ueltz et al. |
| 4,252,544 | A | 2/1981 | Takahashi |
| 4,261,706 | A | 4/1981 | Blanding et al. |
| 4,286,905 | A | 9/1981 | Samanta |
| 4,304,576 | A | 12/1981 | Hattori et al. |
| 4,314,827 | A | 2/1982 | Leitheiser et al. |
| 4,341,663 | A | 7/1982 | Derleth et al. |
| 4,393,021 | A | 7/1983 | Eisenberg et al. |
| 4,452,911 | A | 6/1984 | Eccles et al. |
| 4,457,767 | A | 7/1984 | Poon et al. |
| 4,469,758 | A | 9/1984 | Scott |
| 4,505,720 | A | 3/1985 | Gabor et al. |
| 4,541,842 | A | 9/1985 | Rostoker |
| 4,548,617 | A | 10/1985 | Miyatani et al. |
| 4,570,048 | A | 2/1986 | Poole |
| 4,618,349 | A | 10/1986 | Hashimoto et al. |
| 4,623,364 | A | 11/1986 | Cottringer et al. |
| 4,656,330 | A | 4/1987 | Poole |
| 4,657,754 | A | 4/1987 | Bauer et al. |
| 4,659,341 | A | 4/1987 | Ludwig et al. |
| 4,678,560 | A | 7/1987 | Stole et al. |
| 4,711,750 | A | 12/1987 | Scott |
| 4,728,043 | A | 3/1988 | Ersdal et al. |
| 4,744,802 | A | 5/1988 | Schwabel |
| 4,770,671 | A | 9/1988 | Monroe |
| 4,786,292 | A | 11/1988 | Janz et al. |
| 4,797,139 | A | 1/1989 | Bauer |
| 4,797,269 | A | 1/1989 | Bauer et al. |
| 4,799,939 | A | 1/1989 | Bloecher et al. |
| 4,829,027 | A | 5/1989 | Cutler et al. |
| 4,832,706 | A | 5/1989 | Yates |
| 4,848,041 | A | 7/1989 | Kruschke |
| 4,858,527 | A | 8/1989 | Masanao |
| 4,863,573 | A | 9/1989 | Moore et al. |
| 4,876,226 | A | 10/1989 | Fuentes |
| 4,881,951 | A | 11/1989 | Wood et al. |
| 4,917,852 | A | 4/1990 | Poole et al. |
| 4,918,116 | A | 4/1990 | Gardziella et al. |
| 4,925,457 | A | 5/1990 | DeKok et al. |
| 4,925,815 | A | 5/1990 | Tani et al. |
| 4,930,266 | A | 6/1990 | Calhoun et al. |
| 4,942,011 | A | 7/1990 | Bolt et al. |
| 4,954,462 | A | 9/1990 | Wood |
| 4,960,441 | A | 10/1990 | Pellow et al. |
| 4,961,757 | A | 10/1990 | Rhodes et al. |
| 4,963,012 | A | 10/1990 | Tracy et al. |
| 4,964,883 | A | 10/1990 | Morris et al. |
| 4,970,057 | A | 11/1990 | Willkens et al. |
| 4,997,461 | A | 3/1991 | Markhoff-Matheny et al. |
| 5,000,760 | A | 3/1991 | Ohtsubo et al. |
| 5,008,222 | A | 4/1991 | Kameda |
| 5,009,675 | A | 4/1991 | Kunz et al. |
| 5,009,676 | A | 4/1991 | Rue et al. |
| 5,011,508 | A | 4/1991 | Wald et al. |
| 5,011,510 | A | 4/1991 | Hayakawa et al. |
| 5,014,468 | A | 5/1991 | Ravipati et al. |
| 5,024,795 | A | 6/1991 | Kennedy et al. |
| 5,032,304 | A | 7/1991 | Toyota |
| 5,035,723 | A | 7/1991 | Kalinowski et al. |
| 5,035,724 | A | 7/1991 | Pukari et al. |
| 5,042,991 | A | 8/1991 | Kunz et al. |
| 5,049,165 | A | 9/1991 | Tselesin |
| 5,049,166 | A | 9/1991 | Kirkendall |
| 5,049,645 | A | 9/1991 | Nagaoka et al. |
| 5,053,367 | A | 10/1991 | Newkirk et al. |
| 5,053,369 | A | 10/1991 | Winkler et al. |
| 5,076,991 | A | 12/1991 | Poole et al. |
| 5,078,753 | A | 1/1992 | Broberg et al. |
| 5,081,082 | A | 1/1992 | Hai-Doo et al. |
| 5,085,671 | A | 2/1992 | Martin et al. |
| 5,090,968 | A | 2/1992 | Pellow |
| 5,094,986 | A | 3/1992 | Matsumoto et al. |
| 5,098,740 | A | 3/1992 | Tewari |

(56) References Cited

U.S. PATENT DOCUMENTS 5,103,598 A 4/1992 Kelly
5,108,963 A 4/1992 Fu et al.
5,114,438 A 5/1992 Leatherman et al.
5,120,327 A 6/1992 Dennis
5,123,935 A 6/1992 Kanamaru et al.
5,129,919 A 7/1992 Kalinowski et al.
5,131,926 A 7/1992 Rostoker et al.
5,132,984 A 7/1992 Simpson
5,139,978 A 8/1992 Wood
5,152,917 A 10/1992 Pieper et al.
5,160,509 A 11/1992 Carman et al.
5,164,744 A 11/1992 Yoshida et al.
5,173,457 A 12/1992 Shorthouse
5,178,849 A 1/1993 Bauer
5,180,630 A 1/1993 Giglia
5,185,012 A 2/1993 Kelly
5,185,299 A 2/1993 Wood et al.
5,190,568 A 3/1993 Tselesin
5,194,072 A 3/1993 Rue et al.
5,201,916 A 4/1993 Berg et al.
5,203,886 A 4/1993 Sheldon et al.
5,213,591 A 5/1993 Celikkaya et al.
5,215,552 A 6/1993 Sung
5,219,462 A 6/1993 Bruxvoort et al.
5,219,806 A 6/1993 Wood
5,221,294 A 6/1993 Carman et al.
5,224,970 A 7/1993 Harakawa et al.
5,227,104 A 7/1993 Bauer
5,244,477 A 9/1993 Rue et al.
5,244,849 A 9/1993 Roy et al.
5,273,558 A 12/1993 Nelson et al.
5,277,702 A 1/1994 Thibault et al.
5,282,875 A 2/1994 Wood
5,288,297 A 2/1994 Ringwood
5,300,130 A 4/1994 Rostoker
5,304,331 A 4/1994 Leonard et al.
5,312,789 A 5/1994 Wood
5,312,791 A 5/1994 Coblenz et al.
5,314,513 A 5/1994 Miller et al.
5,366,523 A 11/1994 Rowenhorst et al.
5,366,525 A 11/1994 Fujiyama
5,372,620 A 12/1994 Rowse et al.
5,373,786 A 12/1994 Umaba
5,376,598 A 12/1994 Preedy et al.
5,376,602 A 12/1994 Nilsen
5,383,945 A 1/1995 Cottringer et al.
5,395,407 A 3/1995 Cottringer et al.
5,409,645 A 4/1995 Torre, Jr. et al.
5,429,648 A 7/1995 Wu
5,431,967 A 7/1995 Manthiram
5,435,816 A 7/1995 Spurgeon et al.
5,437,754 A 8/1995 Calhoun
5,441,549 A 8/1995 Helmin
5,443,603 A 8/1995 Kirkendall
5,447,894 A 9/1995 Yasuoka et al.
5,453,106 A 9/1995 Roberts
5,454,844 A 10/1995 Hibbard et al.
5,470,806 A 11/1995 Krstic et al.
5,479,873 A 1/1996 Shintani et al.
5,482,756 A 1/1996 Berger et al.
5,486,496 A 1/1996 Talbert et al.
5,489,318 A 2/1996 Erickson et al.
5,496,386 A 3/1996 Broberg et al.
5,498,268 A 3/1996 Gagliardi et al.
5,500,273 A 3/1996 Holmes et al.
5,514,631 A 5/1996 Cottringer et al.
5,516,347 A 5/1996 Garg
5,516,348 A 5/1996 Conwell et al.
5,523,074 A 6/1996 Takahashi et al.
5,525,100 A 6/1996 Kelly et al.
5,527,369 A 6/1996 Garg
5,543,368 A 8/1996 Talbert et al.
5,549,962 A 8/1996 Holmes et al.
5,551,963 A 9/1996 Larmie
5,560,745 A 10/1996 Roberts
5,567,150 A 10/1996 Conwell et al.
5,567,214 A 10/1996 Ashley
5,567,251 A 10/1996 Peker et al.
5,571,297 A 11/1996 Swei et al.
5,576,409 A 11/1996 Mackey
5,578,095 A 11/1996 Bland et al.
5,578,222 A 11/1996 Trischuk et al.
5,582,625 A 12/1996 Wright et al.
5,584,896 A 12/1996 Broberg et al.
5,584,897 A 12/1996 Christianson et al.
5,591,685 A 1/1997 Mitomo et al.
5,593,468 A 1/1997 Khaund et al.
5,599,493 A 2/1997 Ito et al.
5,603,738 A 2/1997 Zeiringer et al.
5,609,706 A 3/1997 Benedict et al.
5,611,829 A 3/1997 Monroe et al.
5,618,221 A 4/1997 Furukawa et al.
5,628,952 A 5/1997 Holmes et al.
5,641,469 A 6/1997 Garg et al.
RE35,570 E 7/1997 Rowenhorst et al.
5,645,619 A 7/1997 Erickson et al.
5,651,925 A 7/1997 Ashley et al.
5,656,217 A 8/1997 Rogers et al.
5,667,542 A 9/1997 Law et al.
5,669,941 A 9/1997 Peterson
5,669,943 A 9/1997 Horton et al.
5,672,097 A 9/1997 Hoopman
5,672,554 A 9/1997 Mohri et al.
5,683,844 A 11/1997 Mammino
5,702,811 A 12/1997 Ho et al.
5,725,162 A 3/1998 Garg et al.
5,736,619 A 4/1998 Kane et al.
5,738,696 A 4/1998 Wu
5,738,697 A 4/1998 Wu et al.
5,751,313 A 5/1998 Miyashita et al.
5,759,481 A 6/1998 Pujari et al.
5,776,214 A 7/1998 Wood
5,779,743 A 7/1998 Wood
5,785,722 A 7/1998 Garg et al.
5,810,587 A 9/1998 Bruns et al.
5,820,450 A 10/1998 Calhoun
5,830,248 A 11/1998 Christianson et al.
5,840,089 A 11/1998 Chesley et al.
5,849,646 A 12/1998 Stout et al.
5,855,997 A 1/1999 Amateau
5,863,306 A 1/1999 Wei et al.
5,866,254 A 2/1999 Peker et al.
5,876,793 A 3/1999 Sherman et al.
5,885,311 A 3/1999 McCutcheon et al.
5,893,935 A 4/1999 Wood
5,902,647 A 5/1999 Venkataramani et al.
5,908,477 A 6/1999 Harmer et al.
5,908,478 A 6/1999 Wood
5,919,549 A 7/1999 Van et al.
5,924,917 A 7/1999 Benedict et al.
5,946,991 A 9/1999 Hoopman
5,975,987 A 11/1999 Hoopman et al.
5,980,678 A 11/1999 Tselesin
5,984,988 A 11/1999 Berg et al.
5,989,301 A 11/1999 Laconto, Sr. et al.
5,997,597 A 12/1999 Hagan
6,016,660 A 1/2000 Abramshe
6,019,805 A 2/2000 Herron
6,024,824 A 2/2000 Krech
6,027,326 A 2/2000 Cesarano, III et al.
6,039,775 A 3/2000 Ho et al.
6,048,577 A 4/2000 Garg
6,053,956 A 4/2000 Wood
6,054,093 A 4/2000 Torre, Jr. et al.
6,080,215 A 6/2000 Stubbs et al.
6,080,216 A 6/2000 Erickson
6,083,622 A 7/2000 Garg et al.
6,096,107 A 8/2000 Caracostas et al.
6,110,241 A 8/2000 Sung
6,129,540 A 10/2000 Hoopman et al.
6,136,288 A 10/2000 Bauer et al.
6,146,247 A 11/2000 Nokubi et al.
6,179,887 B1 1/2001 Barber, Jr. et al.
6,206,942 B1 3/2001 Wood

(56) References Cited

U.S. PATENT DOCUMENTS

| | | | |
|---|---|---|---|
| 6,228,134 | B1 | 5/2001 | Erickson |
| 6,238,450 | B1 | 5/2001 | Garg et al. |
| 6,258,137 | B1 | 7/2001 | Garg et al. |
| 6,258,141 | B1 | 7/2001 | Sung et al. |
| 6,261,682 | B1 | 7/2001 | Law |
| 6,264,710 | B1 | 7/2001 | Erickson |
| 6,277,160 | B1 | 8/2001 | Stubbs et al. |
| 6,277,161 | B1 | 8/2001 | Castro et al. |
| 6,283,997 | B1 | 9/2001 | Garg et al. |
| 6,284,690 | B1 | 9/2001 | Nakahata et al. |
| 6,287,353 | B1 | 9/2001 | Celikkaya |
| 6,306,007 | B1 | 10/2001 | Mori et al. |
| 6,312,324 | B1 | 11/2001 | Mitsui et al. |
| 6,319,108 | B1 | 11/2001 | Adefris et al. |
| 6,331,343 | B1 | 12/2001 | Perez et al. |
| 6,371,842 | B1 | 4/2002 | Romero |
| 6,391,812 | B1 | 5/2002 | Araki et al. |
| 6,398,989 | B1 | 6/2002 | Bergstrom |
| 6,401,795 | B1 | 6/2002 | Cesarano, III et al. |
| 6,403,001 | B1 | 6/2002 | Hayashi |
| 6,406,200 | B2 | 6/2002 | Mahoney |
| 6,413,286 | B1 | 7/2002 | Swei et al. |
| 6,428,392 | B1 | 8/2002 | Sunahara et al. |
| 6,451,076 | B1 | 9/2002 | Nevoret et al. |
| 6,475,253 | B2 | 11/2002 | Culler et al. |
| 6,500,493 | B2 | 12/2002 | Swei et al. |
| 6,511,938 | B1 | 1/2003 | Liu |
| 6,524,681 | B1 | 2/2003 | Seitz et al. |
| 6,531,423 | B1 | 3/2003 | Schwetz et al. |
| 6,537,140 | B1 | 3/2003 | Miller et al. |
| 6,579,819 | B2 | 6/2003 | Hirosaki et al. |
| 6,582,623 | B1 | 6/2003 | Grumbine et al. |
| 6,583,080 | B1 | 6/2003 | Rosenflanz |
| 6,599,177 | B2 | 7/2003 | Nevoret et al. |
| 6,620,214 | B2 | 9/2003 | McArdle et al. |
| 6,646,019 | B2 | 11/2003 | Perez et al. |
| 6,652,361 | B1 | 11/2003 | Gash et al. |
| 6,669,745 | B2 | 12/2003 | Prichard et al. |
| 6,685,755 | B2 | 2/2004 | Ramanath et al. |
| 6,696,258 | B1 | 2/2004 | Wei |
| 6,702,650 | B2 | 3/2004 | Adefris |
| 6,737,378 | B2 | 5/2004 | Hirosaki et al. |
| 6,749,496 | B2 | 6/2004 | Mota et al. |
| 6,750,173 | B2 | 6/2004 | Rizkalla |
| 6,752,700 | B2 | 6/2004 | Duescher |
| 6,755,729 | B2 | 6/2004 | Ramanath et al. |
| 6,802,878 | B1 | 10/2004 | Monroe |
| 6,821,196 | B2 | 11/2004 | Oliver |
| 6,833,014 | B2 | 12/2004 | Welygan et al. |
| 6,843,815 | B1 | 1/2005 | Thurber et al. |
| 6,846,795 | B2 | 1/2005 | Lant et al. |
| 6,878,456 | B2 | 4/2005 | Castro et al. |
| 6,881,483 | B2 | 4/2005 | McArdle et al. |
| 6,888,360 | B1 | 5/2005 | Connell et al. |
| 6,913,824 | B2 | 7/2005 | Culler et al. |
| 6,942,561 | B2 | 9/2005 | Mota et al. |
| 6,949,128 | B2 | 9/2005 | Annen |
| 6,951,504 | B2 | 10/2005 | Adefris et al. |
| 6,974,930 | B2 | 12/2005 | Jense |
| 7,022,179 | B1 | 4/2006 | Dry |
| 7,044,989 | B2 | 5/2006 | Welygan et al. |
| 7,112,621 | B2 | 9/2006 | Rohrbaugh et al. |
| 7,141,522 | B2 | 11/2006 | Rosenflanz et al. |
| 7,168,267 | B2 | 1/2007 | Rosenflanz et al. |
| 7,169,198 | B2 | 1/2007 | Moeltgen et al. |
| 7,267,604 | B2 | 9/2007 | Yoshizawa et al. |
| 7,267,700 | B2 | 9/2007 | Collins et al. |
| 7,294,158 | B2 | 11/2007 | Welygan et al. |
| 7,297,170 | B2 | 11/2007 | Welygan et al. |
| 7,297,402 | B2 | 11/2007 | Evans et al. |
| 7,364,788 | B2 | 4/2008 | Kishbaugh et al. |
| 7,373,887 | B2 | 5/2008 | Jackson |
| 7,384,437 | B2 | 6/2008 | Welygan et al. |
| 7,404,832 | B2 | 7/2008 | Ohtsubo et al. |
| 7,488,544 | B2 | 2/2009 | Schofalvi et al. |
| 7,507,268 | B2 | 3/2009 | Rosenflanz |
| 7,553,346 | B2 | 6/2009 | Welygan et al. |
| 7,556,558 | B2 | 7/2009 | Palmgren |
| 7,560,062 | B2 | 7/2009 | Gould et al. |
| 7,560,139 | B2 | 7/2009 | Thebault et al. |
| 7,563,293 | B2 | 7/2009 | Rosenflanz |
| 7,611,795 | B2 | 11/2009 | Aoyama et al. |
| 7,618,684 | B2 | 11/2009 | Nesbitt |
| 7,632,434 | B2 | 12/2009 | Duescher |
| 7,651,386 | B2 | 1/2010 | Sung |
| 7,662,735 | B2 | 2/2010 | Rosenflanz et al. |
| 7,666,344 | B2 | 2/2010 | Schofalvi et al. |
| 7,666,475 | B2 | 2/2010 | Morrison |
| 7,669,658 | B2 | 3/2010 | Barron et al. |
| 7,670,679 | B2 | 3/2010 | Krishna et al. |
| 7,695,542 | B2 | 4/2010 | Drivdahl et al. |
| 7,858,189 | B2 | 12/2010 | Wagener et al. |
| 7,867,302 | B2 | 1/2011 | Nevoret et al. |
| 7,906,057 | B2 | 3/2011 | Zhang et al. |
| 7,968,147 | B2 | 6/2011 | Fang et al. |
| 7,972,430 | B2 | 7/2011 | Millard et al. |
| 8,021,449 | B2 | 9/2011 | Seth et al. |
| 8,034,137 | B2 | 10/2011 | Erickson et al. |
| 8,049,136 | B2 | 11/2011 | Mase et al. |
| 8,070,556 | B2 | 12/2011 | Kumar et al. |
| 8,123,828 | B2 | 2/2012 | Culler et al. |
| 8,141,484 | B2 | 3/2012 | Ojima et al. |
| 8,142,531 | B2 | 3/2012 | Adefris et al. |
| 8,142,532 | B2 | 3/2012 | Erickson et al. |
| 8,142,891 | B2 | 3/2012 | Culler et al. |
| 8,251,774 | B2 | 8/2012 | Joseph et al. |
| 8,256,091 | B2 | 9/2012 | Duescher |
| 8,333,360 | B2 | 12/2012 | Rule et al. |
| 8,440,602 | B2 | 5/2013 | Gonzales et al. |
| 8,440,603 | B2 | 5/2013 | Gonzales et al. |
| 8,445,422 | B2 | 5/2013 | Gonzales et al. |
| 8,470,759 | B2 | 6/2013 | Gonzales et al. |
| 8,480,772 | B2 | 7/2013 | Welygan et al. |
| 8,530,682 | B2 | 9/2013 | Sachs |
| 8,568,497 | B2 | 10/2013 | Sheridan |
| 8,628,597 | B2 | 1/2014 | Palmgren et al. |
| 8,783,589 | B2 | 7/2014 | Hart et al. |
| 8,852,643 | B2 | 10/2014 | Gonzales et al. |
| 8,920,527 | B2 | 12/2014 | Seider et al. |
| 8,921,687 | B1 | 12/2014 | Welser |
| 9,017,439 | B2 | 4/2015 | Yener et al. |
| 9,079,154 | B2 | 7/2015 | Rosendahl |
| 9,181,477 | B2 | 11/2015 | Collins et al. |
| 9,211,634 | B2 | 12/2015 | Rehrig et al. |
| 9,259,726 | B2 | 2/2016 | Gopal |
| 9,375,826 | B2 | 6/2016 | Tian et al. |
| 9,717,674 | B1 | 8/2017 | Guskey et al. |
| 9,758,724 | B2 | 9/2017 | Collins et al. |
| 9,982,175 | B2 | 5/2018 | Sarangi et al. |
| D849,066 | S | 5/2019 | Hanschen et al. |
| D849,067 | S | 5/2019 | Hanschen et al. |
| 10,351,745 | B2 | 7/2019 | Josseaux et al. |
| 10,364,383 | B2 | 7/2019 | Yener et al. |
| D862,538 | S | 10/2019 | Hanschen et al. |
| D870,782 | S | 12/2019 | Hanschen et al. |
| 10,556,323 | B2 | 2/2020 | Alkhas et al. |
| 10,557,068 | B2 | 2/2020 | Oldenkotte et al. |
| 10,563,105 | B2 | 2/2020 | Cotter et al. |
| 10,655,038 | B2 | 5/2020 | Martinez et al. |
| 10,710,211 | B2 | 7/2020 | Lehuu et al. |
| 10,717,908 | B2 | 7/2020 | Hejtmann et al. |
| 11,643,582 | B2 | 5/2023 | Bujnowski et al. |
| 2001/0027623 | A1 | 10/2001 | Rosenflanz |
| 2002/0026752 | A1 | 3/2002 | Culler et al. |
| 2002/0068518 | A1 | 6/2002 | Cesena et al. |
| 2002/0084290 | A1 | 7/2002 | Materna |
| 2002/0090891 | A1 | 7/2002 | Adefris et al. |
| 2002/0151265 | A1 | 10/2002 | Adefris |
| 2002/0170236 | A1 | 11/2002 | Larson et al. |
| 2002/0174935 | A1 | 11/2002 | Burdon et al. |
| 2002/0177391 | A1 | 11/2002 | Fritz et al. |
| 2003/0008933 | A1 | 1/2003 | Perez et al. |
| 2003/0022961 | A1 | 1/2003 | Kusaka et al. |
| 2003/0029094 | A1 | 2/2003 | Moeltgen et al. |

(56) References Cited

U.S. PATENT DOCUMENTS

2003/0085204 A1 5/2003 Lagos
2003/0109371 A1 6/2003 Pujari et al.
2003/0110707 A1 6/2003 Rosenflanz et al.
2003/0126800 A1 7/2003 Seth et al.
2003/0228738 A1 12/2003 Beaudoin
2004/0003895 A1 1/2004 Amano et al.
2004/0148868 A1 8/2004 Anderson et al.
2004/0148967 A1 8/2004 Celikkaya et al.
2004/0202844 A1 10/2004 Wong
2004/0224125 A1 11/2004 Yamada et al.
2004/0235406 A1 11/2004 Duescher
2004/0244675 A1 12/2004 Kishimoto et al.
2005/0020190 A1 1/2005 Schutz et al.
2005/0060941 A1 3/2005 Provow et al.
2005/0060947 A1 3/2005 McArdle et al.
2005/0064805 A1 3/2005 Culler et al.
2005/0081455 A1 4/2005 Welygan et al.
2005/0118939 A1 6/2005 Duescher
2005/0132655 A1 6/2005 Anderson et al.
2005/0218565 A1 10/2005 DiChiara, Jr.
2005/0223649 A1 10/2005 O'Gary et al.
2005/0232853 A1 10/2005 Evans et al.
2005/0245179 A1 11/2005 Luedeke
2005/0255801 A1 11/2005 Pollasky
2005/0266221 A1 12/2005 Karam et al.
2005/0271795 A1 12/2005 Moini et al.
2005/0284029 A1 12/2005 Bourlier et al.
2006/0049540 A1 3/2006 Hui et al.
2006/0126265 A1 6/2006 Crespi et al.
2006/0135050 A1 6/2006 Petersen et al.
2006/0177488 A1 8/2006 Caruso et al.
2006/0185256 A1 8/2006 Nevoret et al.
2007/0011951 A1 1/2007 Gaeta et al.
2007/0020457 A1 1/2007 Adefris
2007/0051355 A1 3/2007 Sung
2007/0072527 A1 3/2007 Palmgren
2007/0074456 A1 4/2007 Orlhac et al.
2007/0087928 A1 4/2007 Rosenflanz et al.
2007/0234646 A1 10/2007 Can et al.
2008/0017053 A1 1/2008 Araumi et al.
2008/0072500 A1 3/2008 Klett et al.
2008/0098659 A1 5/2008 Sung
2008/0121124 A1 5/2008 Sato
2008/0172951 A1 7/2008 Starling
2008/0176075 A1 7/2008 Bauer et al.
2008/0179783 A1 7/2008 Liu et al.
2008/0230951 A1 9/2008 Dannoux et al.
2008/0233845 A1 9/2008 Annen et al.
2008/0262577 A1 10/2008 Altshuler et al.
2008/0271384 A1 11/2008 Puthanangady et al.
2008/0286590 A1 11/2008 Besida et al.
2008/0299875 A1 12/2008 Duescher
2009/0016916 A1 1/2009 Rosenzweig et al.
2009/0017276 A1 1/2009 Hoglund et al.
2009/0017736 A1 1/2009 Block et al.
2009/0098365 A1 4/2009 Moeltgen
2009/0165394 A1 7/2009 Culler et al.
2009/0165661 A1 7/2009 Koenig et al.
2009/0169816 A1 7/2009 Erickson et al.
2009/0208734 A1 8/2009 Macfie et al.
2009/0246464 A1 10/2009 Watanabe et al.
2010/0000159 A1 1/2010 Walia et al.
2010/0003900 A1 1/2010 Sakaguchi et al.
2010/0003904 A1 1/2010 Duescher
2010/0040767 A1 2/2010 Uibel et al.
2010/0056816 A1 3/2010 Wallin et al.
2010/0064594 A1 3/2010 Pakalapati et al.
2010/0068974 A1 3/2010 Dumm
2010/0146867 A1 6/2010 Boden et al.
2010/0151195 A1 6/2010 Culler et al.
2010/0151196 A1 6/2010 Adefris et al.
2010/0151201 A1 6/2010 Erickson et al.
2010/0190424 A1 7/2010 Francois et al.
2010/0201018 A1 8/2010 Yoshioka et al.
2010/0251625 A1 10/2010 Gaeta
2010/0292428 A1 11/2010 Meador et al.
2010/0307067 A1 12/2010 Sigalas et al.
2010/0319269 A1 12/2010 Erickson
2010/0330886 A1 12/2010 Wu et al.
2011/0008604 A1 1/2011 Boylan
2011/0081848 A1 4/2011 Chen
2011/0092137 A1 4/2011 Ohishi et al.
2011/0111563 A1 5/2011 Yanagi et al.
2011/0124483 A1 5/2011 Shah et al.
2011/0136659 A1 6/2011 Allen et al.
2011/0146509 A1 6/2011 Welygan et al.
2011/0152548 A1 6/2011 Sachs et al.
2011/0160104 A1 6/2011 Wu et al.
2011/0244769 A1 10/2011 David et al.
2011/0289854 A1 12/2011 Moren et al.
2011/0314746 A1 12/2011 Erickson et al.
2012/0000135 A1 1/2012 Eilers et al.
2012/0034847 A1 2/2012 Besse et al.
2012/0055098 A1 3/2012 Ramanath et al.
2012/0100366 A1 4/2012 Dumm et al.
2012/0137597 A1 6/2012 Adefris et al.
2012/0144754 A1 6/2012 Culler et al.
2012/0144755 A1 6/2012 Erickson et al.
2012/0153547 A1 6/2012 Bauer et al.
2012/0167481 A1 7/2012 Yener et al.
2012/0168979 A1 7/2012 Bauer et al.
2012/0227333 A1 9/2012 Adefris et al.
2012/0231711 A1 9/2012 Keipert et al.
2012/0308837 A1 12/2012 Schlechtriemen et al.
2012/0321567 A1 12/2012 Gonzales et al.
2013/0000212 A1 1/2013 Wang et al.
2013/0000216 A1 1/2013 Wang et al.
2013/0009484 A1 1/2013 Yu
2013/0036402 A1 2/2013 Mutisya et al.
2013/0045251 A1 2/2013 Cen et al.
2013/0067669 A1 3/2013 Gonzales et al.
2013/0072417 A1 3/2013 Perez-Prat et al.
2013/0074418 A1 3/2013 Panzarella et al.
2013/0125477 A1 5/2013 Adefris
2013/0180180 A1 7/2013 Yener et al.
2013/0186005 A1 7/2013 Kavanaugh
2013/0186006 A1 7/2013 Kavanaugh et al.
2013/0199105 A1* 8/2013 Braun ........................ B01J 2/22
51/307
2013/0203328 A1 8/2013 Givot et al.
2013/0212952 A1* 8/2013 Welygan ............ B23K 26/0821
51/309
2013/0236725 A1* 9/2013 Yener .................. C09K 3/1418
428/402
2013/0255162 A1 10/2013 Welygan et al.
2013/0260656 A1 10/2013 Seth et al.
2013/0267150 A1 10/2013 Seider et al.
2013/0283705 A1 10/2013 Fischer et al.
2013/0296587 A1 11/2013 Rosendahl
2013/0305614 A1 11/2013 Gaeta et al.
2013/0337262 A1 12/2013 Bauer et al.
2013/0337725 A1 12/2013 Monroe
2013/0344786 A1 12/2013 Keipert
2014/0000176 A1 1/2014 Moren et al.
2014/0007518 A1 1/2014 Yener et al.
2014/0080393 A1 3/2014 Ludwig
2014/0106126 A1 4/2014 Gaeta et al.
2014/0107356 A1 4/2014 Gopal
2014/0182216 A1 7/2014 Panzarella et al.
2014/0182217 A1 7/2014 Yener et al.
2014/0186585 A1 7/2014 Field, III et al.
2014/0250797 A1 9/2014 Yener et al.
2014/0256238 A1 9/2014 Van et al.
2014/0287658 A1 9/2014 Flaschberger et al.
2014/0290147 A1 10/2014 Seth et al.
2014/0325917 A1 11/2014 Czerepinski et al.
2014/0345204 A1 11/2014 Wang et al.
2014/0345205 A1 11/2014 Kavanaugh et al.
2014/0352721 A1 12/2014 Gonzales et al.
2014/0352722 A1 12/2014 Gonzales et al.
2014/0357544 A1 12/2014 Gonzales et al.
2014/0378036 A1 12/2014 Cichowlas et al.
2015/0000209 A1 1/2015 Louapre et al.
2015/0000210 A1 1/2015 Breder et al.

(56) References Cited

U.S. PATENT DOCUMENTS

| | | | |
|---|---|---|---|
| 2015/0007399 | A1 | 1/2015 | Gonzales et al. |
| 2015/0007400 | A1 | 1/2015 | Gonzales et al. |
| 2015/0068130 | A1 | 3/2015 | Louapre et al. |
| 2015/0089881 | A1 | 4/2015 | Stevenson et al. |
| 2015/0126098 | A1 | 5/2015 | Eilers et al. |
| 2015/0128505 | A1 | 5/2015 | Wang et al. |
| 2015/0183089 | A1 | 7/2015 | Iyengar |
| 2015/0209932 | A1 | 7/2015 | Lehuu et al. |
| 2015/0218430 | A1 | 8/2015 | Yener et al. |
| 2015/0232727 | A1 | 8/2015 | Erickson |
| 2015/0267099 | A1 | 9/2015 | Panzarella et al. |
| 2015/0291865 | A1 | 10/2015 | Breder et al. |
| 2015/0291866 | A1 | 10/2015 | Arcona et al. |
| 2015/0291867 | A1 | 10/2015 | Breder et al. |
| 2015/0343603 | A1 | 12/2015 | Breder et al. |
| 2016/0053151 | A1 | 2/2016 | Bauer et al. |
| 2016/0090516 | A1 | 3/2016 | Yener et al. |
| 2016/0107290 | A1 | 4/2016 | Bajaj et al. |
| 2016/0177152 | A1 | 6/2016 | Braun |
| 2016/0177153 | A1 | 6/2016 | Josseaux |
| 2016/0177154 | A1 | 6/2016 | Josseaux et al. |
| 2016/0186028 | A1 | 6/2016 | Louapare et al. |
| 2016/0214903 | A1 | 7/2016 | Humpal et al. |
| 2016/0289520 | A1 | 10/2016 | Bujnowski et al. |
| 2016/0289521 | A1 | 10/2016 | Colet et al. |
| 2016/0298013 | A1 | 10/2016 | Bock et al. |
| 2016/0303704 | A1 | 10/2016 | Chou et al. |
| 2016/0303705 | A1 | 10/2016 | Chou et al. |
| 2016/0304760 | A1 | 10/2016 | Bock et al. |
| 2016/0311081 | A1 | 10/2016 | Culler et al. |
| 2016/0311084 | A1 | 10/2016 | Culler et al. |
| 2016/0326416 | A1 | 11/2016 | Bauer et al. |
| 2016/0340564 | A1 | 11/2016 | Louapre et al. |
| 2016/0354898 | A1 | 12/2016 | Nienaber et al. |
| 2016/0362589 | A1 | 12/2016 | Bauer et al. |
| 2016/0375556 | A1 | 12/2016 | Seth et al. |
| 2017/0015886 | A1 | 1/2017 | Czerepinski et al. |
| 2017/0028531 | A1 | 2/2017 | Gaeta et al. |
| 2017/0050293 | A1 | 2/2017 | Gaeta et al. |
| 2017/0066099 | A1 | 3/2017 | Nakamura |
| 2017/0114260 | A1 | 4/2017 | Bock et al. |
| 2017/0129075 | A1 | 5/2017 | Thurber et al. |
| 2017/0145274 | A1 | 5/2017 | Yener et al. |
| 2017/0158930 | A1 | 6/2017 | Iyengar |
| 2017/0225299 | A1 | 8/2017 | Keipert et al. |
| 2017/0247592 | A1 | 8/2017 | Bauer et al. |
| 2017/0335155 | A1 | 11/2017 | Czerepinski et al. |
| 2017/0335156 | A1 | 11/2017 | Bauer et al. |
| 2017/0342303 | A1 | 11/2017 | Stevenson et al. |
| 2017/0349797 | A1 | 12/2017 | Yener et al. |
| 2018/0002584 | A1 | 1/2018 | Yener et al. |
| 2018/0086957 | A1 | 3/2018 | Sahlin et al. |
| 2018/0155592 | A1 | 6/2018 | Josseaux et al. |
| 2018/0161960 | A1 | 6/2018 | Wilson et al. |
| 2018/0169837 | A1 | 6/2018 | Liu |
| 2018/0187057 | A1 | 7/2018 | Bujnowski et al. |
| 2018/0215975 | A1 | 8/2018 | Marazano et al. |
| 2018/0215976 | A1* | 8/2018 | Cotter ..................... C04B 35/58 |
| 2018/0237675 | A1 | 8/2018 | Yener et al. |
| 2018/0318983 | A1 | 11/2018 | Wilson et al. |
| 2018/0327644 | A1 | 11/2018 | Bauer et al. |
| 2018/0370857 | A1 | 12/2018 | Marlin et al. |
| 2019/0022826 | A1 | 1/2019 | Franke et al. |
| 2019/0030684 | A1 | 1/2019 | Van et al. |
| 2019/0091835 | A1 | 3/2019 | Culler et al. |
| 2019/0119540 | A1 | 4/2019 | Colet et al. |
| 2019/0126436 | A1 | 5/2019 | Westberg et al. |
| 2019/0160630 | A1 | 5/2019 | Jiang et al. |
| 2019/0217442 | A1 | 7/2019 | Gaeta et al. |
| 2019/0249052 | A1 | 8/2019 | Eckel et al. |
| 2019/0270182 | A1 | 9/2019 | Eckel et al. |
| 2019/0284461 | A1 | 9/2019 | Josseaux et al. |
| 2019/0309201 | A1 | 10/2019 | Dumont et al. |
| 2019/0322915 | A1 | 10/2019 | Jiwpanich et al. |
| 2019/0330505 | A1 | 10/2019 | Bujnowski et al. |
| 2019/0337124 | A1 | 11/2019 | Liu et al. |
| 2019/0338172 | A1 | 11/2019 | Erickson et al. |
| 2019/0338173 | A1 | 11/2019 | Yener et al. |
| 2019/0351531 | A1 | 11/2019 | Nelson et al. |
| 2019/0358776 | A1 | 11/2019 | Seth et al. |
| 2019/0366511 | A1 | 12/2019 | Huber |
| 2019/0382637 | A1 | 12/2019 | Braun et al. |
| 2020/0139512 | A1 | 5/2020 | Culler et al. |
| 2020/0148927 | A1 | 5/2020 | Arcona et al. |
| 2020/0156215 | A1 | 5/2020 | Jusuf et al. |
| 2020/0157396 | A1 | 5/2020 | Cotter et al. |
| 2020/0157397 | A1 | 5/2020 | Stevenson et al. |
| 2020/0199426 | A1 | 6/2020 | Yener et al. |
| 2020/0262031 | A1 | 8/2020 | Seth et al. |
| 2020/0308462 | A1 | 10/2020 | Bauer et al. |
| 2020/0391354 | A1 | 12/2020 | Marazano et al. |
| 2021/0024798 | A1 | 1/2021 | Czerepinski et al. |
| 2021/0087444 | A1 | 3/2021 | Stevenson et al. |
| 2021/0087445 | A1 | 3/2021 | Cotter et al. |
| 2021/0108117 | A1 | 4/2021 | Bauer et al. |
| 2021/0108118 | A1 | 4/2021 | Yener et al. |
| 2021/0130667 | A1 | 5/2021 | Arcona et al. |
| 2021/0197339 | A1 | 7/2021 | Marlin et al. |
| 2021/0198544 | A1 | 7/2021 | Marlin et al. |
| 2021/0198545 | A1 | 7/2021 | Marlin et al. |
| 2021/0332278 | A1 | 10/2021 | Iyengar |
| 2021/0395587 | A1 | 12/2021 | Yener et al. |
| 2022/0001512 | A1 | 1/2022 | Gaeta et al. |
| 2022/0025237 | A1 | 1/2022 | Sahlin et al. |
| 2023/0061952 | A1 | 3/2023 | Lentz et al. |
| 2023/0065541 | A1 | 3/2023 | Colet et al. |
| 2023/0096577 | A1 | 3/2023 | Cotter et al. |
| 2023/0135441 | A1 | 5/2023 | Seth et al. |
| 2023/0193100 | A1 | 6/2023 | Josseaux et al. |
| 2023/0211466 | A1 | 7/2023 | Martone et al. |
| 2023/0211467 | A1 | 7/2023 | Martone et al. |
| 2023/0211468 | A1 | 7/2023 | Martone et al. |
| 2023/0220255 | A1 | 7/2023 | Yuyang et al. |
| 2023/0220256 | A1 | 7/2023 | Bujnowski et al. |
| 2023/0265326 | A1 | 8/2023 | Adefris |
| 2023/0272254 | A1 | 8/2023 | Yener et al. |
| 2023/0294247 | A1 | 9/2023 | Liu et al. |
| 2023/0332030 | A1 | 10/2023 | Bauer et al. |
| 2023/0357617 | A9 | 11/2023 | Yener et al. |
| 2024/0116153 | A1 | 4/2024 | Martone et al. |
| 2024/0123574 | A1 | 4/2024 | Martone et al. |
| 2024/0141219 | A1 | 5/2024 | Bauer et al. |
| 2024/0198488 | A1 | 6/2024 | Marlin et al. |
| 2024/0218224 | A1 | 7/2024 | Fan et al. |
| 2024/0218225 | A1 | 7/2024 | Cotter et al. |
| 2024/0254376 | A1 | 8/2024 | Josseaux et al. |

FOREIGN PATENT DOCUMENTS

| | | | |
|---|---|---|---|
| CH | 685051 | A5 | 3/1995 |
| CN | 1229007 | A | 7/2005 |
| CN | 1774488 | A | 5/2006 |
| CN | 101389466 | A | 3/2009 |
| CN | 101970347 | A | 2/2011 |
| CN | 101980836 | A | 2/2011 |
| CN | 102281992 | A | 12/2011 |
| CN | 103189164 | A | 7/2013 |
| CN | 103842132 | A | 6/2014 |
| CN | 102123837 | B | 7/2014 |
| CN | 104125875 | A | 10/2014 |
| CN | 104994995 | A | 10/2015 |
| CN | 105622071 | A | 6/2016 |
| CN | 105713568 | A | 6/2016 |
| DE | 3923671 | C2 | 2/1998 |
| DE | 102012023688 | A1 | 4/2014 |
| DE | 202014101739 | U1 | 6/2014 |
| DE | 202014101741 | U1 | 6/2014 |
| DE | 102013202204 | A1 | 8/2014 |
| DE | 102013210158 | A1 | 12/2014 |
| DE | 102013210716 | A1 | 12/2014 |
| DE | 102013212598 | A1 | 12/2014 |
| DE | 102013212622 | A1 | 12/2014 |
| DE | 102013212634 | A1 | 12/2014 |
| DE | 102013212639 | A1 | 12/2014 |

(56) References Cited

FOREIGN PATENT DOCUMENTS

| | | | |
|---|---|---|---|
| DE | 102013212644 | A1 | 12/2014 |
| DE | 102013212653 | A1 | 12/2014 |
| DE | 102013212654 | A1 | 12/2014 |
| DE | 102013212661 | A1 | 12/2014 |
| DE | 102013212666 | A1 | 12/2014 |
| DE | 102013212677 | A1 | 12/2014 |
| DE | 102013212680 | A1 | 12/2014 |
| DE | 102013212687 | A1 | 12/2014 |
| DE | 102013212690 | A1 | 12/2014 |
| DE | 102013212700 | A1 | 12/2014 |
| DE | 102014210836 | A1 | 12/2014 |
| EP | 0078896 | A2 | 5/1983 |
| EP | 0152768 | A2 | 8/1985 |
| EP | 0293163 | A2 | 11/1988 |
| EP | 0480133 | A2 | 4/1992 |
| EP | 0652919 | A1 | 5/1995 |
| EP | 0662110 | A1 | 7/1995 |
| EP | 0500369 | B1 | 1/1996 |
| EP | 0609864 | B1 | 11/1996 |
| EP | 0771769 | | 5/1997 |
| EP | 0812456 | B1 | 12/1997 |
| EP | 0651778 | B1 | 5/1998 |
| EP | 0614861 | B1 | 5/2001 |
| EP | 0931032 | B1 | 7/2001 |
| EP | 0833803 | | 8/2001 |
| EP | 1207015 | A2 | 5/2002 |
| EP | 1356152 | A2 | 10/2003 |
| EP | 1371451 | A1 | 12/2003 |
| EP | 1383631 | A1 | 1/2004 |
| EP | 1015181 | B1 | 3/2004 |
| EP | 1492845 | A1 | 1/2005 |
| EP | 1851007 | | 11/2007 |
| EP | 1960157 | A1 | 8/2008 |
| EP | 2176031 | A1 | 4/2010 |
| EP | 2184134 | A1 | 5/2010 |
| EP | 2242618 | A2 | 10/2010 |
| EP | 2390056 | A2 | 11/2011 |
| EP | 1800801 | B1 | 3/2012 |
| EP | 2445982 | A2 | 5/2012 |
| EP | 2507016 | A2 | 10/2012 |
| EP | 2537917 | A1 | 12/2012 |
| EP | 2567784 | A1 | 3/2013 |
| EP | 2631286 | A1 | 8/2013 |
| EP | 2692813 | A1 | 2/2014 |
| EP | 2692814 | A1 | 2/2014 |
| EP | 2692815 | A1 | 2/2014 |
| EP | 2692816 | A1 | 2/2014 |
| EP | 2692817 | A1 | 2/2014 |
| EP | 2692818 | A1 | 2/2014 |
| EP | 2692819 | A1 | 2/2014 |
| EP | 2692820 | A1 | 2/2014 |
| EP | 2692821 | A1 | 2/2014 |
| EP | 2719752 | A1 | 4/2014 |
| EP | 2012972 | B1 | 6/2014 |
| EP | 2720676 | B1 | 1/2018 |
| EP | 3319758 | A1 | 5/2018 |
| EP | 3342839 | A1 | 7/2018 |
| EP | 3444313 | B1 | 7/2020 |
| EP | 3830211 | A1 | 6/2021 |
| FR | 2354373 | A1 | 1/1978 |
| GB | 986847 | A | 3/1965 |
| GB | 1456765 | A | 11/1976 |
| GB | 1466054 | | 3/1977 |
| JP | 53064890 | A | 6/1978 |
| JP | 60-006356 | U | 1/1985 |
| JP | 62002946 | B | 1/1987 |
| JP | 63036905 | B | 7/1988 |
| JP | 03079277 | A | 4/1991 |
| JP | 03-287687 | | 12/1991 |
| JP | 05285833 | A | 11/1993 |
| JP | 06114739 | A | 4/1994 |
| JP | 07008474 | B2 | 2/1995 |
| JP | 3030861 | U | 8/1996 |
| JP | 10113875 | A | 5/1998 |
| JP | 2779252 | B2 | 7/1998 |
| JP | 10330734 | A | 12/1998 |
| JP | H10315142 | A | 12/1998 |
| JP | 2957492 | B2 | 10/1999 |
| JP | 2000091280 | A | 3/2000 |
| JP | 2000-336344 | A | 12/2000 |
| JP | 2000354967 | A | 12/2000 |
| JP | 3160084 | B2 | 4/2001 |
| JP | 2001162541 | A | 6/2001 |
| JP | 3194269 | B2 | 7/2001 |
| JP | 2001180930 | A | 7/2001 |
| JP | 2001207160 | A | 7/2001 |
| JP | 2001516652 | A | 10/2001 |
| JP | 2002-038131 | A | 2/2002 |
| JP | 2002210659 | A | 7/2002 |
| JP | 2003-049158 | A | 2/2003 |
| JP | 2004-510873 | A | 4/2004 |
| JP | 2004209624 | A | 7/2004 |
| JP | 2006130586 | A | 5/2006 |
| JP | 2006130636 | A | 5/2006 |
| JP | 2006159402 | A | 6/2006 |
| JP | 2006-192540 | A | 7/2006 |
| JP | 2006224201 | A | 8/2006 |
| JP | 2007-537891 | A | 12/2007 |
| JP | 2008132560 | A | 6/2008 |
| JP | 2008194761 | A | 8/2008 |
| JP | 2008531305 | A | 8/2008 |
| JP | 2012512046 | A | 5/2012 |
| JP | 2012512047 | A | 5/2012 |
| JP | 2012512048 | A | 5/2012 |
| JP | 2012530615 | A | 12/2012 |
| JP | 5238725 | B2 | 7/2013 |
| JP | 5238726 | B2 | 7/2013 |
| JP | 2014503367 | A | 2/2014 |
| JP | 2017518889 | A | 7/2017 |
| JP | 2017538588 | A | 12/2017 |
| JP | 2018510073 | A | 4/2018 |
| KR | 1019890014409 | A | 10/1989 |
| KR | 1020020042840 | A | 6/2002 |
| KR | 20140106713 | A | 9/2014 |
| NL | 171464 | B1 | 11/1982 |
| WO | 94/02559 | A1 | 2/1994 |
| WO | 95/03370 | | 2/1995 |
| WO | 1995016756 | A1 | 6/1995 |
| WO | 1995017287 | A1 | 6/1995 |
| WO | 95/18192 | A1 | 7/1995 |
| WO | 95/20469 | A1 | 8/1995 |
| WO | 1996012776 | A1 | 5/1996 |
| WO | 1996014964 | A1 | 5/1996 |
| WO | 96/27189 | A1 | 9/1996 |
| WO | 9711484 | A1 | 3/1997 |
| WO | 97/14536 | A1 | 4/1997 |
| WO | 99/06500 | A1 | 2/1999 |
| WO | 99/14016 | A1 | 3/1999 |
| WO | 99/38817 | A1 | 8/1999 |
| WO | 1999038817 | A1 | 8/1999 |
| WO | 99/54424 | A1 | 10/1999 |
| WO | 0064630 | A1 | 11/2000 |
| WO | 0114494 | A1 | 3/2001 |
| WO | 0123323 | A1 | 4/2001 |
| WO | 02097150 | A2 | 12/2002 |
| WO | 03087236 | A1 | 10/2003 |
| WO | 2005080624 | A1 | 9/2005 |
| WO | 2005112601 | A2 | 12/2005 |
| WO | 2006027593 | A3 | 3/2006 |
| WO | 2006062597 | A1 | 6/2006 |
| WO | 2007041538 | A1 | 4/2007 |
| WO | 2009085578 | A2 | 7/2009 |
| WO | 2009085841 | A2 | 7/2009 |
| WO | 2009098017 | A1 | 8/2009 |
| WO | 2010077509 | A1 | 7/2010 |
| WO | 2010085587 | A1 | 7/2010 |
| WO | 2010118440 | A2 | 10/2010 |
| WO | 2010151201 | A1 | 12/2010 |
| WO | 2011005425 | A2 | 1/2011 |
| WO | 2011019188 | A1 | 2/2011 |
| WO | 2011068714 | A2 | 6/2011 |
| WO | 2011068724 | A2 | 6/2011 |
| WO | 2011087649 | A2 | 7/2011 |
| WO | 2011109188 | A2 | 9/2011 |

(56) References Cited

FOREIGN PATENT DOCUMENTS

| | | | |
|---|---|---|---|
| WO | 2011133438 | A1 | 10/2011 |
| WO | 2011139562 | A2 | 11/2011 |
| WO | 2011149625 | A2 | 12/2011 |
| WO | 2012018903 | A2 | 2/2012 |
| WO | 2012061016 | A1 | 5/2012 |
| WO | 2012061033 | A2 | 5/2012 |
| WO | 2012092590 | A2 | 7/2012 |
| WO | 2012092605 | A3 | 7/2012 |
| WO | 2010070294 | A1 | 8/2012 |
| WO | 2012112305 | A2 | 8/2012 |
| WO | 2012112322 | A2 | 8/2012 |
| WO | 2012092590 | A3 | 10/2012 |
| WO | 2012140617 | A1 | 10/2012 |
| WO | 2012141905 | A2 | 10/2012 |
| WO | 2013003830 | A2 | 1/2013 |
| WO | 2013003831 | A2 | 1/2013 |
| WO | 2013009484 | A2 | 1/2013 |
| WO | 2013036402 | A1 | 3/2013 |
| WO | 2013040423 | A2 | 3/2013 |
| WO | 2013045251 | A1 | 4/2013 |
| WO | 2013049239 | A1 | 4/2013 |
| WO | 2013070576 | A2 | 5/2013 |
| WO | 2013101575 | A1 | 7/2013 |
| WO | 2013102170 | A1 | 7/2013 |
| WO | 2013102176 | A1 | 7/2013 |
| WO | 2013102177 | A1 | 7/2013 |
| WO | 2013106597 | A1 | 7/2013 |
| WO | 2013106602 | A1 | 7/2013 |
| WO | 2013149209 | A1 | 10/2013 |
| WO | 2013151745 | A1 | 10/2013 |
| WO | 2013177446 | A1 | 11/2013 |
| WO | 2013186146 | A1 | 12/2013 |
| WO | 2013188038 | A1 | 12/2013 |
| WO | 2014005120 | A1 | 1/2014 |
| WO | 2014020068 | A1 | 2/2014 |
| WO | 2014020075 | A1 | 2/2014 |
| WO | 2014022453 | A1 | 2/2014 |
| WO | 2014022462 | A1 | 2/2014 |
| WO | 2014022465 | A1 | 2/2014 |
| WO | 2014161001 | A1 | 2/2014 |
| WO | 2014057273 | A1 | 4/2014 |
| WO | 2014062701 | A1 | 4/2014 |
| WO | 2014070468 | A1 | 5/2014 |
| WO | 2014106173 | A1 | 7/2014 |
| WO | 2014106211 | A1 | 7/2014 |
| WO | 2014124554 | A1 | 8/2014 |
| WO | 2014137972 | A1 | 9/2014 |
| WO | 2014140689 | A1 | 9/2014 |
| WO | 2014165390 | A1 | 10/2014 |
| WO | 2014176108 | A1 | 10/2014 |
| WO | 2014206739 | A1 | 12/2014 |
| WO | 2014206890 | A1 | 12/2014 |
| WO | 2014206967 | A1 | 12/2014 |
| WO | 2014209567 | A1 | 12/2014 |
| WO | 2014210160 | A1 | 12/2014 |
| WO | 2014210442 | A1 | 12/2014 |
| WO | 2014210532 | A1 | 12/2014 |
| WO | 2014210568 | A1 | 12/2014 |
| WO | 2015050781 | A1 | 4/2015 |
| WO | 2015073346 | A1 | 5/2015 |
| WO | 2015048768 | A9 | 6/2015 |
| WO | 2015088953 | A1 | 6/2015 |
| WO | 2015089527 | A1 | 6/2015 |
| WO | 2015089528 | A1 | 6/2015 |
| WO | 2015089529 | A1 | 6/2015 |
| WO | 2015100018 | A1 | 7/2015 |
| WO | 2015100020 | A1 | 7/2015 |
| WO | 2015100220 | A1 | 7/2015 |
| WO | 2015102992 | A1 | 7/2015 |
| WO | 2015112379 | A1 | 7/2015 |
| WO | 2015130487 | A1 | 9/2015 |
| WO | 2015143461 | A1 | 10/2015 |
| WO | 2015158009 | A1 | 10/2015 |
| WO | 2015160854 | A1 | 10/2015 |
| WO | 2015160855 | A1 | 10/2015 |
| WO | 2015160857 | A1 | 10/2015 |
| WO | 2015164211 | A1 | 10/2015 |
| WO | 2015165122 | A1 | 11/2015 |
| WO | 2015167910 | A1 | 11/2015 |
| WO | 2015179335 | A1 | 11/2015 |
| WO | 2015180005 | A1 | 12/2015 |
| WO | 2015184355 | A1 | 12/2015 |
| WO | 2016028683 | A1 | 2/2016 |
| WO | 2016044158 | A1 | 3/2016 |
| WO | 2016064726 | A1 | 4/2016 |
| WO | 2016089675 | A1 | 6/2016 |
| WO | 2016105469 | A1 | 6/2016 |
| WO | 2016105474 | A1 | 6/2016 |
| WO | 2016160357 | A1 | 10/2016 |
| WO | 2016161157 | A1 | 10/2016 |
| WO | 2016161170 | A1 | 10/2016 |
| WO | 2016167967 | A1 | 10/2016 |
| WO | 2016187570 | A1 | 11/2016 |
| WO | 2016196795 | A1 | 12/2016 |
| WO | 2016201104 | A1 | 12/2016 |
| WO | 2016205133 | A1 | 12/2016 |
| WO | 2016205267 | A1 | 12/2016 |
| WO | 2016210057 | A1 | 12/2016 |
| WO | 2017007703 | A1 | 1/2017 |
| WO | 2017007714 | A1 | 1/2017 |
| WO | 2017062482 | A1 | 4/2017 |
| WO | 2017083249 | A1 | 5/2017 |
| WO | 2017083255 | A1 | 5/2017 |
| WO | 2016105543 | A9 | 9/2017 |
| WO | 2017151498 | A1 | 9/2017 |
| WO | 2017197002 | A1 | 11/2017 |
| WO | 2017197006 | A1 | 11/2017 |
| WO | 2018010730 | A2 | 1/2018 |
| WO | 2018026669 | A1 | 2/2018 |
| WO | 2018057465 | A1 | 3/2018 |
| WO | 2018057558 | A1 | 3/2018 |
| WO | 2018063902 | A1 | 4/2018 |
| WO | 2018063958 | A1 | 4/2018 |
| WO | 2018063960 | A1 | 4/2018 |
| WO | 2018063962 | A1 | 4/2018 |
| WO | 2018064642 | A1 | 4/2018 |
| WO | 2018080703 | A1 | 5/2018 |
| WO | 2018080704 | A1 | 5/2018 |
| WO | 2018080705 | A1 | 5/2018 |
| WO | 2018080755 | A1 | 5/2018 |
| WO | 2018080756 | A1 | 5/2018 |
| WO | 2018080765 | A1 | 5/2018 |
| WO | 2018080778 | A1 | 5/2018 |
| WO | 2018080784 | A1 | 5/2018 |
| WO | 2018081246 | A1 | 5/2018 |
| WO | 2018118688 | A1 | 6/2018 |
| WO | 2018118690 | A1 | 6/2018 |
| WO | 2018118695 | A1 | 6/2018 |
| WO | 2018118699 | A1 | 6/2018 |
| WO | 2018134732 | A1 | 7/2018 |
| WO | 2018136268 | A1 | 7/2018 |
| WO | 2018136269 | A1 | 7/2018 |
| WO | 2018136271 | A1 | 7/2018 |
| WO | 2018172193 | A1 | 9/2018 |
| WO | 2018207145 | A1 | 11/2018 |
| WO | 2018226912 | A1 | 12/2018 |
| WO | 2018236989 | A1 | 12/2018 |
| WO | 2019001908 | A1 | 1/2019 |
| WO | 2019069157 | A1 | 4/2019 |
| WO | 2019102312 | A1 | 5/2019 |
| WO | 2019102328 | A1 | 5/2019 |
| WO | 2019102329 | A1 | 5/2019 |
| WO | 2019102330 | A1 | 5/2019 |
| WO | 2019102331 | A1 | 5/2019 |
| WO | 2019108805 | A2 | 6/2019 |
| WO | 2021161129 | A1 | 8/2019 |
| WO | 2019167022 | A1 | 9/2019 |
| WO | 2019197948 | A1 | 10/2019 |
| WO | 2019207415 | A1 | 10/2019 |
| WO | 2019207416 | A1 | 10/2019 |
| WO | 2019207417 | A1 | 10/2019 |
| WO | 2019207423 | A1 | 10/2019 |
| WO | 2019215571 | A1 | 11/2019 |
| WO | 2020025270 | A1 | 2/2020 |

(56) References Cited

FOREIGN PATENT DOCUMENTS

| | | | |
|---|---|---|---|
| WO | 2020035764 | A1 | 2/2020 |
| WO | 2020075005 | A1 | 4/2020 |
| WO | 2020079522 | A1 | 4/2020 |
| WO | 2020084382 | A1 | 4/2020 |
| WO | 2020084483 | A1 | 4/2020 |
| WO | 2020089741 | A1 | 5/2020 |
| WO | 2020115685 | A1 | 6/2020 |
| WO | 2020128708 | A1 | 6/2020 |
| WO | 2020128716 | A1 | 6/2020 |
| WO | 2020128717 | A1 | 6/2020 |
| WO | 2020128719 | A1 | 6/2020 |
| WO | 2020128720 | A2 | 6/2020 |
| WO | 2020128752 | A1 | 6/2020 |
| WO | 2020128779 | A2 | 6/2020 |
| WO | 2020128780 | A1 | 6/2020 |
| WO | 2020128781 | A1 | 6/2020 |
| WO | 2020128783 | A1 | 6/2020 |
| WO | 2020128787 | A1 | 6/2020 |
| WO | 2020128794 | A1 | 6/2020 |
| WO | 2020128833 | A1 | 6/2020 |
| WO | 2020128838 | A1 | 6/2020 |
| WO | 2020128842 | A1 | 6/2020 |
| WO | 2020128844 | A1 | 6/2020 |
| WO | 2020128845 | A1 | 6/2020 |
| WO | 2020128852 | A1 | 6/2020 |
| WO | 2020128853 | A1 | 6/2020 |
| WO | 2020128856 | A1 | 6/2020 |
| WO | 2020212788 | A1 | 10/2020 |
| WO | 2021009600 | A1 | 1/2021 |
| WO | 2021014271 | A1 | 1/2021 |
| WO | 2021074756 | A1 | 4/2021 |
| WO | 2021074768 | A1 | 4/2021 |
| WO | 2021079331 | A1 | 4/2021 |
| WO | 2021081571 | A1 | 5/2021 |
| WO | 2021105030 | A1 | 6/2021 |
| WO | 2021116883 | A1 | 6/2021 |
| WO | 2021133876 | A1 | 7/2021 |
| WO | 2021133888 | A1 | 7/2021 |
| WO | 2021133901 | A1 | 7/2021 |
| WO | 2021137092 | A1 | 7/2021 |
| WO | 2021179025 | A1 | 9/2021 |
| WO | 2021186326 | A1 | 9/2021 |
| WO | 2021214576 | A1 | 10/2021 |
| WO | 2021214605 | A1 | 10/2021 |
| WO | 2021234540 | A1 | 11/2021 |
| WO | 2022022905 | A1 | 2/2022 |
| WO | 2022022906 | A1 | 2/2022 |
| WO | 2022229744 | A1 | 11/2022 |
| WO | 2023130051 | A1 | 7/2023 |
| WO | 2023130052 | A1 | 7/2023 |
| WO | 2023130053 | A1 | 7/2023 |
| WO | 2023209518 | A1 | 11/2023 |
| WO | 2024127255 | A1 | 6/2024 |
| WO | 2024145523 | A1 | 7/2024 |

OTHER PUBLICATIONS

Maplesoft. wayback [retrieved from the internet on Oct. 17, 2025 from <URL:https://web.archive.org/web/20210509015502/https://www.maplesoft.com/support/help/maple/view.aspx?path=MathApps%2FTrianglesInteriorAndExteriorAngles>] (Year: 2021).*

Torre, "Investigation of Shaped Abrasive Particles vol. 1: Review of U.S. Pat. No. 6,054,093 Apr. 25, 2000" © Apr. 2011.

Austin, Benson M., "Thick-Film Screen Printing," Solid State Technology, Jun. 1969, pp. 53-58.

Avril, Nicolas Joseph "Manufacturing Glass-Fiber Reinforcement for Grinding Wheels" Massachusetts Institute of Technology, Feb. 1996, 105 pages.

Bacher, Rudolph J., "High Resolution Thick Film Printing," E.I. du Pont de Nemours & Company, Inc., Proceedings of the International Symposium on Microelectronics, 1986, pp. 576-581.

Besse, John R., "Understanding and controlling wheel truing and dressing forces when rotary plunge dressing," Cutting Tool Engineering, Jun. 2012, vol. 64, Issue 6, 4 pages.

Ciccotti, M. et al., "Complex dynamics in the peeling of an adhesive tape," International Journal of Adhesion & Adhesives 24 (2004) pp. 143-151.

Dupont, "Kevlar Aramid Pulp", Copyright 2011, DuPont, Accessed: Sep. 18, 2013, 2 pages.

Wu, J. et al., "Friction and Wear Properties of Kevlar Pulp Reinforced Epoxy Composite under Dry Sliding Condition", Tribology Letters, vol. 22, No. 3, Jun. 2006, pp. 259-263, Abstract only.

J. European Ceramic Society 31 (2011) 2073-2081, Abstract only.

Riemer, Dietrich E., "Analytical Engineering Model of the Screen Printing Process: Part II," Solid State Technology, Sep. 1988, pp. 85-90.

Miller, L.F., "Paste Transfer in the Screening Process," Solid State Technology, Jun. 1969, pp. 46-52.

Morgan, P. et al., "Ceramic Composites of Monazite and Alumina," J. Am. Ceram. Soc., 78, 1995, 1553-63.

Riemer, Dietrich E., "Analytical Engineering Model of the Screen Printing Process: Part I," Solid State Technology, Aug. 1988, pp. 107-111.

Winter Catalogue No. 5, Dressing tools, Winter diamond tools for dressing grinding wheels, Edition Year: 2010, 140 pages.

Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.

3M Cubitron II Abrasive Belts Brochure, Shaping the Future, Jan. 2011, 6 pages.

Vanstrum et al., Precisely Shaped Grain (PSG): 3M's Innovation in Abrasive Grain Technology, date unknown, 1 page.

Graf, "Cubitron II: Precision-Shaped Grain (PSG) Turns the Concept of Gear Grinding Upside Down," gearsolutions.com, May 2014, pp. 36-44.

DOW Machine Tool Accessories, Grinding & Surface Finishing, www.1mta.com, Nov. 2014, 72 pages.

VSM ACTIROX Fibre Discs, The Latest Generation of Abrasives for Maximum Stock Removal [PDF] VSM Abrasives Ltd., Apr. 2019 [retrieved on May 15, 2019], 8 pages. Retrieved from https://uk.vsmabrasives.com/fileadmin/user_upload/ACTIROX/VSM-ACTIROX-EN.pdf.

Kumar et al., "Composites by rapid prototyping technology", Material & Design, Feb. 2010, vol. 31, Issue 2, pp. 850-856.

Lewis et al., "Direct Ink Writing of Three-Dimensional Ceramic Structures", Journal of the American Ceramic Society, US, Nov. 30, 2006, vol. 89, Issue 12, pp. 3599-3609.

International Search Report with regard to International application No. PCT/US2017/031998, dated Aug. 21, 2017.

International Search Report with regard to International application No. PCT/US2017/031992, dated Aug. 21, 2017.

International Search Report and Written Opinion for Application No. PCT/US2016/036701, dated Sep. 1, 2016, 12 pages.

Brewer, L. et al., Journal of Materials Research, 1999, vol. 14, No. 10, pp. 3907-3912, Abstract only.

Lewis et al., "Direct Ink Writing of 3D Functional Materials", Advanced Functional Materials, 2006, 16, pp. 2193-2204.

International Search Report and Written Opinion for Application No. PCT/US2020/066817, mailed Apr. 15, 2021, 11 pages.

International Search Report and Written Opinion for Application No. PCT/US2014/058378, mailed Jan. 29, 2015, 18 pages.

International Search Report and Written Opinion for Application No. PCT/US2015/025825) mailed Jul. 16, 2015, 13 pages.

International Search Report and Written Opinion for PCT/US2023/086306 dated Apr. 25, 2024, 12 pages.

International Search Report and Written Opinion for PCT/US2020/066801 dated Apr. 2, 2021, 9 pages.

International Search Report and Written Opinion for PCT/US2015/000190 dated Dec. 23, 2015, 13 pages.

Rowenhorst 3D scans, Nov. 22, 1994, 30 pages.

* cited by examiner

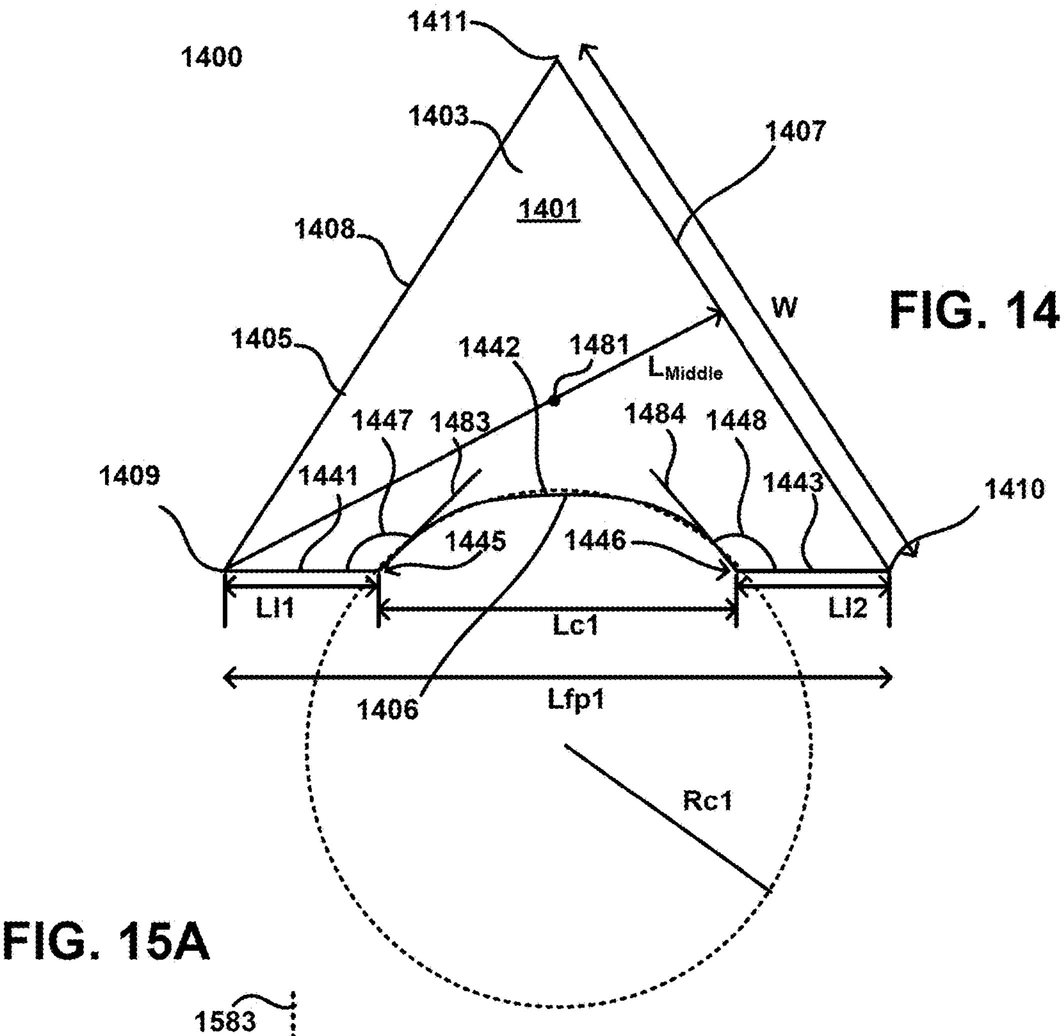
FIG. 14
FIG. 15A
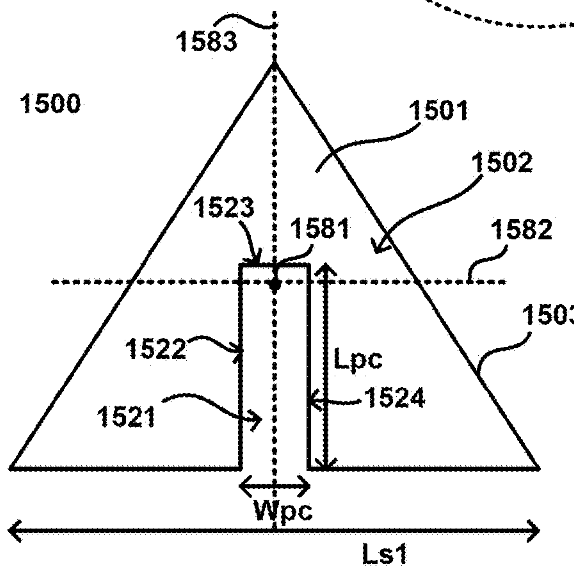
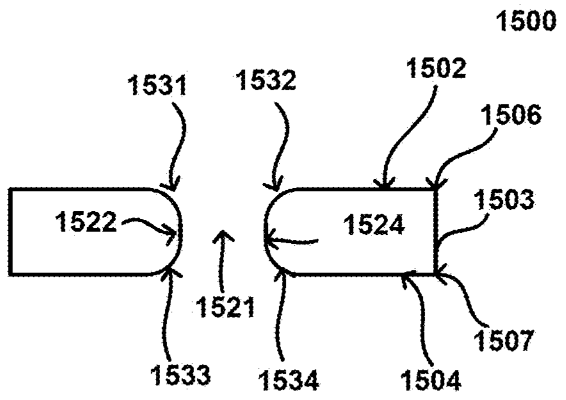
FIG. 15B

1900

ABRASIVE ARTICLE INCLUDING SHAPED ABRASIVE PARTICLES

CROSS-REFERENCE TO RELATED APPLICATION(S)

This application is a continuation application of and claims priority under 35 U.S.C. § 120 to U.S. patent application Ser. No. 16/900,732, entitled "ABRASIVE ARTICLE INCLUDING SHAPED ABRASIVE PARTICLES," by Ralph BAUER et al., filed Jun. 12, 2020, which is a continuation application of and claims priority under 35 U.S.C. § 120 to U.S. patent application Ser. No. 15/178,121, entitled "ABRASIVE ARTICLE INCLUDING SHAPED ABRASIVE PARTICLES," by Ralph BAUER et al., filed Jun. 9, 2016, now U.S. Pat. No. 10,711,171, which claims priority under 35 U.S.C. § 119(e) to U.S. Provisional Patent Application No. 62/174,304, entitled "ABRASIVE ARTICLE INCLUDING SHAPED ABRASIVE PARTICLES," by Ralph BAUER et al., filed Jun. 11, 2015, all of which are assigned to the current assignee hereof and incorporated herein by reference in their entireties.

BACKGROUND

Field of the Disclosure

The following is directed to abrasive articles, and particularly, abrasive articles including shaped abrasive particles.

Description of the Related Art

Abrasive particles and abrasive articles made from abrasive particles are useful for various material removal operations including grinding, finishing, and polishing. Depending upon the type of abrasive material, such abrasive particles can be useful in shaping or grinding a wide variety of materials and surfaces in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Three basic technologies that have been employed to produce abrasive particles having a specified shape are (1) fusion, (2) sintering, and (3) chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660 (disclosing a process including flowing molten abrasive material from a furnace onto a cool rotating casting cylinder, rapidly solidifying the material to form a thin semisolid curved sheet, densifying the semisolid material with a pressure roll, and then partially fracturing the strip of semisolid material by reversing its curvature by pulling it away from the cylinder with a rapidly driven cooled conveyor).

In the sintering process, abrasive particles can be formed from refractory powders having a particle size of up to 10 micrometers in diameter. Binders can be added to the powders along with a lubricant and a suitable solvent, e.g., water. The resulting mixture, mixtures, or slurries can be shaped into platelets or rods of various lengths and diameters. See, for example, U.S. Pat. No. 3,079,242 (disclosing a method of making abrasive particles from calcined bauxite material including (1) reducing the material to a fine powder, (2) compacting under affirmative pressure and forming the fine particles of said powder into grain sized agglomerations, and (3) sintering the agglomerations of particles at a temperature below the fusion temperature of the bauxite to induce limited recrystallization of the particles, whereby abrasive grains are produced directly to size).

Chemical ceramic technology involves converting a colloidal dispersion or hydrosol (sometimes called a sol), optionally in a mixture, with solutions of other metal oxide precursors, into a gel or any other physical state that restrains the mobility of the components, drying, and firing to obtain a ceramic material. See, for example, U.S. Pat. Nos. 4,744,802 and 4,848,041. Other relevant disclosures on shaped abrasive particles and associated methods of forming and abrasive articles incorporating such particles are available at: http://www.abel-ip.com/publications/.

Still, there remains a need in the industry for improving performance, life, and efficacy of abrasive particles, and the abrasive articles that employ abrasive particles.

SUMMARY

In an embodiment, a shaped abrasive particle includes a body having a first major surface, a second major surface, and a side surface joined to the first major surface and the second major surface, and wherein the body includes at least one partial cut extending from the side surface into the interior of the body.

In another embodiment, a shaped abrasive particle includes a body having a first surface, a second surface, and a side surface joined to the first surface and the second surface, wherein the body includes at least one partial cut having a length (Lpc) and width (Wpc) and wherein the body includes a strength, and wherein the combination of the length of the partial cut (Lpc), width of the partial cut (Wpc) and strength of the body have a relationship configured to control the friability of the body.

In another embodiment, a shaped abrasive particle includes a body having a first major surface, a second major surface, and a side surface joined to the first major surface and the second major, and wherein at least one edge defined by the joining of the side surface with the first major surface includes a depression having a curved contour.

In yet another embodiment, a shaped abrasive particle includes a body having a first major surface, a second major surface, and a side surface joined to the first major surface and the second major surface, and wherein the body includes a first exterior corner, a second exterior corner, and a third exterior corner, and wherein at least one of the first exterior corner, the second exterior corner, and the third exterior corner includes a discrete stepped depression.

In yet another embodiment, a shaped abrasive particle includes a body having a first major surface, a second major surface, and a side surface joined to the first major surface and the second major, and wherein the body includes a first exterior corner, second exterior corner, and third exterior corner, and wherein the body includes at least one discrete stepped depression extending between the first, second, and third exterior corners and further spaced apart from the first, second, and third exterior corners.

In a further embodiment, a shaped abrasive particle includes a body having a first major surface, a second major surface, and a side surface joined to the first major surface and the second major surface, wherein the side surface includes a first region extending for a majority of the height of the body and a second region including a flange extending outward from the side surface of the body and wherein the second region includes a maximum height extending for a minority of the height of the body.

In a further embodiment, a shaped abrasive particle includes a body having a first major surface, a second major surface, and a side surface joined to the first major surface and the second major, and further includes a protrusion extending for a distance above the first major surface, wherein the protrusion has a base and an upper region and wherein the base includes a different thickness compared to a thickness of the upper portion.

In still another embodiment, a shaped abrasive particle includes a body having a first major surface, a second major surface, and a side surface joined to the first major surface and the second major, wherein the side surface includes a depression extending peripherally around the body at a central region of the body and wherein the body includes at least one exterior corner with an average tip sharpness of not greater than 250 microns.

BRIEF DESCRIPTION OF THE DRAWINGS

The present disclosure may be better understood, and its numerous features and advantages made apparent to those skilled in the art by referencing the accompanying drawings.

FIG. 14 includes a top-down illustration of a shaped abrasive particle in accordance with an embodiment.

FIG. 15A includes a top-down illustration of a shaped abrasive particle in accordance with an embodiment.

FIG. 15B includes a cross-sectional view of a portion of the shaped abrasive particle of FIG. 15A.

DETAILED DESCRIPTION

The following is directed to abrasive articles including shaped abrasive particles. The methods herein may be utilized in forming shaped abrasive particles and using abrasive articles incorporating shaped abrasive particles. The shaped abrasive particles may be utilized in various applications, including for example coated abrasives, bonded abrasives, free abrasives, and a combination thereof. Various other uses may be derived for the shaped abrasive particles.

Shaped Abrasive Particles

Various methods may be utilized to obtain shaped abrasive particles. The particles may be obtained from a commercial source or fabricated. Some suitable processes used to fabricate the shaped abrasive particles can include, but is not limited to, additive manufacturing such as 3D printing, depositing, printing (e.g., screen-printing), molding, pressing, casting, sectioning, cutting, dicing, punching, pressing, drying, curing, coating, extruding, rolling, and a combination thereof. Shaped abrasive particles are formed such that each particle has substantially the same arrangement of surfaces and edges relative to each other for shaped abrasive particles having the same two-dimensional and three-dimensional shapes. As such, shaped abrasive particles can have a high shape fidelity and consistency in the arrangement of the surfaces and edges relative to other shaped abrasive particles of the group having the same two-dimensional and three-dimensional shape. By contrast, non-shaped abrasive particles can be formed through different process and have different shape attributes. For example, non-shaped abrasive particles are typically formed by a comminution process, wherein a mass of material is formed and then crushed and sieved to obtain abrasive particles of a certain size. However, a non-shaped abrasive particle will have a generally random arrangement of the surfaces and edges, and generally will lack any recognizable two-dimensional or three dimensional shape in the arrangement of the surfaces and edges around the body. Moreover, non-shaped abrasive particles of the same group or batch generally lack a consistent shape with respect to each other, such that the surfaces and edges are randomly arranged when compared to each other. Therefore, non-shaped grains or crushed grains have a significantly lower shape fidelity compared to shaped abrasive particles.

Figure 1:
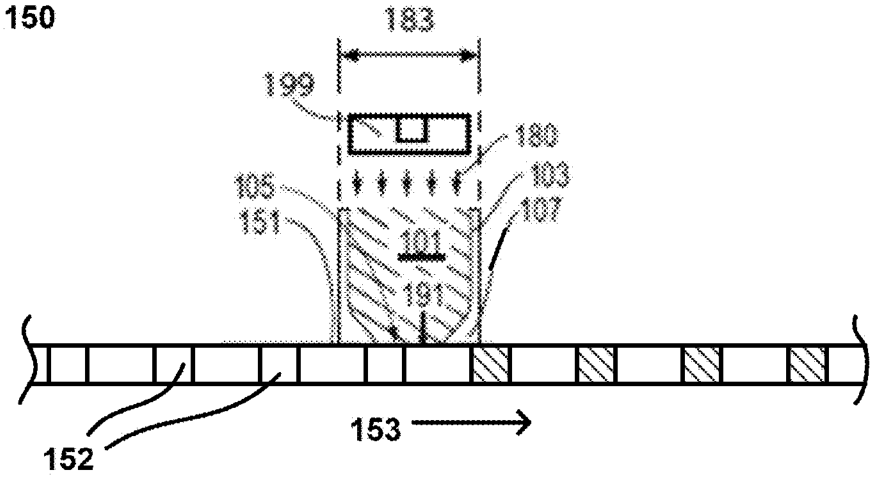
FIG. 1 includes a portion of a system for forming a particulate material in accordance with an embodiment.

FIG. 1 includes an illustration of a system 150 for forming a shaped abrasive particle in accordance with one, non-limiting embodiment. The process of forming shaped abrasive particles can be initiated by forming a mixture 101 including a ceramic material and a liquid. In particular, the mixture 101 can be a gel formed of a ceramic powder material and a liquid. In accordance with an embodiment, the gel can be formed of the ceramic powder material as an integrated network of discrete particles.

The mixture 101 may contain a certain content of solid material, liquid material, and additives such that it has suitable rheological characteristics for use with the process detailed herein. That is, in certain instances, the mixture can have a certain viscosity, and more particularly, suitable rheological characteristics that form a dimensionally stable phase of material that can be formed through the process as noted herein. A dimensionally stable phase of material is a material that can be formed to have a particular shape and substantially maintain the shape for at least a portion of the processing subsequent to forming. In certain instances, the shape may be retained throughout subsequent processing, such that the shape initially provided in the forming process is present in the finally-formed object. It will be appreciated that in some instances, the mixture 101 may not be a shape-stable material, and the process may rely upon solidification and stabilization of the mixture 101 by further processing, such as drying.

The mixture 101 can be formed to have a particular content of solid material, such as the ceramic powder material. For example, in one embodiment, the mixture 101 can have a solids content of at least about 25 wt %, such as at least about 35 wt %, or even at least about 38 wt % for the total weight of the mixture 101. Still, in at least one non-limiting embodiment, the solids content of the mixture 101 can be not greater than about 75 wt %, such as not greater than about 70 wt %, not greater than about 65 wt %, not greater than about 55 wt %, not greater than about 45 wt %, or not greater than about 42 wt %. It will be appreciated that the content of the solid materials in the mixture 101 can be within a range between any of the minimum and maximum percentages noted above.

According to one embodiment, the ceramic powder material can include an oxide, a nitride, a carbide, a boride, an oxycarbide, an oxynitride, and a combination thereof. In particular instances, the ceramic material can include alumina. More specifically, the ceramic material may include a boehmite material, which may be a precursor of alpha alumina. The term "boehmite" is generally used herein to denote alumina hydrates including mineral boehmite, typically being $Al_2O_3 \cdot H_2O$ and having a water content on the order of 15%, as well as pseudoboehmite, having a water content higher than 15%, such as 20-38% by weight. It is noted that boehmite (including pseudoboehmite) has a particular and identifiable crystal structure, and therefore a unique X-ray diffraction pattern. As such, boehmite is distinguished from other aluminous materials including other hydrated aluminas such as ATH (aluminum trihydroxide), a common precursor material used herein for the fabrication of boehmite particulate materials.

Furthermore, the mixture 101 can be formed to have a particular content of liquid material. Some suitable liquids may include water. In accordance with one embodiment, the mixture 101 can be formed to have a liquid content less than the solids content of the mixture 101. In more particular instances, the mixture 101 can have a liquid content of at least about 25 wt % for the total weight of the mixture 101. In other instances, the amount of liquid within the mixture 101 can be greater, such as at least about 35 wt %, at least about 45 wt %, at least about 50 wt %, or even at least about 58 wt %. Still, in at least one non-limiting embodiment, the liquid content of the mixture can be not greater than about 75 wt %, such as not greater than about 70 wt %, not greater than about 65 wt %, not greater than about 62 wt %, or even not greater than about 60 wt %. It will be appreciated that the content of the liquid in the mixture 101 can be within a range between any of the minimum and maximum percentages noted above.

Furthermore, to facilitate processing and forming shaped abrasive particles according to embodiments herein, the mixture 101 can have a particular storage modulus. For example, the mixture 101 can have a storage modulus of at least about $1\times10^4$ Pa, such as at least about $4\times10^4$ Pa, or even at least about $5\times10^4$ Pa. However, in at least one non-limiting embodiment, the mixture 101 may have a storage modulus of not greater than about $1\times10^7$ Pa, such as not greater than about $2\times10^6$ Pa. It will be appreciated that the storage modulus of the mixture 101 can be within a range between any of the minimum and maximum values noted above.

The storage modulus can be measured via a parallel plate system using ARES or AR-G2 rotational rheometers, with Peltier plate temperature control systems. For testing, the mixture 101 can be extruded within a gap between two plates that are set to be approximately 8 mm apart from each other. After extruding the gel into the gap, the distance between the two plates defining the gap is reduced to 2 mm until the mixture 101 completely fills the gap between the plates. After wiping away excess mixture, the gap is decreased by 0.1 mm and the test is initiated. The test is an oscillation strain sweep test conducted with instrument settings of a strain range between 0.01% to 100%, at 6.28 rad/s (1 Hz), using 25-mm parallel plate and recording 10 points per decade. Within 1 hour after the test completes, the gap is lowered again by 0.1 mm and the test is repeated. The test can be repeated at least 6 times. The first test may differ from the second and third tests. Only the results from the second and third tests for each specimen should be reported.

Furthermore, to facilitate processing and forming shaped abrasive particles according to embodiments herein, the mixture 101 can have a particular viscosity. For example, the mixture 101 can have a viscosity of at least about $2\times10^3$ Pa s, such as at least about $3\times10^3$ Pa s, at least about $4\times10^3$ Pa s, at least about $5\times10^3$ Pa s, at least about $6\times10^3$ Pa s, at least about $8\times10^3$ Pa s, at least about $10\times10^3$ Pa s, at least about $20\times10^3$ Pa s, at least about $30\times10^3$ Pa s, at least about $40\times10^3$ Pa s, at least about $50\times10^3$ Pa s, at least about $60\times10^3$ Pa s, or at least about $65\times10^3$ Pa s. In at least one non-limiting embodiment, the mixture 101 may have a viscosity of not greater than about $100\times10^3$ Pa s, such as not greater than about $95\times10^3$ Pa s, not greater than about $90\times10^3$ Pa s, or even not greater than about $85\times10^3$ Pa s. It will be appreciated that the viscosity of the mixture 101 can be within a range between any of the minimum and maximum values noted above. The viscosity can be measured in the same manner as the storage modulus as described above.

Moreover, the mixture 101 can be formed to have a particular content of organic materials including, for example, organic additives that can be distinct from the liquid to facilitate processing and formation of shaped abrasive particles according to the embodiments herein. Some suitable organic additives can include stabilizers, binders such as fructose, sucrose, lactose, glucose, UV curable resins, and the like.

Notably, the embodiments herein may utilize a mixture 101 that can be distinct from slurries used in conventional forming operations. For example, the content of organic materials within the mixture 101 and, in particular, any of the organic additives noted above, may be a minor amount as compared to other components within the mixture 101. In at least one embodiment, the mixture 101 can be formed to have not greater than about 30 wt % organic material for the total weight of the mixture 101. In other instances, the amount of organic materials may be less, such as not greater than about 15 wt %, not greater than about 10 wt %, or even not greater than about 5 wt %. Still, in at least one non-limiting embodiment, the amount of organic materials within the mixture 101 can be at least about 0.01 wt %, such as at least about 0.5 wt % for the total weight of the mixture 101. It will be appreciated that the amount of organic materials in the mixture 101 can be within a range between any of the minimum and maximum values noted above.

Moreover, the mixture 101 can be formed to have a particular content of acid or base, distinct from the liquid content, to facilitate processing and formation of shaped abrasive particles according to the embodiments herein. Some suitable acids or bases can include nitric acid, sulfuric acid, citric acid, chloric acid, tartaric acid, phosphoric acid, ammonium nitrate, and ammonium citrate. According to one particular embodiment in which a nitric acid additive is used, the mixture 101 can have a pH of less than about 5, and more particularly, can have a pH within a range between about 2 and about 4.

The system 150 of FIG. 1, can include a die 103. As illustrated, the mixture 101 can be provided within the interior of the die 103 and configured to be extruded through a die opening 105 positioned at one end of the die 103. As further illustrated, extruding can include applying a force 180 on the mixture 101 to facilitate extruding the mixture 101 through the die opening 105. During extrusion within an application zone 183, a tool 151 can be in direct contact with a portion of the die 103 and facilitate extrusion of the mixture 101 into the tool cavities 152. The tool 151 can be in the form of a screen, such as illustrated in FIG. 1, wherein the cavities 152 extend through the entire thickness of the tool 151. Still, it will be appreciated that the tool 151 may be formed such that the cavities 152 extend for a portion of the entire thickness of the tool 151 and have a bottom surface, such that the volume of space configured to hold and shape the mixture 101 is defined by a bottom surface and side surfaces.

The tool 151 may be formed of a metal material, including for example, a metal alloy, such as stainless steel. In other instances, the tool 151 may be formed of an organic material, such as a polymer.

In accordance with an embodiment, a particular pressure may be utilized during extrusion. For example, the pressure can be at least about 10 kPa, such as at least about 500 kPa. Still, in at least one non-limiting embodiment, the pressure utilized during extrusion can be not greater than about 4 MPa. It will be appreciated that the pressure used to extrude the mixture 101 can be within a range between any of the minimum and maximum values noted above. In particular instances, the consistency of the pressure delivered by a piston 199 may facilitate improved processing and formation of shaped abrasive particles. Notably, controlled delivery of consistent pressure across the mixture 101 and across the width of the die 103 can facilitate improved processing control and improved dimensional characteristics of the shaped abrasive particles.

Prior to depositing the mixture 101 in the tool cavities 152, a mold release agent can be applied to the surfaces of the tool cavities 152, which may facilitate removal of precursor shaped abrasive particles from the tool cavities 152 after further processing. Such a process can be optional and may not necessarily be used to conduct the molding process. A suitable exemplary mold release agent can include an organic material, such as one or more polymers (e.g., PTFE). In other instances, an oil (synthetic or organic) may be applied as a mold release agent to the surfaces of the tool cavities 152. One suitable oil may be peanut oil. The mold release agent may be applied using any suitable manner, including but not limited to, depositing, spraying, printing, brushing, coating, and the like.

The mixture 101 may be deposited within the tool cavities 152, which may be shaped in any suitable manner to form shaped abrasive particles having shapes corresponding to the shape of the tool cavities 152.

Figure 2:
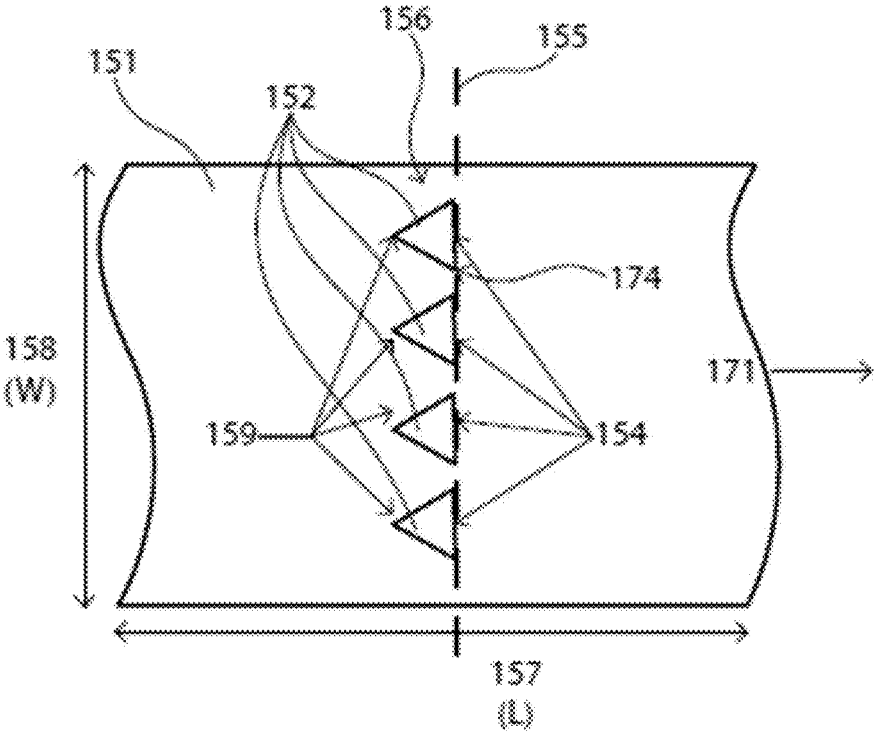
FIG. 2 includes a portion of the system of FIG. 1 for forming a particulate material in accordance with an embodiment.

Referring briefly to FIG. 2, a portion of the tool 151 is illustrated. As shown, the tool 151 can include the tool cavities 152, and more particularly, a plurality of tool cavities 152 extending into the volume of the tool 151. In accordance with an embodiment, the tool cavities 152 can have a two-dimensional shape as viewed in a plane defined by the length (l) and width (w) of the tool 151. The two-dimensional shape can include various shapes such as, for example, polygons, ellipsoids, numerals, Greek alphabet letters, Latin alphabet letters, Russian alphabet characters, complex shapes including a combination of polygonal shapes, and a combination thereof. In particular instances, the tool cavities 152 may have two-dimensional polygonal shapes such as a rectangle, a quadrilateral, a pentagon, a hexagon, a heptagon, an octagon, a nonagon, a decagon, and a combination thereof. Notably, as will be appreciated in further reference to the shaped abrasive particles of the embodiments herein, the tool cavities 152 may utilize various other shapes.

While the tool 151 of FIG. 2 is illustrated as having tool cavities 152 oriented in a particular manner relative to each other, it will be appreciated that various other orientations may be utilized. In accordance with one embodiment, each of the tool cavities 152 can have substantially the same orientation relative to each other, and substantially the same orientation relative to the surface of the screen. For example, each of the tool cavities 152 can have a first edge 154 defining a first plane 155 for a first row 156 of the tool cavities 152 extending laterally across a lateral axis 158 of the tool 151. The first plane 155 can extend in a direction substantially orthogonal to a longitudinal axis 157 of the tool 151. However, it will be appreciated, that in other instances, the tool cavities 152 need not necessarily have the same orientation relative to each other.

Moreover, the first row 156 of tool cavities 152 can be oriented relative to a direction of translation to facilitate particular processing and controlled formation of shaped abrasive particles. For example, the tool cavities 152 can be arranged on the tool 151 such that the first plane 155 of the first row 156 defines an angle relative to the direction of translation 171. As illustrated, the first plane 155 can define an angle that is substantially orthogonal to the direction of translation 171. Still, it will be appreciated that in one embodiment, the tool cavities 152 can be arranged on the tool 151 such that the first plane 155 of the first row 156 defines a different angle with respect to the direction of translation, including for example, an acute angle or an obtuse angle. Still, it will be appreciated that the tool cavities 152 may not necessarily be arranged in rows. The tool cavities 152 may be arranged in various particular ordered distributions with respect to each other on the tool 151, such as in the form of a two-dimensional pattern. Alternatively, the openings may be disposed in a random manner on the tool 151.

Referring again to FIG. 1, during operation of the system 150, the tool 151 can be translated in a direction 153 to facilitate a continuous molding operation. As will be appreciated, the tool 151 may be in the form of a continuous belt, which can be translated over rollers to facilitate continuous processing. In some embodiments, the tool 151 can be translated while extruding the mixture 101 through the die opening 105. As illustrated in the system 150, the mixture 101 may be extruded in a direction 191. The direction of translation 153 of the tool 151 can be angled relative to the direction of extrusion 191 of the mixture 101. While the angle between the direction of translation 153 and the direction of extrusion 191 is illustrated as substantially orthogonal in the system 100, other angles are contemplated, including for example, an acute angle or an obtuse angle. After the mixture 101 is extruded through the die opening 105, the mixture 101 and tool 151 may be translated under a knife edge 107 attached to a surface of the die 103. The knife edge 107 may define a region at the front of the die 103 that facilitates displacement of the mixture 101 into the tool cavities 152 of the tool 151.

In the molding process, the mixture 101 may undergo significant drying while contained in the tool cavity 152. Therefore, shaping may be primarily attributed to substantial drying and solidification of the mixture 101 in the tool cavities 152 to shape the mixture 101. In certain instances, the shaped abrasive particles formed according to the molding process may exhibit shapes more closely replicating the features of the mold cavity compared to other processes, including for example, screen printing processes. However, it should be noted that certain beneficial shape characteristics may be more readily achieved through screen printing processes (e.g., flashing and differential heights).

After applying the mold release agent, the mixture 101 can be deposited within the mold cavities and dried. Drying may include removal of a particular content of certain materials from the mixture 101, including volatiles, such as water or organic materials. In accordance with an embodiment, the drying process can be conducted at a drying temperature of not greater than about 300° C., such as not greater than about 250° C., not greater than about 200° C., not greater than about 150° C., not greater than about 100° C., not greater than about 80° C., not greater than about 60° C., not greater than about 40° C., or even not greater than about 30° C. Still, in one non-limiting embodiment, the drying process may be conducted at a drying temperature of at least about −20° C., such as at least about −10° C. at least about 0° C. at least about 5° C. at least about 10° C., or even at least about 20° C. It will be appreciated that the drying temperature may be within a range between any of the minimum and maximum temperatures noted above.

In certain instances, drying may be conducted for a particular duration to facilitate the formation of shaped abrasive particles according to embodiments herein. For example, drying can be conducted for a duration of at least about 30 seconds, such as at least about 1 minute, such as at least about 2 minutes, at least about 4 minutes, at least about 6 minutes, at least about 8 minutes, at least about 10 minutes, such as at least about 30 minutes, at least about 1 hour, at least about 2 hours, at least about 4 hours, at least about 8 hours, at least about 12 hours, at least about 15 hours, at least about 18 hours, at least about 24 hours. In still other instances, the process of drying may be not greater than about 30 hours, such as not greater than about 24 hours, not greater than about 20 hours, not greater than about 15 hours, not greater than about 12 hours, not greater than about 10 hours, not greater than about 8 hours, not greater than about 6 hours, not greater than about 4 hours. It will be appreciated that the duration of drying can be within a range between any of the minimum and maximum values noted above.

Additionally, drying may be conducted at a particular relative humidity to facilitate formation of shaped abrasive particles according to the embodiments herein. For example, drying may be conducted at a relative humidity of at least about 20%, at least about 30%, at least about 40%, at least about 50%, at least about 60%, such as at least about 62%, at least about 64%, at least about 66%, at least about 68%, at least about 70%, at least about 72%, at least about 74%, at least about 76%, at least about 78%, or even at least about 80%. In still other non-limiting embodiments, drying may be conducted at a relative humidity of not greater than about 90%, such as not greater than about 88%, not greater than about 86%, not greater than about 84%, not greater than about 82%, not greater than about 80%, not greater than about 78%, not greater than about 76%, not greater than about 74%, not greater than about 72%, not greater than about 70%, not greater than about 65%, not greater than about 60%, not greater than about 55%, not greater than about 50%, not greater than about 45%, not greater than about 40%, not greater than about 35%, not greater than about 30%, or even not greater than about 25%. It will be appreciated that the relative humidity utilized during drying can be within a range between any of the minimum and maximum percentages noted above.

After completing the drying process, the mixture 101 can be released from the tool cavities 152 to produce precursor shaped abrasive particles. Notably, before the mixture 101 is removed from the tool cavities 152 or after the mixture 101 is removed and the precursor shaped abrasive particles are formed, one or more post-forming processes may be completed. Such processes can include surface shaping, curing, reacting, radiating, planarizing, calcining, sintering, sieving, doping, and a combination thereof. For example, in one optional process, the mixture 101 or precursor shaped abrasive particles may be translated through an optional shaping zone, wherein at least one exterior surface of the mixture or precursor shaped abrasive particles may be shaped. In still another embodiment, the mixture 101 as contained in the mold cavities or the precursor shaped abrasive particles may be translated through an optional application zone, wherein a dopant material can be applied. In particular instances, the process of applying a dopant material can include selective placement of the dopant material on at least one exterior surface of the mixture 101 or precursor shaped abrasive particles.

The dopant material may be applied utilizing various methods including for example, spraying, dipping, depositing, impregnating, transferring, punching, cutting, pressing, crushing, and any combination thereof. In accordance with an embodiment, applying a dopant material can include the application of a particular material, such as a precursor. In certain instances, the precursor can be a salt, such as a metal salt, that includes a dopant material to be incorporated into the finally-formed shaped abrasive particles. For example, the metal salt can include an element or compound that is the precursor to the dopant material. It will be appreciated that the salt material may be in liquid form, such as in a dispersion comprising the salt and liquid carrier. The salt may include nitrogen, and more particularly, can include a nitrate. In other embodiments, the salt can be a chloride, sulfate, phosphate, and a combination thereof. In one embodiment, the salt can include a metal nitrate, and more particularly, consist essentially of a metal nitrate. In one embodiment, the dopant material can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, chromium, cobalt, iron, germanium, manganese, nickel, titanium, zinc, and a combination thereof.

The molding process may further include a sintering process. For certain embodiments herein, sintering can be conducted after removing the mixture from the tool cavities 152 and forming the precursor shaped abrasive particles. Sintering of the precursor shaped abrasive particles 123 may be utilized to densify the particles, which are generally in a green state. In a particular instance, the sintering process can facilitate the formation of a high-temperature phase of the ceramic material. For example, in one embodiment, the precursor shaped abrasive particles may be sintered such that a high-temperature phase of alumina, such as alpha alumina, is formed. In one instance, a shaped abrasive particle can comprise at least about 90 wt % alpha alumina for the total weight of the particle. In other instances, the content of alpha alumina may be greater such that the shaped abrasive particle may consist essentially of alpha alumina.

The body of the finally-formed shaped abrasive particles can have particular two-dimensional shapes. For example, the body can have a two-dimensional shape, as viewed in a plane defined by the length and width of the body, and can have a shape including a polygonal shape, ellipsoidal shape, a numeral, a Greek alphabet character, a Latin alphabet character, a Russian alphabet character, a complex shape utilizing a combination of polygonal shapes and a combination thereof. Particular polygonal shapes include rectangular, trapezoidal, pentagonal, hexagonal, heptagonal, octagonal, nonagonal, decagonal, and any combination thereof. In another instance, the finally-formed shaped abrasive particles can have a body having a two-dimensional shape such as an irregular quadrilateral, an irregular rectangle, an irregular trapezoid, an irregular pentagon, an irregular hexagon, an irregular heptagon, an irregular octagon, an irregular nonagon, an irregular decagon, and a combination thereof. An irregular polygonal shape is one where at least one of the sides defining the polygonal shape is different in dimension (e.g., length) with respect to another side. As illustrated in other embodiments herein, the two-dimensional shape of certain shaped abrasive particles can have a particular number of exterior points or external corners. For example, the body of the shaped abrasive particles can have a two-dimensional polygonal shape as viewed in a plane defined by a length and width, wherein the body comprises a two-dimensional shape having at least 4 exterior points (e.g., a quadrilateral), at least 5 exterior points (e.g., a pentagon), at least 6 exterior points (e.g., a hexagon), at least 7 exterior points (e.g., a heptagon), at least 8 exterior points (e.g., an octagon), at least 9 exterior points (e.g., a nonagon), and the like.

Figure 3:
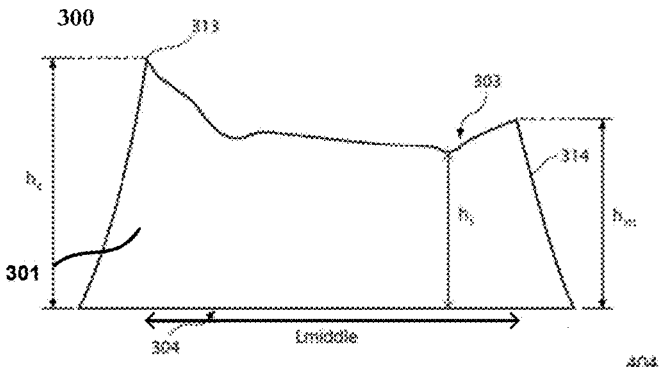
FIG. 3 includes a cross-sectional illustration of a shaped abrasive particle for illustration of certain features according to embodiments.

FIG. 3 includes a cross-sectional illustration of a shaped abrasive particle to illustrate certain features of shaped abrasive particles of the embodiments herein. It will be appreciated that such a cross-sectional view can be applied to any of the exemplary shaped abrasive particles of the embodiments to determine one or more shape aspects or dimensional characteristics as described herein. The body of the shaped abrasive particle can include an upper major surface 303 (i.e., a first major surface) and a bottom major surface 304 (i.e., a second major surface) opposite the upper major surface 303. The upper surface 303 and the bottom surface 304 can be separated from each other by a side surface 314.

In certain instances, the shaped abrasive particles of the embodiments herein can have an average difference in height, which is a measure of the difference between hc and hm. Notably, the dimension of Lmiddle can be a length defining a distance between a height at a corner (hc) and a height at a midpoint edge (hm) opposite the corner. Moreover, the body 301 can have an interior height (hi), which can be the smallest dimension of height of the body 301 as measured along a dimension between any corner and opposite midpoint edge on the body 301. For convention herein, average difference in height will be generally identified as hc-hm, however it is defined as an absolute value of the difference. Therefore, it will be appreciated that average difference in height may be calculated as hm-hc when the height of the body 301 at the side surface 314 is greater than the height at the corner 313. More particularly, the average difference in height can be calculated based upon a plurality of shaped abrasive particles from a suitable sample size. The heights hc and hm of the particles can be measured using a STIL (Sciences et Techniques Industrielles de la Lumiere—France) Micro Measure 3D Surface Profilometer (white light (LED) chromatic aberration technique) and the average difference in height can be calculated based on the average values of hc and hm from the sample.

As illustrated in FIG. 3, in one particular embodiment, the body 301 of the shaped abrasive particle 300 can have an average difference in height, which can be the absolute value of [hc-hm] between the first corner height (hc) and the second midpoint height (hm) that is quite low, such that the particle is relatively flat, having an average difference in height that is not greater than about 300 microns, such as not greater than about 250 microns, not greater than about 220 microns, not greater than about 180 microns, not greater than about 150 microns, not greater than about 100 microns, not greater than about 50 microns, or even not greater than about 20 microns.

The body of the shaped abrasive particles herein can include a width (w) that is the longest dimension of the body and extending along a side. The shaped abrasive particles can include a length that extends through a midpoint (which may be along a major surface) of the body and bisecting the body (i.e., Lmiddle). The body can further include a height (h), which may be a dimension of the body extending in a direction perpendicular to the length and width in a direction defined by a side surface of the body 301. In specific instances, the width can be greater than or equal to the length, the length can be greater than or equal to the height, and the width can be greater than or equal to the height.

In particular instances, the body 301 can be formed to have a primary aspect ratio, which is a ratio expressed as width:length, having a value of at least 1:1. In other instances, the body 301 can be formed such that the primary aspect ratio (w:l) is at least about 1.5:1, such as at least about 2:1, at least about 4:1, or even at least about 5:1. Still, in other instances, the abrasive particle 300 can be formed such that the body 301 has a primary aspect ratio that is not greater than about 10:1, such as not greater than 9:1, not greater than about 8:1, or even not greater than about 5:1. It will be appreciated that the body 301 can have a primary aspect ratio within a range between any of the ratios noted above. Furthermore, it will be appreciated that reference herein to a height can be reference to the maximum height measurable of the abrasive particle 300.

In addition to the primary aspect ratio, the abrasive particle 300 can be formed such that the body 301 comprises a secondary aspect ratio, which can be defined as a ratio of length:height, wherein the height is an interior median height (Mhi). In certain instances, the secondary aspect ratio can be at least about 1:1, such as at least about 2:1, at least about 4:1, or even at least about 5:1. Still, in other instances, the abrasive particle 300 can be formed such that the body 301 has a secondary aspect ratio that is not greater than about 1:3, such as not greater than 1:2, or even not greater than about 1:1. It will be appreciated that the body 301 can have a secondary aspect ratio within a range between any of the ratios noted above, such as within a range between about 5:1 and about 1:1.

In accordance with another embodiment, the abrasive particle 300 can be formed such that the body 301 comprises a tertiary aspect ratio, defined by the ratio width:height, wherein the height is an interior median height (Mhi). The tertiary aspect ratio of the body 301 can be can be at least about 1:1, such as at least about 2:1, at least about 4:1, at least about 5:1, or even at least about 6:1. Still, in other instances, the abrasive particle 300 can be formed such that the body 301 has a tertiary aspect ratio that is not greater than about 3:1, such as not greater than 2:1, or even not greater than about 1:1. It will be appreciated that the body 301 can have a tertiary aspect ratio within a range between any of the ratios noted above, such as within a range between about 6:1 and about 1:1.

According to one embodiment, the body 301 of the shaped abrasive particle 300 can have particular dimensions, which may facilitate improved performance. For example, in one instance, the body 301 can have an interior height (hi), which can be the smallest dimension of height of the body 301 as measured along a dimension between any corner and opposite midpoint edge on the body 301. In particular instances, the interior height (hi) may be the smallest dimension of height (i.e., measure between the bottom surface 304 and the upper surface 305) of the body 301 for three measurements taken between each of the exterior corners and the opposite midpoint edges. The interior height (hi) of the body 301 of a shaped abrasive particle 300 is illustrated in FIG. 3. In a particular instance, the interior height (hi) of the body 301 of a shaped abrasive particle 300 can be determined by generating a topographical top view of the body 301. A suitable program for such includes ImageJ software. Opposite major surfaces of the body 301 can be scanned to generate a representation of the body 301. The perimeter of both major surfaces can be identified and the minimum height and topography of each major surface can be determined using a clustering method, such as Otsu's method. The interior height (hi) can be determined from the minimum height and topography of the analyzed first and second major surfaces.

According to one embodiment, the interior height (hi) can be at least about 20% of the width (w). In one particular embodiment, the height (hi) can be at least about 22% of the width, such as at least about 25%, at least about 30%, or even at least about 33%, of the width of the body 301. For one non-limiting embodiment, the height (hi) of the body 301 can be not greater than about 80% of the width of the body 301, such as not greater than about 76%, not greater than about 73%, not greater than about 70%, not greater than about 68% of the width, not greater than about 56% of the width, not greater than about 48% of the width, or even not greater than about 40% of the width. It will be appreciated that the height (hi) of the body 301 can be within a range between any of the above noted minimum and maximum percentages.

A batch of shaped abrasive particles can be fabricated where the median interior height value (Mhi) can be controlled, which may facilitate improved performance. In particular, the median internal height (hi) of a batch can be related to a median width of the shaped abrasive particles of the batch in the same manner as described above. Notably, the median interior height (Mhi) can be at least about 20% of the width, such as at least about 22%, at least about 25%, at least about 30%, or even at least about 33% of the median width of the shaped abrasive particles of the batch. For one non-limiting embodiment, the median interior height (Mhi) of the body 301 can be not greater than about 80%, such as not greater than about 76%, not greater than about 73%, not greater than about 70%, not greater than about 68% of the width, not greater than about 56% of the width, not greater than about 48% of the width, or even not greater than about 40% of the median width of the body 301. It will be appreciated that the median interior height (Mhi) of the body 301 can be within a range between any of the above noted minimum and maximum percentages.

Furthermore, the batch of shaped abrasive particles may exhibit improved dimensional uniformity as measured by the standard deviation of a dimensional characteristic from a suitable sample size. According to one embodiment, the shaped abrasive particles can have an interior height variation (Vhi), which can be calculated as the standard deviation of interior height (hi) for a suitable sample size of particles from a batch. According to one embodiment, the interior height variation can be not greater than about 60 microns, such as not greater than about 58 microns, not greater than about 56 microns, or even not greater than about 54 microns. In one non-limiting embodiment, the interior height variation (Vhi) can be at least about 2 microns. It will be appreciated that the interior height variation of the body can be within a range between any of the above noted minimum and maximum values.

For another embodiment, the body 301 of the shaped abrasive particle 300 can have a height, which may be an interior height (hi), of at least about 70 microns. More particularly, the height may be at least about 80 microns, such as at least about 90 microns, at least about 100 microns, at least about 110 microns, at least about 120 microns, at least about 150 microns, at least about 175 microns, at least about 200 microns, at least about 225 microns, at least about 250 microns, at least about 275 microns, or even at least about 300 microns. In still one non-limiting embodiment, the height of the body 301 can be not greater than about 3 mm, such as not greater than about 2 mm, not greater than about 1.5 mm, not greater than about 1 mm, or even not greater than about 800 microns, not greater than about 600 microns, not greater than about 500 microns, not greater than about 475 microns, not greater than about 450 microns, not greater than about 425 microns, not greater than about 400 microns, not greater than about 375 microns, not greater than about 350 microns, not greater than about 325 microns, not greater than about 300 microns, not greater than about 275 microns, or even not greater than about 250 microns. It will be appreciated that the height of the body 301 can be within a range between any of the above noted minimum and maximum values. Moreover, it will be appreciated that the above range of values can be representative of a median interior height (Mhi) value for a batch of shaped abrasive particles.

For certain embodiments herein, the body 301 of the shaped abrasive particle 300 can have particular dimensions, including for example, a width≥length, a length≥height, and a width≥height. More particularly, the body 301 of the shaped abrasive particle 300 can have a width (w) of at least about 200 microns, such as at least about 250 microns, at least about 300 microns, at least about 350 microns, at least about 400 microns, at least about 450 microns, at least about 500 microns, at least about 550 microns, at least about 600 microns, at least about 700 microns, at least about 800 microns, or even at least about 900 microns. In one non-limiting instance, the body 301 can have a width of not greater than about 4 mm, such as not greater than about 3 mm, not greater than about 2.5 mm, or even not greater than about 2 mm. It will be appreciated that the width of the body 301 can be within a range between any of the above noted minimum and maximum values. Moreover, it will be appreciated that the above range of values can be representative of a median width (Mw) for a batch of shaped abrasive particles.

The body 301 of the shaped abrasive particle 300 can have particular dimensions, including for example, a length (Lmiddle or Lp) of at least about 0.4 mm, such as at least about 0.6 mm, at least about 0.8 mm, or even at least about 0.9 mm. Still, for at least one non-limiting embodiment, the body 301 can have a length of not greater than about 4 mm, such as not greater than about 3 mm, not greater than about 2.5 mm, or even not greater than about 2 mm. It will be appreciated that the length of the body 301 can be within a range between any of the above noted minimum and maximum values. Moreover, it will be appreciated that the above range of values can be representative of a median length (Ml), which may be more particularly a median middle length (MLmiddle) or median profile length (MLp), for a batch of shaped abrasive particles.

The shaped abrasive particle 300 can have a body 301 having a particular amount of dishing, wherein the dishing value (d) can be defined as a ratio between an average height of the body 301 at the exterior corners (Ahc) as compared to the smallest dimension of height of the body 301 at the interior (hi). The average height of the body 301 at the corners (Ahc) can be calculated by measuring the height of the body 301 at all corners and averaging the values, and may be distinct from a single value of height at one corner (hc). The average height of the body 301 at the corners or at the interior can be measured using a STIL (Sciences et Techniques Industrielles de la Lumiere—France) Micro Measure 3D Surface Profilometer (white light (LED) chromatic aberration technique). Alternatively, the dishing may be based upon a median height of the particles at the corner (Mhc) calculated from a suitable sampling of particles from a batch. Likewise, the interior height (hi) can be a median interior height (Mhi) derived from a suitable sampling of shaped abrasive particles from a batch. According to one embodiment, the dishing value (d) can be not greater than about 2, such as not greater than about 1.9, not greater than about 1.8, not greater than about 1.7, not greater than about 1.6, not greater than about 1.5, or even not greater than about 1.2. Still, in at least one non-limiting embodiment, the dishing value (d) can be at least about 0.9, such as at least about 1.0. It will be appreciated that the dishing ratio can be within a range between any of the minimum and maximum values noted above. Moreover, it will be appreciated that the above dishing values can be representative of a median dishing value (Md) for a batch of shaped abrasive particles.

The shaped abrasive particles of the embodiments herein, including for example, the body 301 of the particle of FIG. 3 can have a bottom surface 304 defining a bottom area ($A_b$). In particular instances, the bottom surface 304 can be the largest surface of the body 301. The bottom major surface 304 can have a surface area defined as the bottom area ($A_b$) that is different than the surface area of the upper major surface 303. In one particular embodiment, the bottom major surface 304 can have a surface area defined as the bottom area ($A_b$) that is different than the surface area of the upper major surface 303. In another embodiment, the bottom major surface 304 can have a surface area defined as the bottom area ($A_b$) that is less than the surface area of the upper major surface 303.

Additionally, the body 301 can have a cross-sectional midpoint area ($A_m$) defining an area of a plane perpendicular to the bottom area ($A_b$) and extending through a midpoint 381 of the particle 300. In certain instances, the body 301 can have an area ratio of bottom area to midpoint area ($A_b/A_m$) of not greater than about 6. In more particular instances, the area ratio can be not greater than about 5.5, such as not greater than about 5, not greater than about 4.5, not greater than about 4, not greater than about 3.5, or even not greater than about 3. Still, in one non-limiting embodiment, the area ratio may be at least about 1.1, such as at least about 1.3, or even at least about 1.8. It will be appreciated that the area ratio can be within a range between any of the minimum and maximum values noted above. Moreover, it will be appreciated that the above area ratios can be representative of a median area ratio for a batch of shaped abrasive particles.

Furthermore the shaped abrasive particles of the embodiments herein including, for example, the particle of FIG. 3, can have a normalized height difference of not greater than about 0.3. The normalized height difference can be defined by the absolute value of the equation [(hc−hm)/(hi)]. In other embodiments, the normalized height difference can be not greater than about 0.26, such as not greater than about 0.22, or even not greater than about 0.19. Still, in one particular embodiment, the normalized height difference can be at least about 0.04, such as at least about 0.05, or even at least about 0.06. It will be appreciated that the normalized height difference can be within a range between any of the minimum and maximum values noted above. Moreover, it will be appreciated that the above normalized height values can be representative of a median normalized height value for a batch of shaped abrasive particles.

The shaped abrasive particle 300 can be formed such that the body 301 includes a crystalline material, and more particularly, a polycrystalline material. Notably, the polycrystalline material can include abrasive grains. In one embodiment, the body 301 can be essentially free of an organic material, including for example, a binder. More particularly, the body 301 can consist essentially of a polycrystalline material.

In one aspect, the body 301 of the shaped abrasive particle 300 can be an agglomerate including a plurality of abrasive particles, grit, and/or grains bonded to each other to form the body 301 of the abrasive particle 300. Suitable abrasive grains can include nitrides, oxides, carbides, borides, oxynitrides, oxyborides, diamond, and a combination thereof. In particular instances, the abrasive grains can include an oxide compound or complex, such as aluminum oxide, zirconium oxide, titanium oxide, yttrium oxide, chromium oxide, strontium oxide, silicon oxide, and a combination thereof. In one particular instance, the abrasive particle 300 is formed such that the abrasive grains forming the body 301 include alumina, and more particularly, may consist essentially of alumina. Moreover, in particular instances, the shaped abrasive particle 300 can be formed from a seeded sol-gel.

The abrasive grains (i.e., crystallites) contained within the body 301 may have an average grain size that is generally not greater than about 100 microns. In other embodiments, the average grain size can be less, such as not greater than about 80 microns, not greater than about 50 microns, not greater than about 30 microns, not greater than about 20 microns, not greater than about 10 microns, or even not greater than about 1 micron, not greater than about 0.9 microns, not greater than about 0.8 microns, not greater than about 0.7 microns, or even not greater than about 0.6 microns. Still, the average grain size of the abrasive grains contained within the body 301 can be at least about 0.01 microns, such as at least about 0.05 microns, at least about 0.06 microns, at least about 0.07 microns, at least about 0.08 microns, at least about 0.09 microns, at least about 0.1 microns, at least about 0.12 microns, at least about 0.15 microns, at least about 0.17 microns, at least about 0.2 microns, or even at least about 0.5 microns. It will be appreciated that the abrasive grains can have an average grain size within a range between any of the minimum and maximum values noted above.

In accordance with certain embodiments, the abrasive particle 300 can be a composite article including at least two different types of grains within the body 301. It will be appreciated that different types of grains are grains having different compositions with regard to each other. For example, the body 301 can be formed such that is includes at least two different types of grains, wherein the two different types of grains can be nitrides, oxides, carbides, borides, oxynitrides, oxyborides, diamond, and a combination thereof.

In accordance with an embodiment, the abrasive particle 300 can have an average particle size, as measured by the largest dimension measurable on the body 301, of at least about 100 microns. In fact, the abrasive particle 300 can have an average particle size of at least about 150 microns, such as at least about 200 microns, at least about 300 microns, at least about 400 microns, at least about 500 microns, at least about 600 microns, at least about 700 microns, at least about 800 microns, or even at least about 900 microns. Still, the abrasive particle 300 can have an average particle size that is not greater than about 5 mm, such as not greater than about 3 mm, not greater than about 2 mm, or even not greater than about 1.5 mm. It will be appreciated that the abrasive particle 300 can have an average particle size within a range between any of the minimum and maximum values noted above.

Figure 4:
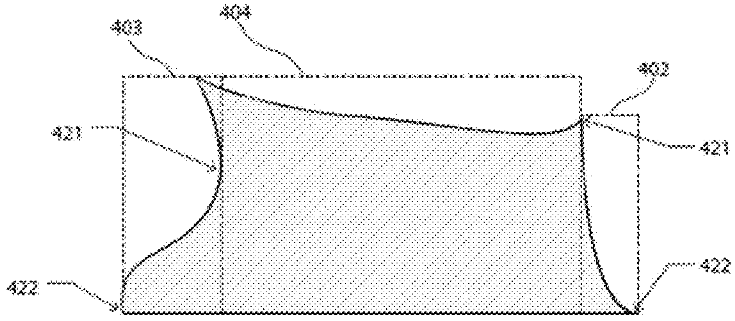
FIG. 4 includes a side view of a shaped abrasive particle and percentage flashing according to an embodiment.

The shaped abrasive particles of the embodiments herein can have a percent flashing that may facilitate improved performance. Notably, the flashing defines an area of the particle as viewed along one side, such as illustrated in FIG. 4, wherein the flashing extends from a side surface of the body 301 within the boxes 402 and 403. The flashing can represent tapered regions proximate to the upper surface 303 and bottom surface 304 of the body 301. The flashing can be measured as the percentage of area of the body 301 along the side surface contained within a box extending between an innermost point of the side surface (e.g., 421) and an outermost point (e.g., 422) on the side surface of the body 301. In one particular instance, the body 301 can have a particular content of flashing, which can be the percentage of area of the body 301 contained within the boxes 402 and 403 compared to the total area of the body 301 contained within boxes 402, 403, and 404. According to one embodiment, the percent flashing (f) of the body 301 can be at least about 1%. In another embodiment, the percent flashing can be greater, such as at least about 2%, at least about 3%, at least about 5%, at least about 8%, at least about 10%, at least about 12%, such as at least about 15%, at least about 18%, or even at least about 20%. Still, in a non-limiting embodiment, the percent flashing of the body 301 can be controlled and may be not greater than about 45%, such as not greater than about 40%, not greater than about 35%, not greater than about 30%, not greater than about 25%, not greater than about 20%, not greater than about 18%, not greater than about 15%, not greater than about 12%, not greater than about 10%, not greater than about 8%, not greater than about 6%, or even not greater than about 4%. It will be appreciated that the percent flashing of the body 301 can be within a range between any of the above minimum and maximum percentages. Moreover, it will be appreciated that the above flashing percentages can be representative of an average flashing percentage or a median flashing percentage for a batch of shaped abrasive particles.

The percent flashing can be measured by mounting the shaped abrasive particle 300 on its side and viewing the body 301 at the side to generate a black and white image, such as illustrated in FIG. 4. A suitable program for such includes ImageJ software. The percentage flashing can be calculated by determining the area of the body 301 in the boxes 402 and 403 compared to the total area of the body 301 as viewed at the side (total shaded area), including the area in the center 404 and within the boxes. Such a procedure can be completed for a suitable sampling of particles to generate average, median, and/or and standard deviation values.

FIGS. 12A-26 include illustrations of shaped abrasive particles according to the embodiments herein. According to one embodiment, the body of a shaped abrasive particle of the embodiments herein can have a particular relationship between at least three grain features, including tip sharpness, strength, and Shape Index. Without wishing to be tied to a particular theory, based on empirical studies it appears that a particular interrelationship between certain grain features may exist, and by controlling the interrelationship of these grain features, the self-sharpening behavior of the shaped abrasive particle may be modified, and improved, which may facilitate the formation of abrasive articles having improved performance in terms of efficiency and life.

Figure 12A:
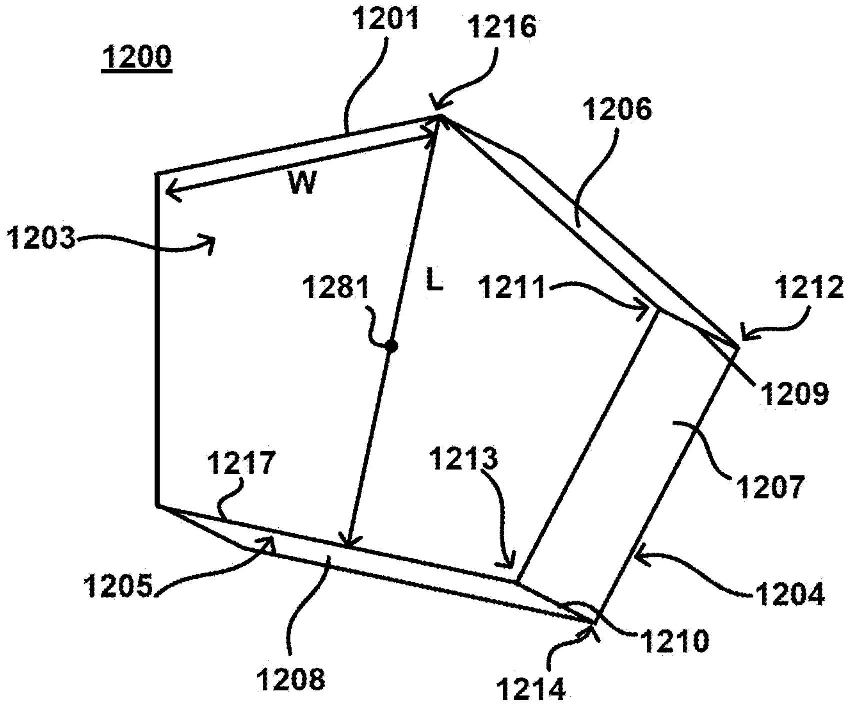
FIGS. 12A-12C include illustrations of shaped abrasive particles in accordance with embodiments.
Figure 12B:
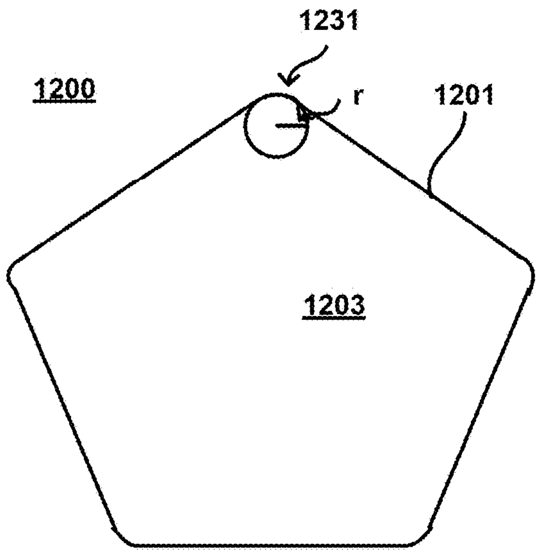

FIG. 12A includes a perspective view illustration of a shaped abrasive particle according to an embodiment. FIG. 12B includes a top view illustration of a shaped abrasive particle according to an embodiment. As illustrated, the shaped abrasive particle 1200 can include a body 1201 having an upper major surface 1203 (i.e., a first major surface) and a bottom major surface 1204 (i.e., a second major surface) opposite the upper major surface 1203. The upper surface 1203 and the bottom surface 1204 can be separated from each other by at least one side surface 1205, which may include one or more discrete side surface portions, including for example, discrete side surface portions 1206, 1207, and 1208. The discrete side surface portions 1206-1208 may be joined to each other at edges, including but not limited to, edges 1209 and 1210. The edge 1209 can extend between an external corner 1211 of the upper major surface 1203 and an external corner 1212 of the bottom major surface 1204. The edge 1210 can extend between an external corner 1213 of the upper major surface 1203 and an external corner 1214 of the bottom major surface 1204.

As illustrated, the body 1201 of the shaped abrasive particle 1200 can have a generally polygonal shape as viewed in a plane parallel to the upper surface 1203, and more particularly, a pentagonal two-dimensional shape as viewed in the plane of the width and length of the body (i.e., the top view as shown in FIG. 12B), having 5 external points or external corners. In particular, the body 1201 can have a length (L or Lmiddle) as shown in FIG. 12A, which may be measured as the dimension extending from the external corner 1216 to a midpoint at the opposite edge 1217 of the body. Notably, in some embodiments, such as illustrated in FIG. 12A, the length can extend through a midpoint 1281 of the upper surface 1203 of the body 1201, however, this may not necessarily be the case for every embodiment. Moreover, the body 1201 can have a width (W), which is the measure of the longest dimension of the body 1201 along a discrete side surface portion of the side surface 1205. The height of the body may be generally the distance between the upper major surface 1203 and the bottom major surface 1204. As described in embodiments herein, the height may vary in dimension at different locations of the body 1201, such as at the corners versus at the interior of the body 1201.

In particular instances, the body 1201 can be formed to have a primary aspect ratio, which is a ratio expressed as width:length, having the values described in embodiments herein. Still, in certain embodiments, such as the shaped abrasive particle of the embodiment of FIG. 12A, the length can be equal to or greater than the width, such that the primary aspect ratio is at least about 1:1. In other instances, the body 1201 can be formed such that the primary aspect ratio (w:1) can be at least about 1:1.5, such as at least about 1:2, at least about 1:4, or even at least about 5:1. Still, in other instances, the abrasive particle 1200 can be formed such that the body 1201 has a primary aspect ratio that is not greater than about 1:10, such as not greater than 1:9, not greater than about 1:8, or even not greater than about 1:5. It will be appreciated that the body 1201 can have a primary aspect ratio within a range between any of the ratios noted above.

In addition to the primary aspect ratio, the abrasive particle 1200 can be formed such that the body 1201 comprises a secondary aspect ratio, which can be defined as a ratio of length:height, wherein the height may be an interior median height (Mhi) measured at the midpoint 1281. In certain instances, the secondary aspect ratio can be at least about 1:1, such as at least about 2:1, at least about 4:1, or even at least about 5:1. Still, in other instances, the abrasive particle 1200 can be formed such that the body 1201 has a secondary aspect ratio that is not greater than about 1:3, such as not greater than 1:2, or even not greater than about 1:1. It will be appreciated that the body 1201 can have a secondary aspect ratio within a range between any of the ratios noted above, such as within a range between about 5:1 and about 1:1.

In accordance with another embodiment, the abrasive particle 1200 can be formed such that the body 1201 comprises a tertiary aspect ratio, defined by the ratio width:height, wherein the height may be an interior median height (Mhi). The tertiary aspect ratio of the body 1201 can be at least about 1:1, such as at least about 2:1, at least about 4:1, at least about 5:1, or even at least about 6:1. Still, in other instances, the abrasive particle 1200 can be formed such that the body 1201 has a tertiary aspect ratio that is not greater than about 3:1, such as not greater than 2:1, or even not greater than about 1:1. It will be appreciated that the body 1201 can have a tertiary aspect ratio within a range between any of the ratios noted above, such as within a range between about 6:1 and about 1:1.

According to one embodiment, the body 1201 of the shaped abrasive particle 1200 may be formed using any of the processes described herein. Notably, the body 1201 may be formed such that it has a particular interrelationship of at least three grain features, including a predetermined strength, a predetermined tip sharpness, and a predetermined Shape Index. The tip sharpness of a shaped abrasive particle, which may be an average tip sharpness, may be measured by determining the largest radius of a best fit circle on an external corner of the body 1201. For example, turning to FIG. 12B, a top view of the upper major surface 1203 of the body 1201 is provided. For the corner 1231, a best fit circle is overlaid on the image of the body 1201 of the shaped abrasive particle 1201, and the radius of the best fit circle relative to the curvature of the external corner 1231 defines the value of tip sharpness for the external corner 1231. The measurement may be recreated for each external corner of the body 1201 to determine the average individual tip sharpness for a single shaped abrasive particle. Moreover, the measurement may be recreated on a suitable sample size of shaped abrasive particles of a batch of shaped abrasive particles to derive the average batch tip sharpness. Any suitable computer program, such as ImageJ may be used in conjunction with an image (e.g., SEM image or light microscope image) of suitable magnification to accurately measure the best fit circle and the tip sharpness.

The shaped abrasive particles of the embodiments herein may have a particular tip sharpness that facilitates formation of shaped abrasive particles with a particular sharpness, strength and Shape Index factor (i.e., 3SF). For example, the body of a shaped abrasive particle, according to an embodiment, can have a tip sharpness within a range between not greater than about 80 microns and at least about 1 micron. Moreover, in certain instances, the body can have a tip sharpness of not greater than about 78 microns, such as not greater than about 76 microns, not greater than about 74 microns, not greater than about 72 microns, not greater than about 70 microns, not greater than about 68 microns, not greater than about 66 microns, not greater than about 64 microns, not greater than about 62 microns, not greater than about 60 microns, not greater than about 58 microns, not greater than about 56 microns, not greater than about 54 microns, not greater than about 52 microns, not greater than about 50 microns, not greater than about 48 microns, not greater than about 46 microns, not greater than about 44 microns, not greater than about 42 microns, not greater than about 40 microns, not greater than about 38 microns, not greater than about 36 microns, not greater than about 34 microns, not greater than about 32 microns, not greater than about 30 microns, not greater than about 38 microns, not greater than about 36 microns, not greater than about 34 microns, not greater than about 32 microns, not greater than about 30 microns, not greater than about 28 microns, not greater than about 26 microns, not greater than about 24 microns, not greater than about 22 microns, not greater than about 20 microns, not greater than about 18 microns, not greater than about 16 microns, not greater than about 14 microns, not greater than about 12 microns, not greater than about 10 microns. In yet another non-limiting embodiment, the tip sharpness can be at least about 2 microns, such as at least about 4 microns, at least about 6 microns, at least about 8 microns, at least about 10 microns, at least about 12 microns, at least about 14 microns, at least about 16 microns, at least about 18 microns, at least about 20 microns, at least about 22 microns, at least about 24 microns, at least about 26 microns, at least about 28 microns, at least about 30 microns, at least about 32 microns, at least about 34 microns, at least about 36 microns, at least about 38 microns, at least about 40 microns, at least about 42 microns, at least about 44 microns, at least about 46 microns, at least about 48 microns, at least about 50 microns, at least about 52 microns, at least about 54 microns, at least about 56 microns, at least about 58 microns, at least about 60 microns, at least about 62 microns, at least about 64 microns, at least about 66 microns, at least about 68 microns, at least about 70 microns. It will be appreciated that the body can have a tip sharpness within a range between any of the minimum and maximum values noted above.

As noted herein, another grain feature is the Shape Index. The Shape Index of the body 1201 can be described as a value of an outer radius of a best-fit outer circle superimposed on the body as viewed in two dimensions of the plane of length and width (i.e., the upper major surface 1203 or the bottom major surface 1204) compared to an inner radius of the largest-best fit inner circle fitting entirely within the body 1201 as viewed in the same dimensions of the plane of length and width of the body 1201. For example, turning to FIG. 12C, a top view of the shaped abrasive particle 1201 is provided with two circles superimposed on the illustration to demonstrate the calculation of Shape Index. A first circle is superimposed on the body of the shaped abrasive particle, which is a best-fit outer circle representing the smallest circle that can be used to fit the entire perimeter of the body of the shaped abrasive particle within its boundaries. The outer circle has a radius (Ro). For shapes such as that illustrated in FIG. 12C, the outer circle may intersect the perimeter of the body at each of the five corners of the pentagon shape. However, it will be appreciated that for certain irregular or complex shapes, the body may not fit uniformly within the circle such that each of the corners intersect the circle at equal intervals, but a best-fit, outer circle may be formed regardless. Any suitable computer program, such as ImageJ may be used in conjunction with an image of suitable magnification (e.g., SEM image or light microscope image) to create the outer circle and measure the radius (Ro).

Figure 12C:
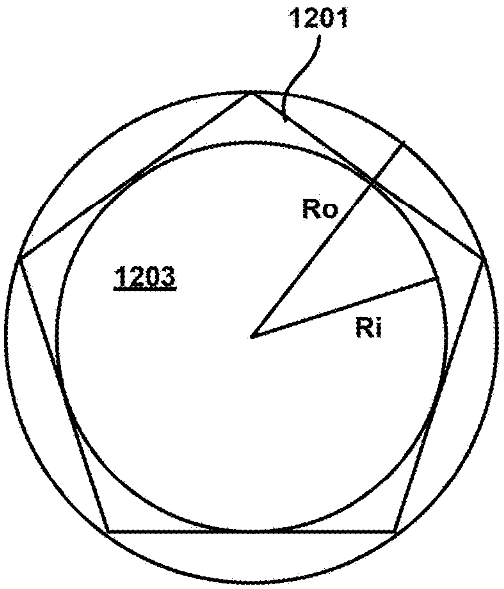

A second, inner circle can be superimposed on the image of a shaped abrasive grain, as illustrated in FIG. 12C, and is a best fit circle representing the largest circle that can be placed entirely within the perimeter of the two dimensional shape of the body 1201 as viewed in the plane of the length and width of the body 1201. The inner circle can have a radius (Ri). It will be appreciated that for certain irregular or complex shapes, the inner circle may not fit uniformly within the body such that the perimeter of the circle contacts portions of the body at equal intervals, such as shown for the regular pentagon of FIG. 12C. However, a best-fit, inner circle may be formed regardless. Any suitable computer program, such as ImageJ may be used in conjunction with an image of suitable magnification (e.g., SEM image or light microscope image) to create the inner circle and measure the radius (Ri).

The Shape Index can be calculated by dividing the outer radius by the inner radius (i.e., Shape Index=Ri/Ro). For example, the body 1201 of the shaped abrasive particle 1200 of FIGS. 12A-12C has a Shape Index of approximately 0.81.

The shaped abrasive particles of the embodiments herein may have a particular Shape Index that facilitates formation of shaped abrasive particles with a particular 3SF. For example, the body may have a Shape Index within a range between at least about 0.51 and not greater than about 0.99. More particularly, in one non-limiting embodiment, the body of the shaped abrasive particle can have a Shape Index of at least about 0.52, such as at least about 0.53, at least about 0.54, at least about 0.55, at least about 0.56, at least about 0.57, at least about 0.58, at least about 0.59, at least about 0.60, at least about 0.61, at least about 0.62, at least about 0.63, at least about 0.64, at least about 0.65, at least about 0.66, at least about 0.67, at least about 0.68, at least about 0.69, at least about 0.70, at least about 0.71, at least about 0.72, at least about 0.73, at least about 0.74, at least about 0.75, at least about 0.76, at least about 0.77, at least about 0.78, at least about 0.79, at least about 0.80, at least about 0.81, at least about 0.82, at least about 0.83, at least about 0.84, at least about 0.85, at least about 0.86, at least about 0.87, at least about 0.88, at least about 0.89, at least about 0.90, at least about 0.91, at least about 0.92, at least about 0.93, at least about 0.94, at least about 0.95. In still another non-limiting embodiment, the body can have a Shape Index of not greater than about 0.98, such as not greater than about 0.97, not greater than about 0.96, not greater than about 0.95, not greater than about 0.94, not greater than about 0.93, not greater than about 0.92, not greater than about 0.91, not greater than about 0.90, not greater than about 0.89, not greater than about 0.88, not greater than about 0.87, not greater than about 0.86, not greater than about 0.85, not greater than about 0.84, not greater than about 0.83, not greater than about 0.82, not greater than about 0.81, not greater than about 0.80, not greater than about 0.79, not greater than about 0.78, not greater than about 0.77, not greater than about 0.76, not greater than about 0.75, not greater than about 0.74, not greater than about 0.73, not greater than about 0.72, not greater than about 0.71, not greater than about 0.70, not greater than about 0.69, not greater than about 0.68, not greater than about 0.67, not greater than about 0.66, not greater than about 0.65, not greater than about 0.64, not greater than about 0.63, not greater than about 0.62, not greater than about 0.61, not greater than about 0.60, not greater than about 0.59, not greater than about 0.58, not greater than about 0.57, not greater than about 0.56, not greater than about 0.55, not greater than about 0.54. It will be appreciated that the body can have a Shape Index within a range between any of the minimum and maximum values noted above.

Moreover, as noted herein, the body 1201 may be formed to have a particular strength. The strength of the body may be measured via Hertzian indentation. In this method the abrasive grains are glued on a slotted aluminum SEM sample mounting stub. The slots are approximately 250 μm deep and wide enough to accommodate the grains in a row. The grains are polished in an automatic polisher using a series of diamond pastes, with the finest paste of 1 μm to achieve a final mirror finish. At the final step, the polished grains are flat and flush with the aluminum surface. The height of the polished grains is therefore approximately 250 μm. The metal stub is fixed in a metal support holder and indented with a steel spherical indenter using an MTS universal test frame. The crosshead speed during the test is 2 μm/s. The steel ball used as the indenter is 3.2 mm in diameter. The maximum indentation load is the same for all grains, and the load at first fracture is determined from the load displacement curve as a load drop. After indentation, the grains are imaged optically to document the existence of the cracks and the crack pattern.

Using the first load drop as the pop-in load of the first ring crack, the Hertzian strength can be calculated. The Hertzian stress field is well defined and axisymmetrical. The stresses are compressive right under the indenter and tensile outside a region defined by the radius of the contact area. At low loads, the field is completely elastic. For a sphere of radius R and an applied normal load of P, the solutions for the stress field are readily found following the original Hertzian assumption that the contact is friction free.

The radius of the contact area α is given by:

$$a^3 = \frac{3PR}{4E^*} \qquad (1)$$

Where $$E^* = \left(\frac{1-v_1^2}{E_1} + \frac{1-v_2^2}{E_2}\right)^{-1} \qquad (2)$$

and E* is a combination of the Elastic modulus E and the Poisson's ratio □□ for the indenter and sample material, respectively.

The maximum contact pressure is given by:

$$p_0 = \left(\frac{3P}{2\pi a^2}\right) = \left(\frac{6PE^{*2}}{\pi^3 R^2}\right)^{\frac{1}{3}} \qquad (3)$$

The maximum shear stress is given by (assuming □=0.3): $\tau_1$=0.31, $p_0$, at R=0 and z=0.48 a.

The Hertzian strength is the maximum tensile stress at the onset of cracking and is calculated according to: $\sigma_r$=⅓(1-2□□) $p_0$, at R=a and z=0.

Using the first load drop as the load P in Eq. (3) the maximum tensile stress is calculated following the equation above, which is the value of the Hertzian strength for the specimen. In total, between 20 and 30 individual shaped abrasive particle samples are tested for each grit type, and a range of Hertzian fracture stress is obtained. Following Weibull analysis procedures (as outlined in ASTM C1239), a Weibull probability plot is generated, and the Weibull Characteristic strength (the scale value) and the Weibull modulus (the shape parameter) are calculated for the distribution using the maximum likelihood procedure.

The shaped abrasive particles of the embodiments herein may have a particular strength that facilitates formation of shaped abrasive particles with a particular 3SF. For example, the body of shaped abrasive particles of the embodiments herein can have a strength within a range between not greater than about 600 MPa and at least about 100 MPa. Such strength may be achieved using any of the compositions described in the embodiments herein, including but not limited to, a single ceramic composition, a doped ceramic composition, or a composite composition. According to a particular embodiment, the strength of the body may be not greater than about 590 MPa, such as not greater than about 580 MPa, not greater than about 570 MPa, not greater than about 560 MPa, not greater than about 550 MPa, not greater than about 540 MPa, not greater than about 530 MPa, not greater than about 520 MPa, not greater than about 510 MPa, not greater than about 500 MPa, not greater than about 490 MPa, not greater than about 480 MPa, not greater than about 470 MPa, not greater than about 460 MPa, not greater than about 450 MPa, not greater than about 440 MPa, not greater than about 430 MPa, not greater than about 420 MPa, not greater than about 410 MPa, not greater than about 400 MPa, not greater than about 390 MPa, not greater than about 380 MPa, not greater than about 370 MPa, not greater than about 360 MPa, not greater than about 350 MPa, not greater than about 340 MPa, not greater than about 330 MPa, not greater than about 320 MPa, not greater than about 310 MPa, not greater than about 300 MPa, not greater than about 290 MPa, not greater than about 280 MPa, not greater than about 270 MPa, not greater than about 260 MPa, not greater than about 250 MPa, not greater than about 240 MPa, not greater than about 230 MPa, not greater than about 220 MPa, not greater than about 210 MPa, or even not greater than about 200 MPa. In yet another non-limiting embodiment, the strength of the body may be at least about 110 MPa, such as at least about 120 MPa, at least about 130 MPa, at least about 140 MPa, at least about 150 MPa, at least about 160 MPa, at least about 170 MPa, at least about 180 MPa, at least about 190 MPa, at least about 200 MPa, at least about 210 MPa, at least about 220 MPa, at least about 230 MPa, at least about 240 MPa, at least about 250 MPa, at least about 260 MPa, at least about 270 MPa, at least about 280 MPa, at least about 290 MPa, at least about 300 MPa, at least about 310 MPa, at least about 320 MPa, at least about 330 MPa, at least about 340 MPa, at least about 350 MPa, at least about 360 MPa, at least about 370 MPa, at least about 380 MPa, at least about 390 MPa, at least about 400 MPa, at least about 410 MPa, at least about 420 MPa, at least about 430 MPa, at least about 440 MPa, at least about 450 MPa, at least about 460 MPa, at least about 470 MPa, at least about 480 MPa, at least about 490 MPa, or even at least about 500. It will be appreciated that the strength of the body may be within a range between any of the minimum and maximum values noted above.

According to one aspect, empirical studies of shaped abrasive particles have indicated that by controlling particular grain features of tip sharpness, strength, and Shape Index with respect to each other, the grinding behavior (e.g., the self-sharpening behavior) of the shaped abrasive particles can be modified. Notably, the forming process can be undertaken in a manner such that the interrelationship of the grain features of tip sharpness, Shape Index, and strength of the body are selected and controlled in a predetermined manner to influence the grinding performance (e.g., self-sharpening behavior) of the shaped abrasive particle. For example, in one embodiment, the method of forming the shaped abrasive particle can include selecting a material having a predetermined strength and forming the body of the shaped abrasive particle with a predetermined tip sharpness and predetermined Shape Index based upon the predetermined strength. That is, a material for forming the shaped abrasive particle may first be selected, such that the body will have a predetermined strength, and thereafter the grain features of a predetermined tip sharpness and predetermined Shape Index may be selected and controlled based on the predetermined strength, such that the shaped abrasive particle may have improved performance over conventional shaped abrasive particles.

In still another embodiment, the method of forming the shaped abrasive particle can include selecting a material having a predetermined Shape Index and forming the body of the shaped abrasive particle with a predetermined tip sharpness and predetermined strength based upon the predetermined Shape Index. That is, a shape of the body of the shaped abrasive particle may first be selected, and thereafter the grain features of a predetermined tip sharpness and predetermined strength of the body may be selected and controlled based on the predetermined Shape Index, such that the shaped abrasive particle can have improved performance over conventional shaped abrasive particles.

In yet another approach, a method of forming a shaped abrasive particle can include selecting a predetermined tip sharpness of a body of the shaped abrasive particle. After predetermining the tip sharpness of the body, the Shape Index and the strength of the body may be selected and controlled based upon the predetermined tip sharpness. Such a process may facilitate formation of a shaped abrasive particle having improved performance over conventional shaped abrasive particles.

In yet another embodiment, the method of forming the shaped abrasive particle can include selecting a material having a predetermined height, which may be an average height, an interior height, or height at an edge or tip of the body, and forming the body of the shaped abrasive particle with a predetermined tip sharpness, predetermined strength, and predetermined Shape Index based on the predetermined height. That is, a height of the body of the shaped abrasive particle may first be selected, and thereafter the grain features of a predetermined tip sharpness, strength, and Shape Index of the body may be selected and controlled based on the predetermined height, such that the shaped abrasive particle can have improved performance over conventional shaped abrasive particles. It will be appreciated that the same may be conducted for other dimensions such as length and width such that a predetermined tip sharpness, strength, and Shape Index of the body may be selected and controlled based on the predetermined length or width, such that the shaped abrasive particle can have improved performance over conventional shaped abrasive particles.

Moreover, through empirical studies, it has been found that the performance of the shaped abrasive particle may be initially predicted by the interrelationship of the tip sharpness, strength, and Shape Index, which may be evaluated based upon a sharpness-shape-strength factor (3SF) according to the formula: $3SF=[(S*R*B^2)/2500]$, wherein "S" represents the strength of the body (in MPa), R represents the tip sharpness of the body (in microns), and "B" represents the Shape Index of the body. The 3SF formula is intended to provide an initial prediction of the effectiveness of grinding behavior of the particle based upon the interrelationship of the grain features. It should be noted that other factors, such as aspects of the abrasive article in which the shaped abrasive particle is integrated, may influence the behavior of the particle.

In accordance with one embodiment, the body of the shaped abrasive particle may have a particular 3SF value within a range between at least about 0.7 and not greater than about 1.7. In at least one embodiment, the body can have a 3SF of at least about 0.72, such as at least about 0.75, at least about 0.78, at least about 0.8, at least about 0.82, at least about 0.85, at least about 0.88, at least about 0.90, at least about 0.92, at least about 0.95, or even at least about 0.98. In yet another instance, the body can have a 3SF of not greater than about 1.68, such as not greater than about 1.65, not greater than about 1.62, not greater than about 1.6, not greater than about 1.58, not greater than about 1.55, not greater than about 1.52, not greater than about 1.5, not greater than about 1.48, not greater than about 1.45, not greater than about 1.42, not greater than about 1.4, not greater than about 1.38, not greater than about 1.35, not greater than about 1.32, not greater than about 1.3, not greater than about 1.28, not greater than about 1.25, not greater than about 1.22, not greater than about 1.2, not greater than about 1.18, not greater than about 1.15, not greater than about 1.12, not greater than about 1.1. It will be appreciated that the body can have a 3SF within a range between any of the minimum and maximum values noted above.

In addition to the foregoing grain features and 3SF values of the embodiments herein, in certain instances, the height of the grain may be an additional or alternative grain feature that may be interrelated to certain grain features described herein. In particular, the height of the grain may be controlled with respect to any of the grain features (e.g., strength and tip sharpness) to facilitate improved grinding performance of the shaped abrasive particles and abrasive articles using such shaped abrasive particles. Notably, the shaped abrasive particles of the embodiments herein can have a particular height, which may be interrelated to certain grain features, such that stresses encountered during grinding may be distributed throughout the body in a manner to facilitate improved self-sharpening behavior. According to one embodiment, the body of the shaped abrasive particles can have a height (h) within a range between about 70 microns and about 500 microns, such as within a range between about 175 microns to about 350 microns, such as between about 175 microns and about 300 microns, or even within a range between about 200 microns and about 300 microns.

The shaped abrasive particles of the embodiments herein having the particular grain features and 3SF can have any of the other features of the embodiments described herein. In one aspect, the body 1201 of the shaped abrasive particle can have a particular composition. For example, the body 1201 may include a ceramic material, such as a polycrystalline ceramic material, and more particularly an oxide. The oxide may include, for example alumina. In certain instances, the body may include a majority content of alumina, such as at least about 95 wt % alumina for the total weight of the body, or such as at least about 95.1 wt %, at least about 95.2 wt %, at least about 95.3 wt %, at least about 95.4 wt %, at least about 95.5 wt %, at least about 95.6 wt %, at least about 95.7 wt %, at least about 95.8 wt %, at least about 95.9 wt %, at least about 96 wt %, at least about 96.1 wt %, at least about 96.2 wt %, at least about 96.3 wt %, at least about 96.4 wt %, at least about 96.5 wt %, at least about 96.6 wt %, at least about 96.7 wt %, at least about 96.8 wt %, at least about 96.9 wt %, at least about 97 wt %, at least about 97.1 wt %, at least about 97.2 wt %, at least about 975.3 wt %, at least about 97.4 wt %, or even at least about 97.5 wt % alumina for the total weight of the body. Still, in another non-limiting embodiment, the body 1201 may include a content of alumina not greater than about 99.5 wt %, such as not greater than about 99.4 wt %, not greater than about 99.3 wt %, not greater than about 99.2 wt %, not greater than about 99.1 wt %, not greater than about 99 wt %, not greater than about 98.9 wt %, not greater than about 98.8 wt %, not greater than about 98.7 wt %, not greater than about 98.6 wt %, not greater than about 98.5 wt %, not greater than about 98.4 wt %, not greater than about 98.3 wt %, not greater than about 98.2 wt %, not greater than about 98.1 wt %, not greater than about 98 wt %, not greater than about 97.9 wt %, not greater than about 97.8 wt %, not greater than about 97.7 wt %, not greater than about 97.6 wt %, or even not greater than about 97.5 wt % alumina for the total weight of the body 1201. It will be appreciated that the body 1201 may include a content of alumina within a range between any of the minimum and maximum values noted above. Moreover, in at least one embodiment, the body may consist essentially of alumina.

As noted in embodiments herein, the body of the shaped abrasive particles may be formed to include certain additives. The additives can be non-organic species, including but not limited to an oxide, a metal element, a rare-earth element, and a combination thereof. In one particular instance, the additive may be a dopant material, which may be present in a particular minor amount sufficient to affect the microstructure of the material, but not necessarily present in a trace amount or less. The dopant material may include an element selected from the group consisting of an alkali element, an alkaline earth element, a rare earth element, a transition metal element, and a combination thereof. More particularly, the dopant material can be an element selected from the group consisting of hafnium, zirconium, niobium, tantalum, molybdenum, vanadium, lithium, sodium, potassium, magnesium, calcium, strontium, barium, scandium, yttrium, lanthanum, cesium, praseodymium, chromium, cobalt, iron, germanium, manganese, nickel, titanium, zinc, and a combination thereof. In still a more particular embodiment, the dopant material may include a magnesium-containing species, including for example, but not limited to, and may be magnesium oxide (MgO).

According to one embodiment, the magnesium-containing species can be a compound including magnesium and at least one other element. In at least one embodiment, the magnesium-containing compound can include an oxide compound, such that the magnesium-containing species includes magnesium and oxygen. In yet another embodiment, the magnesium-containing species can include aluminum, and more particularly may be a magnesium aluminate species. For example, in certain instances, the magnesium-containing species can be a spinel material. The spinel material may be stoichiometric or non-stoichiometric spinel.

The magnesium-containing species may be a distinct phase of material formed in the body as compared to another primary phase, including for example, an alumina phase. The magnesium-containing species may be preferentially disposed at the grain boundaries of the primary phase (e.g., alumina grains). In still other instances, the magnesium-containing species may be primarily and uniformly dispersed throughout the volume of the grains of the primary phase.

The magnesium-containing species may be a strength-altering material. For example, in at least one embodiment, the addition of the magnesium-containing species can be configured to reduce the strength of the body compared to a body that does not include the magnesium-containing species.

Certain compositions of the shaped abrasive particles of the embodiments can include a particular content of magnesium oxide. For example, the body 1201 may include a content of the magnesium-containing species of at least about 0.5 wt %, such as at least about 0.6 wt %, at least about 0.7 wt %, at least about 0.8 wt %, at least about 0.9 wt %, at least about 1 wt %, at least about 1.1 wt %, at least about 1.2 wt %, at least about 1.3 wt %, at least about 1.4 wt %, at least about 1.5 wt %, at least about 1.6 wt %, at least about 1.7 wt %, at least about 1.8 wt %, at least about 1.9 wt %, at least about 2 wt %, at least about 2.1 wt %, at least about 2.2 wt %, at least about 2.3 wt %, at least about 2.4 wt %, or even at least about 2.5 wt % for the total weight of the body 1201. In still another non-limiting embodiment, the body 1201 may include a content of the magnesium-containing species of not greater than about 8 wt %, not greater than about 7 wt %, not greater than about 6 wt %, not greater than about 5 wt %, not greater than about 4.9 wt %, not greater than about 4.8 wt %, not greater than about 4.7 wt %, not greater than about 4.6 wt %, not greater than about 4.5 wt %, not greater than about 4.4 wt %, not greater than about 4.3 wt %, not greater than about 4.2 wt %, not greater than about 4.1 wt %, not greater than about 4 wt %, not greater than about 3.9 wt %, not greater than about 3.8 wt %, not greater than about 3.7 wt %, not greater than about 3.6 wt %, not greater than about 3.5 wt %, not greater than about 3.4 wt %, not greater than about 3.3 wt %, not greater than about 3.2 wt %, not greater than about 3.1 wt %, not greater than about 3 wt %, not greater than about 2.9 wt %, not greater than about 2.8 wt %, not greater than about 2.7 wt %, not greater than about 2.6 wt %, not greater than about 2.5 wt %. It will be appreciated that the content of the magnesium-containing species within the body may be within a range between any of the minimum and maximum values noted above. Furthermore, in at least one embodiment, the body 1201 may consist essentially of alumina ($Al_2O_3$) and the magnesium-containing species (e.g., MgO and/or a magnesium aluminate).

Moreover, as noted herein the body of a shaped abrasive particle of any of the embodiments herein may be formed of a polycrystalline material including grains, which may be made of materials such as nitrides, oxides, carbides, borides, oxynitrides, diamond, and a combination thereof. Further, the body 1201 can be essentially free of an organic material, essentially free of rare earth elements, and essentially free of iron. Being essentially free is understood to mean that the body is formed in a manner to exclude such materials, but the body may not necessarily be completely free of such materials as they may be present in trace amounts or less.

Figure 13A:
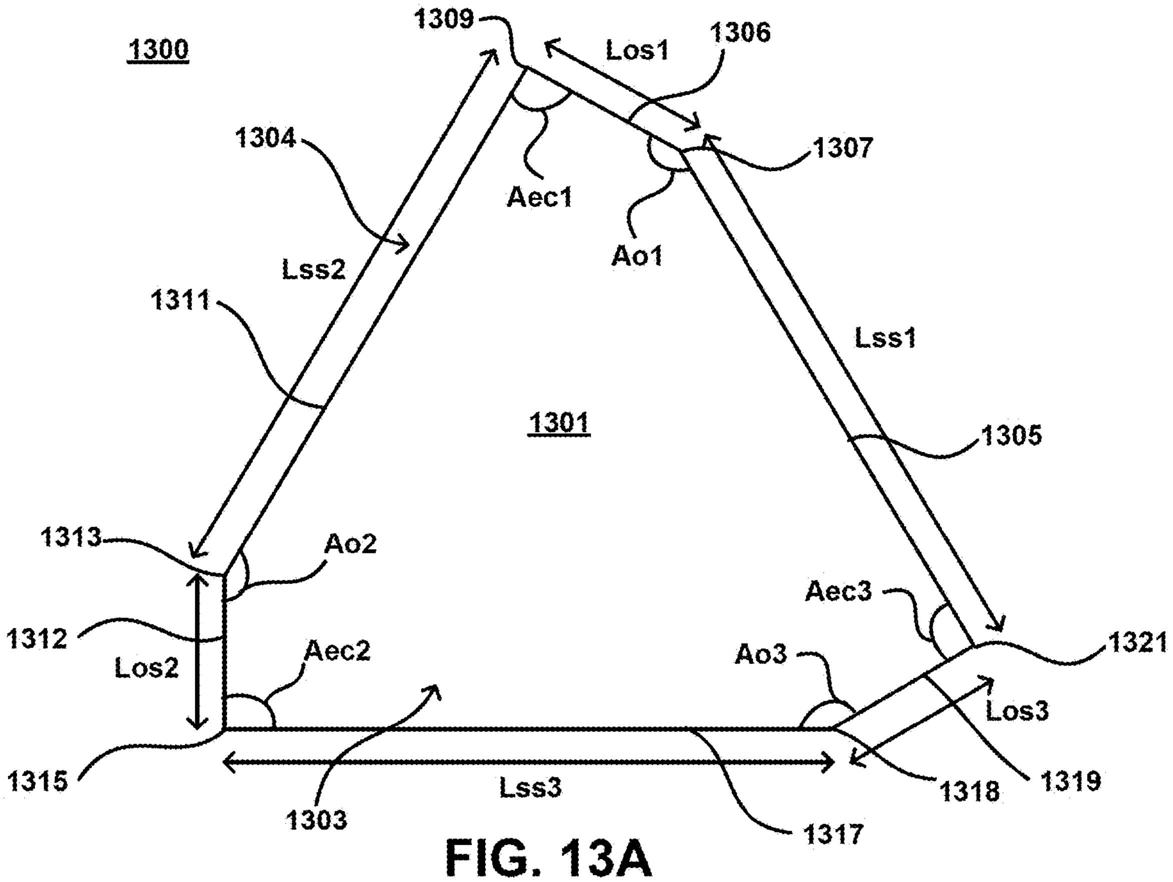
FIGS. 13A-13C include illustrations of shaped abrasive particles in accordance with embodiments.

FIG. 13A includes a top view of a shaped abrasive particle according to an embodiment. The shaped abrasive particle 1300 can have a body 1301 having the features of other shaped abrasive particles of embodiments herein, including an upper major surface 1303 and a bottom major surface (not shown) opposite the upper major surface 1303. The upper major surface 1303 and the bottom major surface can be separated from each other by at least one side surface 1304, which may include one or more discrete side surface sections. According to one embodiment, the body 1301 can be defined as an irregular hexagon, wherein the body has a hexagonal (i.e., six-sided) two dimensional shape as viewed in the plane of a length and a width of the body 1301, and wherein at least two of the sides, such as sides 1305 and 1306, have a different length with respect to each other. Notably, the length of the sides is understood herein to refer to the width of the body 1301 and the length of the body is the greatest dimension extending through the midpoint of the body 1301. Moreover, as illustrated, none of the sides are parallel to each other. And furthermore, while not illustrated, any of the sides may have a curvature to them, including a concave curvature wherein the sides may curve inwards toward the midpoint of the body 1301 between corners joining two sides.

According to a more particular embodiment, the body 1301 can have an oblique, truncated shape as viewed top-down. In such embodiments, the side surface can include a first side section 1305 and a first oblique side section 1306, which can be joined to each other at a first oblique corner 1307 defining a first oblique corner angle Ao1. Notably, the first side section 1305 and the first oblique side section 1306 can be joined to each other in a particular manner such that the first oblique angle Ao1 can be an obtuse angle. In more particular instances, the first oblique angle Ao1 can have an obtuse value of at least about 92 degrees, such as at least about 94 degrees, at least about 96 degrees, at least about 98 degrees, at least about 100 degrees, at least about 102 degrees, at least about 104 degrees, at least about 106 degrees, at least about 108 degrees, at least about 110 degrees, at least about 112 degrees, at least about 124 degrees, at least about 126 degrees, at least about 128 degrees, at least about 120 degrees, at least about 122 degrees, at least about 124 degrees, at least about 126 degrees, at least about 128 degrees, at least about 130 degrees, at least about 132 degrees, at least about 134 degrees, at least about 136 degrees, at least about 138 degrees, or even at least about 140 degrees. Still, in at least one non-limiting embodiment, the first oblique angle Ao1 can be an obtuse angle having a value of not greater than about 176 degrees, such as not greater than about 174 degrees, not greater than about 172 degrees, not greater than about 170 degrees, not greater than about 168 degrees, not greater than about 166 degrees, not greater than about 164 degrees, not greater than about 162 degrees, not greater than about 160 degrees, not greater than about 158 degrees, not greater than about 156 degrees, not greater than about 154 degrees, not greater than about 152 degrees, not greater than about 150 degrees, not greater than about 148 degrees, not greater than about 146 degrees, not greater than about 144 degrees, not greater than about 142 degrees, or even not greater than about 140 degrees. It will be appreciated that the first oblique angle Ao1 can have a value within a range between any of the minimum and maximum values noted above.

As further illustrated in the embodiment of FIG. 13A, the shaped abrasive particle can have a body 1301, wherein the first side section 1305 can have a first side section length (Lss1) and the first oblique side section 1306 can have a length (Los1). In certain instances, the length of the first oblique side section (Los1) can be different than the length of the first side section (Lss1). For example, in certain embodiments, the length of the first oblique side section (Los1) can be greater than the length of the first side section (Lss1) (i.e., Los1>Lss1). In another embodiment, the length of the first side section (Lss1) can be greater than the length of the first oblique side section (Los1) (i.e., Lss1>Los1).

In at least one particular instance, the relationship between the length of the first oblique side section (Los1) and the length of the first side section (Lss1) can define a length factor (Los1/Lss1) that may facilitate improved performance of the shaped abrasive particle 1300. For example, the length factor (Los1/Lss1) can be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, or even not greater than about 0.05. For yet another non-limiting embodiment, the length factor (Los1/Lss1) can be at least about 0.05, such as at least about 0.1, at least about 0.15, at least about 0.2, at least about 0.25, at least about 0.3, at least about 0.35, at least about 0.4, at least about 0.45, at least about 0.5, at least about 0.55, at least about 0.6, at least about 0.65, at least about 0.7, at least about 0.75, at least about 0.8, at least about 0.85, at least about 0.9, or even at least about 0.95. It will be appreciated that the length factor (Los1/Lss1) can be within a range between any of the minimum and maximum values noted above.

According to an alternative embodiment, the relationship between the length of the first oblique side section (Los1) and the length of the first side section (Lss1) can define a length factor (Lss1/Los1) that may facilitate improved performance of the shaped abrasive particle 1300. For example, the length factor (Lss1/Los1) can be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, or even not greater than about 0.05. For yet another non-limiting embodiment, the length factor (Lss1/Los1) can be at least about 0.05, such as at least about 0.1, at least about 0.15, at least about 0.2, at least about 0.25, at least about 0.3, at least about 0.35, at least about 0.4, at least about 0.45, at least about 0.5, at least about 0.55, at least about 0.6, at least about 0.65, at least about 0.7, at least about 0.75, at least about 0.8, at least about 0.85, at least about 0.9, or even at least about 0.95. It will be appreciated that the length factor (Lss1/Los1) can be within a range between any of the minimum and maximum values noted above.

As further illustrated, the second side section 1311 and the first oblique side section 1306 can be joined to each other and define a first external corner 1309. The first external corner 1309 can define a first external corner angle Aec1. In certain instances, the first external corner angle Aec1 can be different than a value of the first oblique angle Ao1. In at least one embodiment, the first external corner angle Aec1 can be less than the value of the first oblique angle Ao1.

The first external corner angle Aec1 may be formed to have a particular value that may facilitate improved performance of the shaped abrasive particle. For example, the first external corner angle Aec1 may be not greater than about 130 degrees, such as not greater than about 125 degrees, not greater than about 120 degrees, not greater than about 115 degrees, not greater than about 110 degrees, not greater than about 105 degrees, not greater than about 100 degrees, not greater than about 95 degrees, not greater than about 94 degrees, or even not greater than about 93 degrees. Still, in at least one non-limiting embodiment, the first external corner angle Aec1 can be at least about 50 degrees, such as at least about 55 degrees, at least about 60 degrees, at least about 65 degrees, at least about 70 degrees, at least about 80 degrees, or even at least about 85 degrees. It will be appreciated that the first external corner angle Aec1 can have a value within a range between any of the minimum and maximum values noted above. In one particular embodiment, the first external corner angle Aec1 can be substantially perpendicular.

The first external corner angle Aec1 and the first oblique angle Ao1 may be formed to have a particular relationship, which may be described as a first angle factor (Aec1/Ao1) having a particular value that may facilitate improved performance of the shaped abrasive particle 1300. For example, the first angle factor (Aec1/Ao1) may be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, or even not greater than about 0.05. In yet another embodiment, the first angle factor (Aec1/Ao1) may be at least about 0.05, such as at least about 0.1, at least about 0.15, at least about 0.2, at least about 0.25, at least about 0.3, at least about 0.35, at least about 0.4, at least about 0.45, at least about 0.5, at least about 0.55, at least about 0.6, at least about 0.65, at least about 0.7, at least about 0.75, at least about 0.8, at least about 0.85, at least about 0.9, or even at least about 0.95. It will be appreciated that the first angle factor (Aec1/Ao1) may be within a range between any of the minimum and maximum values noted above.

As further illustrated, the body 1301 can have a side surface 1304 including a second side section 1311 and a second oblique side section 1312, which can be joined to each other at a second oblique angle Ao2. Notably, the second side section 1311 and the second oblique side section 1312 can be joined to each other in a particular manner such that the second oblique angle Ao2 can be an obtuse angle. In more particular instances, the second oblique angle Ao2 can have an obtuse value of at least about 92 degrees, such as at least about 94 degrees, at least about 96 degrees, at least about 98 degrees, at least about 100 degrees, at least about 102 degrees, at least about 104 degrees, at least about 106 degrees, at least about 108 degrees, at least about 110 degrees, at least about 112 degrees, at least about 124 degrees, at least about 126 degrees, at least about 128 degrees, at least about 120 degrees, at least about 122 degrees, at least about 124 degrees, at least about 126 degrees, at least about 128 degrees, at least about 130 degrees, at least about 132 degrees, at least about 134 degrees, at least about 136 degrees, at least about 138 degrees, or even at least about 140 degrees. Still, in at least one non-limiting embodiment, the second oblique angle Ao2 can be an obtuse angle having a value of not greater than about 176 degrees, such as not greater than about 174 degrees, not greater than about 172 degrees, not greater than about 170 degrees, not greater than about 168 degrees, not greater than about 166 degrees, not greater than about 164 degrees, not greater than about 162 degrees, not greater than about 160 degrees, not greater than about 158 degrees, not greater than about 156 degrees, not greater than about 154 degrees, not greater than about 152 degrees, not greater than about 150 degrees, not greater than about 148 degrees, not greater than about 146 degrees, not greater than about 144 degrees, not greater than about 142 degrees, or even not greater than about 140 degrees. It will be appreciated that the second oblique angle Ao2 can have a value within a range between any of the minimum and maximum values noted above.

Moreover, the shaped abrasive particle can have a body 1301, wherein the second side section 1311 can have a second side section length (Lss2) and the second oblique side section 1312 can have a length (Los2). In certain instances, the length of the second oblique side section (Los2) can be different than the length of the second side section (Lss2). For example, in certain embodiments, the length of the second oblique side section (Los2) can be greater than the length of the second side section (Lss2) (i.e., Los2>Lss2). In another embodiment, the length of the second side section (Lss2) can be greater than the length of the second oblique side section (Los2) (i.e., Lss2>Los2).

In at least one aspect, the relationship between the length of the second oblique side section (Los2) and the length of the second side section (Lss2) can define a length factor (Los2/Lss2) that may facilitate improved performance of the shaped abrasive particle 1300. For example, the length factor (Los2/Lss2) can be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, or even not greater than about 0.05. For yet another non-limiting embodiment, the length factor (Los2/Lss2) can be at least about 0.05, such as at least about 0.1, at least about 0.15, at least about 0.2, at least about 0.25, at least about 0.3, at least about 0.35, at least about 0.4, at least about 0.45, at least about 0.5, at least about 0.55, at least about 0.6, at least about 0.65, at least about 0.7, at least about 0.75, at least about 0.8, at least about 0.85, at least about 0.9, or even at least about 0.95. It will be appreciated that the length factor (Los2/Lss2) can be within a range between any of the minimum and maximum values noted above.

In an alternative embodiment, the relationship between the length of the second oblique side section (Los2) and the length of the second side section (Lss2) can define a length factor (Lss2/Los2) that may facilitate improved performance of the shaped abrasive particle 1300. For example, the length factor (Lss2/Los2) can be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, or even not greater than about 0.05. For yet another non-limiting embodiment, the length factor (Lss2/Los2) can be at least about 0.05, such as at least about 0.1, at least about 0.15, at least about 0.2, at least about 0.25, at least about 0.3, at least about 0.35, at least about 0.4, at least about 0.45, at least about 0.5, at least about 0.55, at least about 0.6, at least about 0.65, at least about 0.7, at least about 0.75, at least about 0.8, at least about 0.85, at least about 0.9, or even at least about 0.95. It will be appreciated that the length factor (Lss2/Los2) can be within a range between any of the minimum and maximum values noted above.

Additionally, the length of the second side section (Lss2) relative to the length of the first side section (Lss1) may be controlled to facilitate improved performance of the shaped abrasive particle 1300. In one embodiment, Lss2 is different compared to Lss1. For example, Lss2 can be greater than Lss1. In still other embodiments, Lss2 can be less than Lss1. For yet another embodiment, such as illustrated in FIG. 13A, Lss1 and Lss2 can be essentially the same compared to each other.

Moreover, the length of the second oblique side section (Los2) relative to the length of the first oblique side section (Los1) may be controlled to facilitate improved performance of the shaped abrasive particle 1300. In one embodiment, Los2 is different compared to Los1. For example, Los2 can be greater than Los1. In still other embodiments, Los2 can be less than Los1. For yet another embodiment, such as illustrated in FIG. 13A, Los1 and Los2 can be essentially the same compared to each other.

As further illustrated, the side surface 1304 can include a third side section 1317 joined to the second oblique side section 1312 to define a second external corner 1315. The second external corner 1315 can define a second external corner angle Aec2. In certain instances, the second external corner angle Aec2 can be different than a value of the second oblique angle Ao2. In at least one embodiment, the second external corner angle Aec2 can be less than the value of the second oblique angle Ao2.

The second external corner angle Aec2 can be formed to have a particular value that may facilitate improved performance of the shaped abrasive particle. For example, the second external corner angle Aec2 may be not greater than about 130 degrees, such as not greater than about 125 degrees, not greater than about 120 degrees, not greater than about 115 degrees, not greater than about 110 degrees, not greater than about 105 degrees, not greater than about 100 degrees, not greater than about 95 degrees, not greater than about 94 degrees, or even not greater than about 93 degrees. Still, in at least one non-limiting embodiment, the second external corner angle Aec2 can be at least about 50 degrees, such as at least about 55 degrees, at least about 60 degrees, at least about 65 degrees, at least about 70 degrees, at least about 80 degrees, or even at least about 85 degrees. It will be appreciated that the second external corner angle Aec2 can have a value within a range between any of the minimum and maximum values noted above. In one particular embodiment, the second external corner angle Aec2 can be substantially perpendicular.

The second external corner angle Aec2 and the second oblique angle Ao2 may be formed to have a particular relationship with respect to each other, which may be described as a second angle factor (Aec2/Ao2) having a particular value that may facilitate improved performance of the shaped abrasive particle 1300. For example, the second angle factor (Aec2/Ao2) may be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, or even not greater than about 0.05. In yet another embodiment, the second angle factor (Aec2/Ao2) may be at least about 0.05, such as at least about 0.1, at least about 0.15, at least about 0.2, at least about 0.25, at least about 0.3, at least about 0.35, at least about 0.4, at least about 0.45, at least about 0.5, at least about 0.55, at least about 0.6, at least about 0.65, at least about 0.7, at least about 0.75, at least about 0.8, at least about 0.85, at least about 0.9, or even at least about 0.95. It will be appreciated that the second angle factor (Aec2/Ao2) may be within a range between any of the minimum and maximum values noted above.

As further illustrated, the body 1301 can have a side surface 1304 including the third side section 1317 and a third oblique side section 1319, which can be joined to each other at a third oblique corner 1318 defining a third oblique angle Ao3. Notably, the third side section 1317 and the third oblique side section 1319 can be joined to each other in a particular manner such that the third oblique angle Ao3 can be an obtuse angle. In more particular instances, the third oblique angle Ao3 can have an obtuse value of at least about 92 degrees, such as at least about 94 degrees, at least about 96 degrees, at least about 98 degrees, at least about 100 degrees, at least about 102 degrees, at least about 104 degrees, at least about 106 degrees, at least about 108 degrees, at least about 110 degrees, at least about 112 degrees, at least about 124 degrees, at least about 126 degrees, at least about 128 degrees, at least about 120 degrees, at least about 122 degrees, at least about 124 degrees, at least about 126 degrees, at least about 128 degrees, at least about 130 degrees, at least about 132 degrees, at least about 134 degrees, at least about 136 degrees, at least about 138 degrees, or even at least about 140 degrees. Still, in at least one non-limiting embodiment, the third oblique angle Ao3 can be an obtuse angle having a value of not greater than about 176 degrees, such as not greater than about 174 degrees, not greater than about 172 degrees, not greater than about 170 degrees, not greater than about 168 degrees, not greater than about 166 degrees, not greater than about 164 degrees, not greater than about 162 degrees, not greater than about 160 degrees, not greater than about 158 degrees, not greater than about 156 degrees, not greater than about 154 degrees, not greater than about 152 degrees, not greater than about 150 degrees, not greater than about 148 degrees, not greater than about 146 degrees, not greater than about 144 degrees, not greater than about 142 degrees, or even not greater than about 140 degrees. It will be appreciated that the third oblique angle Ao3 can have a value within a range between any of the minimum and maximum values noted above.

In certain instances, the shaped abrasive particle can have a body 1301, wherein the third side section 1317 can have a third side section length (Lss3) and the third oblique side section 1319 can have a length (Los3). Moreover, the length of the third oblique side section (Los3) can be different than the length of the third side section (Lss3). For example, in certain embodiments, the length of the third oblique side section (Los3) can be greater than the length of the third side section (Lss3) (i.e., Los3>Lss3). In another embodiment, the length of the third side section (Lss3) can be greater than the length of the third oblique side section (Los3) (i.e., Lss3>Los3).

In at least one aspect, the relationship between the length of the third oblique side section (Los3) and the length of the third side section (Lss3) can define a length factor (Los3/Lss3), which may facilitate improved performance of the shaped abrasive particle 1300. For example, the length factor (Los3/Lss3) can be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, or even not greater than about 0.05. For yet another non-limiting embodiment, the length factor (Los3/Lss3) can be at least about 0.05, such as at least about 0.1, at least about 0.15, at least about 0.2, at least about 0.25, at least about 0.3, at least about 0.35, at least about 0.4, at least about 0.45, at least about 0.5, at least about 0.55, at least about 0.6, at least about 0.65, at least about 0.7, at least about 0.75, at least about 0.8, at least about 0.85, at least about 0.9, or even at least about 0.95. It will be appreciated that the length factor (Los3/Lss3) can be within a range between any of the minimum and maximum values noted above.

In an alternative embodiment, the relationship between the length of the third oblique side section (Los3) and the length of the third side section (Lss3) can define a length factor (Lss3/Los3) that may facilitate improved performance of the shaped abrasive particle 1300. For example, the length factor (Lss3/Los3) can be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, or even not greater than about 0.05. For yet another non-limiting embodiment, the length factor (Lss3/Los3) can be at least about 0.05, such as at least about 0.1, at least about 0.15, at least about 0.2, at least about 0.25, at least about 0.3, at least about 0.35, at least about 0.4, at least about 0.45, at least about 0.5, at least about 0.55, at least about 0.6, at least about 0.65, at least about 0.7, at least about 0.75, at least about 0.8, at least about 0.85, at least about 0.9, or even at least about 0.95. It will be appreciated that the length factor (Lss3/Los3) can be within a range between any of the minimum and maximum values noted above.

Additionally, the length of the third side section (Lss3) relative to the length of the first side section (Lss1) may be controlled to facilitate improved performance of the shaped abrasive particle 1300. In one embodiment, Lss3 can be different compared to Lss1. For example, Lss3 can be greater than Lss1. In still other embodiments, Lss3 can be less than Lss1. For yet another embodiment, such as illustrated in FIG. 13A, Lss3 and Lss1 can be essentially the same compared to each other.

In another aspect, the length of the third side section (Lss3) relative to the length of the second side section (Lss2) may be controlled to facilitate improved performance of the shaped abrasive particle 1300. In one embodiment, Lss3 can be different compared to Lss2. For example, Lss3 can be greater than Lss2. In still other embodiments, Lss3 can be less than Lss2. For yet another embodiment, such as illustrated in FIG. 13A, Lss3 and Lss2 can be essentially the same compared to each other.

Moreover, the length of the third oblique side section (Los3) relative to the length of the first oblique side section (Los1) may be controlled to facilitate improved performance of the shaped abrasive particle 1300. In one embodiment, Los3 can be different compared to Los1. For example, Los3 can be greater than Los1. In still other embodiments, Los3 can be less than Los1. For yet another embodiment, such as illustrated in FIG. 13A, Los3 and Los1 can be essentially the same compared to each other.

For another embodiment, the length of the third oblique side section (Los3) relative to the length of the second oblique side section (Los2) may be controlled to facilitate improved performance of the shaped abrasive particle 1300. In one embodiment, Los3 can be different compared to Los2. For example, Los3 can be greater than Los2. In still other embodiments, Los3 can be less than Los2. For yet another embodiment, such as illustrated in FIG. 13A, Los3 and Los2 can be essentially the same compared to each other.

As further illustrated, the first side section 1305 and the third oblique side section 1319 can be joined to each other at a third external corner 1321, which defines a third external corner angle Aec3. In certain instances, the third external corner angle Aec3 can be different than a value of the third oblique angle Ao3. In at least one embodiment, the third external corner angle Aec3 can be less than the value of the third oblique angle Ao3.

The third external corner angle Aec3 can be formed to have a particular value that may facilitate improved performance of the shaped abrasive particle. For example, the third external corner angle Aec3 may be not greater than about 130 degrees, such as not greater than about 125 degrees, not greater than about 120 degrees, not greater than about 115 degrees, not greater than about 110 degrees, not greater than about 105 degrees, not greater than about 100 degrees, not greater than about 95 degrees, not greater than about 94 degrees, or even not greater than about 93 degrees. Still, in at least one non-limiting embodiment, the third external corner angle Aec3 can be at least about 50 degrees, such as at least about 55 degrees, at least about 60 degrees, at least about 65 degrees, at least about 70 degrees, at least about 80 degrees, or even at least about 85 degrees. It will be appreciated that the third external corner angle Aec3 can have a value within a range between any of the minimum and maximum values noted above. In one particular embodiment, the third external corner angle Aec3 can be substantially perpendicular.

The third external corner angle Aec3 and the third oblique angle Ao3 may be formed to have a particular relationship with respect to each other, which may be described as a third angle factor (Aec3/Ao3) having a particular value that may facilitate improved performance of the shaped abrasive particle 1300. For example, the third angle factor (Aec3/Ao3) may be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, or even not greater than about 0.05. In yet another embodiment, the third angle factor (Aec3/Ao3) may be at least about 0.05, such as at least about 0.1, at least about 0.15, at least about 0.2, at least about 0.25, at least about 0.3, at least about 0.35, at least about 0.4, at least about 0.45, at least about 0.5, at least about 0.55, at least about 0.6, at least about 0.65, at least about 0.7, at least about 0.75, at least about 0.8, at least about 0.85, at least about 0.9, or even at least about 0.95. It will be appreciated that the third angle factor (Aec3/Ao3) may be within a range between any of the minimum and maximum values noted above.

Figure 13B:
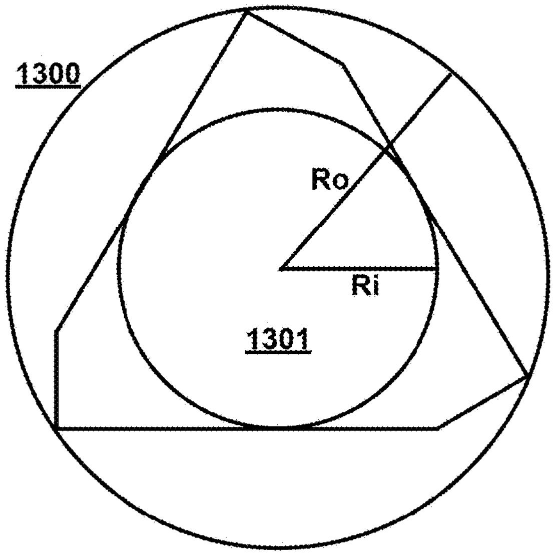

FIG. 13B includes a top view of the shaped abrasive particle of FIG. 13A according to an embodiment. The shaped abrasive particle 1300 can have a body 1301 having any of the features of the embodiments herein. Notably, the body 1301 has a Shape Index of approximately 0.63.

Figure 13C:
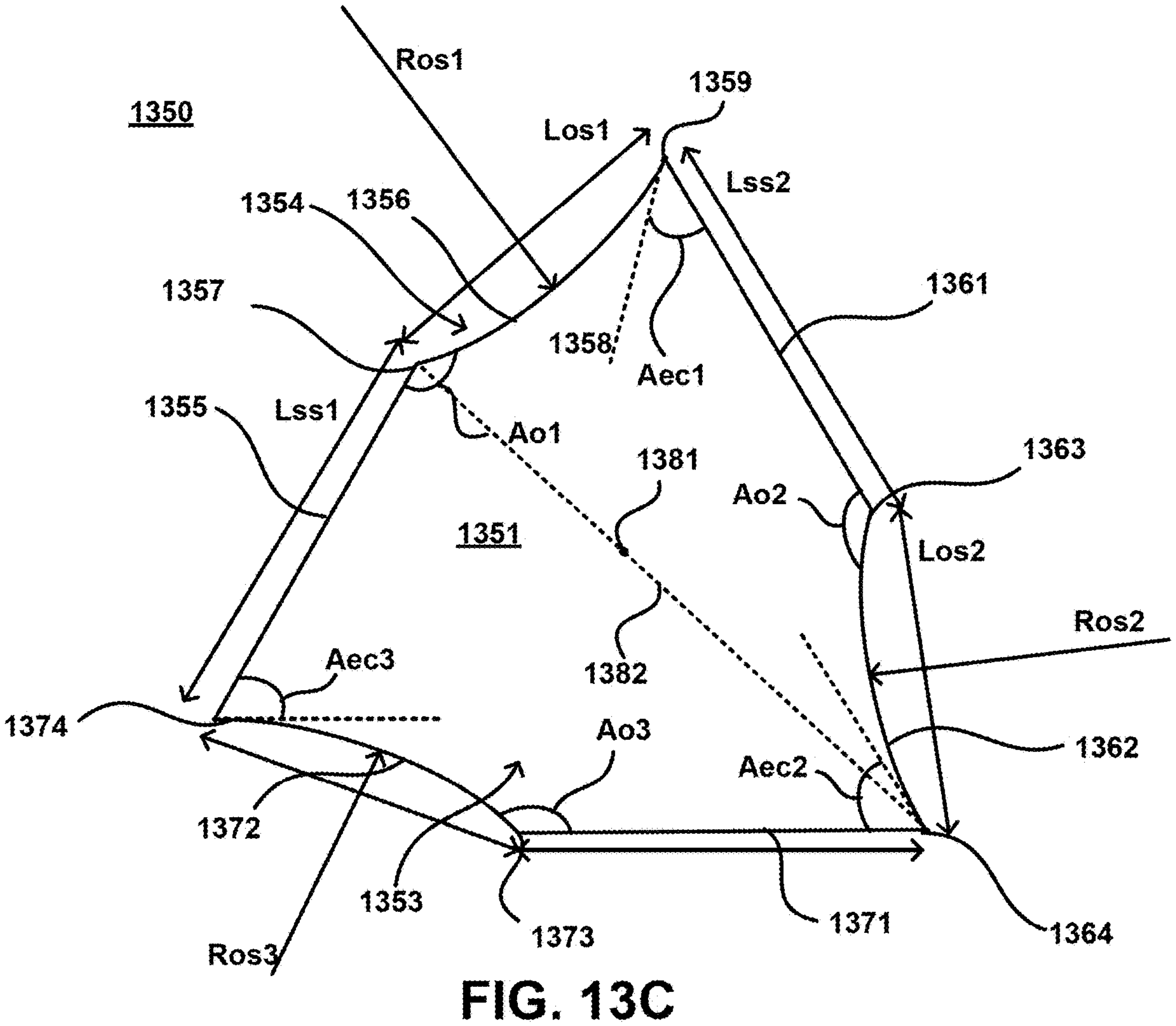

FIG. 13C includes a top view of a shaped abrasive particle according to an embodiment. The shaped abrasive particle 1350 can have a body 1351 having the features of other shaped abrasive particles of embodiments herein, including an upper major surface 1353 and a bottom major surface (not shown) opposite the upper major surface 1353. The upper major surface 1353 and the bottom major surface can be separated from each other by at least one side surface 1354, which may include one or more discrete side surface sections. According to one embodiment, the body 1351 can be defined as an irregular hexagon, wherein the body has a hexagonal (i.e., six-sided) two dimensional shape as viewed in the plane of a length and a width of the body 1351, and wherein at least two of the side sections, such as side sections 1355 and 1356, have a different length with respect to each other. Moreover, as illustrated, none of the sides are parallel to each other. And furthermore, while not illustrated, any of the sides may have a curvature to them, including a concave curvature wherein the sides may curve inwards toward the midpoint of the body 1351 between corners joining two sides.

The body 1351 can have an oblique, truncated shape as viewed top-down, and more particularly, can have an oblique, truncated shape with at least one portion of the side surface 1354 that is curved. The body 1351 can have any of the features of the body 1300 of the shaped abrasive particle of FIG. 13A. In one embodiment, the side surface 1354 can include a first side section 1355 and a first oblique side section 1356, which can be joined to each other at a first oblique corner 1357 defining a first oblique corner angle Ao1, which may have an obtuse value. Notably, the first side section 1355 can have a substantially linear contour. The first oblique side section 1356 can be substantially non-linear, such that at least a portion of the first oblique side section comprises a curvature. In one embodiment, the entire length of the first oblique side section 1356 can have a curvature. For example, the entire length of the first oblique side section 1356 extending between the first oblique corner 1357 and the first exterior corner 1359 can be curved. In a more particular embodiment, the first oblique side section 1356 can have a curvature, and that curvature can define a monotonic curve. The first oblique side section 1356 may define a concave curvature, such that the portion of the body defined by the first oblique side section 1356 extends inward toward a midpoint 1381 of the body 1351.

In another instance, the first oblique side section 1356 can have a curvature defining an arc segment of a circle and defining a radius of the first oblique side section (Ros1). The size of the radius (Ros1) of the first oblique side section 1356 may be controlled to facilitate improved performance of the body 1351. According to at least one embodiment, the radius of the first oblique side section (Ros1) can be different than the length of the first oblique side section (Los1), wherein Los1 is measured as the shortest linear distance between the corners 1357 and 1359. In more particular instances, the radius of the first oblique side section (Ros1) can be greater than the length of the first oblique side section (Los1). The relationship between Ros1 and Los1 can be the same as the relationship between Lss1 and Los1 as defined in the embodiments herein.

In yet another embodiment, the radius of the first oblique side section (Ros1) can be controlled relative to the length of the first side section (Lss1), which may facilitate improved performance of the body 1351. For example, the radius of the first oblique side section (Ros1) can be different than the length of the first side section (Lss1). In particular, the relationship between Ros1 and Lss1 can be the same as the relationship between Lss1 and Los1 as defined in the embodiments herein. In particular instances, the radius of the first oblique side section (Ros1) can be greater than the length of the first side section (Lss1). Still, in another embodiment, the radius of the first oblique side section (Ros1) can be less than the length of the first side section (Lss1).

In still another aspect, the radius of the first oblique side section (Ros1) can be controlled relative to the total length of the first side, including the length of the first side section (Lss1) and the length of the first oblique side section (Los1), which may facilitate improved performance of the body 1351. For example, the radius of the first oblique side section (Ros1) can be different than the total length of the first side section (Lss1) and the first oblique side section (Los1). In particular instances, the radius of the first oblique side section (Ros1) can be greater than the total length of the first side section (Lss1) and the first oblique side section (Los1). Still, in another embodiment, the radius of the first oblique side section (Ros1) can be less than the total length of the first side section (Lss1) and the first oblique side section (Los1).

According to one embodiment, the radius of the first oblique side section can be not greater than 10 mm, such as not greater than 9 mm or not greater than 8 mm or not greater than 7 mm or not greater than 6 mm or not greater than 5 mm or not greater than 4 mm or not greater than 3 mm or even not greater than 2 mm. Still, in at least one non-limiting embodiment, the radius of the first oblique side section (Ros1) can be at least 0.01 mm, such as at least 0.05 mm or at least 0.1 mm or at least 0.5 mm. It will be appreciated that the radius of the first oblique side section can be within a range including any of the minimum and maximum values noted above.

Any reference to the angles of the body, including for example the first oblique angle (Ao1), first external corner angle (Aec1), second oblique angle (Ao2), second external corner angle (Aec2), third oblique angle (Ao3), and third external corner angle (Aec3) can be the same as provided in the embodiments herein. Notably, provision of at least one oblique side section having a curvature can reduce the angle at the adjoining corners where the curved section terminates (e.g., corners 1357 and 1359). As illustrated, the angle of the first external corner (Aec1) can be measured as the angle created by the second side section 1361 and the tangent 1358 to the first oblique side section 1356 at the corner 1359 which is shown by the dotted line. Moreover, the provision of a first oblique side section 1356 having a curvature can facilitate a lower rake angle and improved grinding performance at the corner 1359 for the body 1351 in the orientation as shown or in the mirror image of the orientation of the body 1351 as shown in FIG. 13C. Reduction in the rake angle for multiple orientations may facilitate improved grinding performance by the body 1351 in a variety of orientations.

As further illustrated, the body 1351 can include a second side section 1361 and second oblique side section 1362 joined to each other at the corner 1363, which may define a second oblique corner angle angle (Ao2), which may have an obtuse value. The second side section 1361 can be coupled to the first oblique side section 1356 at the first external corner 1359, wherein the first external corner 1359 defines the first external corner angle (Aec1) and wherein the first external corner angle (Aec1) is different than a value of the first oblique angle (Ao1) as described in accordance with other embodiments herein. The first external corner 1359 can be defined by a joint between a curved portion of the first oblique side section 1356 and a linear portion of the second side section 1362.

As further illustrated, and according to an embodiment, at least a portion of the second oblique side section 1362 comprises a curvature, and more particularly, the entire length of the second oblique side section 1362 can have a curvature. In at least one embodiment, the second oblique side section 1362 can have a monotonic curve. The second oblique side section 1362 can have a curvature defining an arc segment of a circle and defining a radius of the second oblique side section (Ros2). In at least one embodiment, Ros1 and Ros2 can be substantially the same. Moreover, the relative curvature of the first oblique side section 1356 can be substantially the same as the curvature of the second oblique side section 1362. Still, in another embodiment, Ros1 and Ros2 can be different compared to each other. Moreover, the relative curvature of the first oblique side section 1356 can be different compared to the curvature of the second oblique side section 1362.

The body 1351 can include a third side section 1371 and third oblique side section 1372 joined to each other at the corner 1373, which may define a third oblique corner angle angle (Ao3), which may have an obtuse value. The third side section 1371 can be coupled to the second oblique side section 1362 at the second external corner 1364, wherein the second external corner 1364 defines the second external corner angle (Aec2), which can have any of the attributes of similar corners of shaped abrasive particles described herein. The second external corner 1364 can be defined by a joint between a curved portion of the second oblique side section 1362 and a linear portion of the third side section 1372. The body also includes a third external corner 1374 between the third oblique side section 1372 and the first side section 1355. The third external corner 1374 can define a third external corner angle (Aec3), which can have any of the attributes of similar corners described in embodiments herein. Moreover, the third side section 1371, third oblique side section 1372, and radius of the third oblique side section can have any of the same features of corresponding elements described in the embodiments herein In yet another embodiment, the body 1301 can have at least one central axis 1382 extending from an external corner (e.g., corner 1364) and through the midpoint 1381 of the body 1351 to bisect the body 1351. According to one embodiment, the body 1351 can be asymmetric about the central axis 1382. That is, the shape of the body 1351 as defined by the contour of the side surface 1354 as viewed top down on either side of the central axis 1382 are not identical, and therefore, the central axis 1382 defines an axis of asymmetry. In other instances, the body can have more than one central axis defining an axis of asymmetry, including for example, at least three different central axes, wherein the body is asymmetric about each of the three different central axes.

The shaped abrasive particles of the embodiments herein, including but not limited to the body 1351 of the shaped abrasive particle 1350 can have a side surface including at least 5 different side sections, wherein the 5 different side sections are separated by a corner, which may be an external corner. External corners are those corners over which a hypothetical rubber band would be deflected. That is, if a hypothetical rubber band were placed around the side surface 1354 of the body 1351, it should be deflected around the corners 1357, 1359, 1363, 1364, 1373, and 1374. Each of the external corners 1357, 1359, 1363, 1364, 1373, and 1374 define and separate distinct side sections of the side surface 1354. In at least one embodiment, the side surface 1354 of the body 1351 comprises at least two linear portions separated by at least one curved portion. For example, the body 1351 can include a first side section 1355 and a second side section 1361 separated from each other by the first oblique side section 1356. In still another embodiment, the side surface 1354 of the body 1351 comprises linear portions and curved portions which are alternating with respect to each other. For example, the side surface 1354 of the body 1351 comprises linear portions and curved portions and wherein each linear portion is joined to at least one curved portion, and furthermore, may be connected to each other at an exterior corner. The body 1351 does not necessarily have two linear portions directly connected to each other or two curved portions directly connected to each other. It will be appreciated that this is true for one non-limiting embodiment, and other shapes may have linear portions and/or curved portions directly connected to each other.

In a particular instance, the shaped abrasive particles of the embodiments herein can have a particular draft angle at the intersection of the smallest major surface and the side surface, which may be indicative of a particular aspect of forming and/or may facilitate improved performance of the abrasive particle. In one particular instance, the shaped abrasive particles herein can have an average draft angle, which can be an average measure of draft angle for a statistically relevant and random sample size of shaped abrasive particles (e.g., at least 20 particles). In a particular instance, the average draft angle can be not greater than 95°, such as not greater than 94° or no greater than 93° or not greater than 92° or not greater than 91° or even not greater than 90°. In at least one non-limiting embodiment, the shaped abrasive particles of the embodiments herein can have an average draft angle of at least 80° such as at least 82° or at least 84° or at least 85° or at least 86° or at least 87°. It will be appreciated that the shaped abrasive particles of the embodiments herein can have an average draft angle within a range including any of the minimum and maximum values noted above, including but not limited to, within a range of at least 80° and not greater than 95° or within a range including at least 80° and not greater than 94° or within a range including at least 82° and not greater than 93° or within a range including at least 84° and not greater than 93°.

Figure 13D:
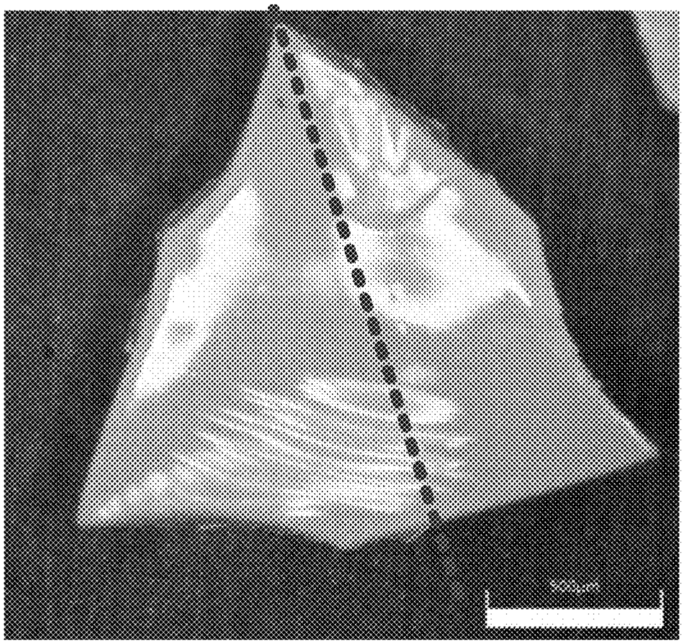
FIG. 13D includes a top-down image of a shaped abrasive particle with a line of sectioning for measurement of a draft angle according to an embodiment.
Figure 13E:
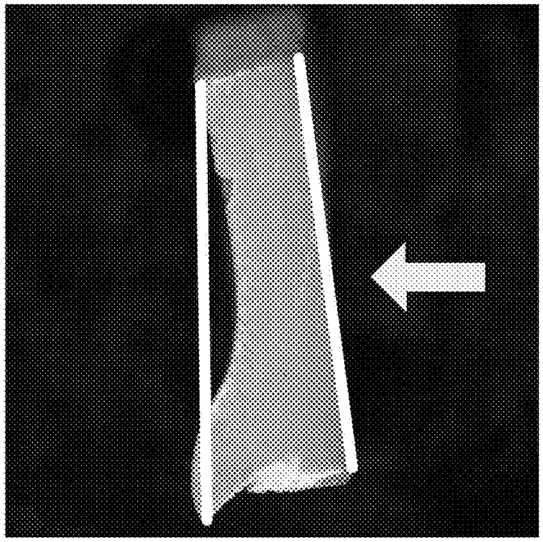
FIG. 13E includes a cross-sectional image of a shaped abrasive particle for measurement of a draft angle according to an embodiment.

The draft angle can be measured by cutting the shaped abrasive particle in half at an approximately 90° angle with respect to the major surface and at a perpendicular angle to one of the side surfaces, such as shown by the dotted line in FIG. 13D. As best as possible, the sectioning line should extend perpendicular to the side surface and through the midpoint of a major surface of the particle. The portion of the shaped abrasive particle is then mounted and viewed via SEM in a manner that is similar to that provided in FIG. 13E. A suitable program for such includes ImageJ software. Using the image of the body, the smallest major surface is determined by identifying the largest major surface and selecting the surface opposite thereof. Certain shaped abrasive particles may have a generally square cross-sectional shape. To identify the smallest major surface, the largest major surface must first be determined. The smallest major surface is that surface opposite the largest major surface. The imaging software, such as ImageJ may be utilized to assist with the determination of the smallest major surface. Using a suitable image processing software (e.g., ImageJ) draw a straight line along both of the major surfaces between the corners adjoining the major surfaces and the sidewall as provided by the lines below in FIG. 13E. Using the image analysis software, measure the line that longer. The shorter of the two lines is presumed to be the smaller of the two major surfaces. In the case provided in FIG. 13E, the line on the right of the image is shorter and the draft angle should be measured at the corner identified at the upper right-hand corner, which is also illustrated in FIG. 13F.

Figure 13F:
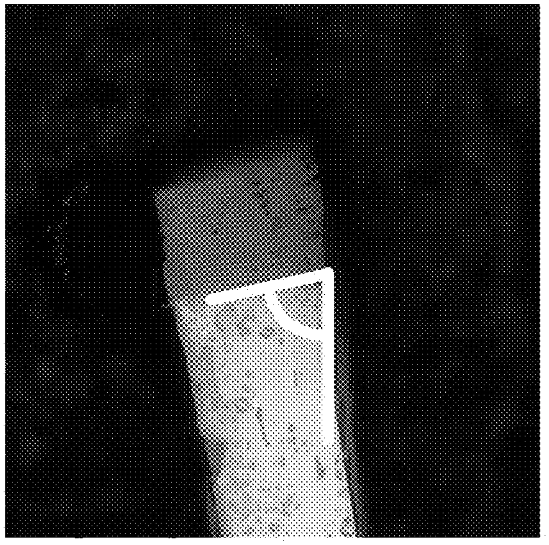
FIG. 13F includes a cross-sectional image of a shaped abrasive particle for measurement of a draft angle according to an embodiment.
Figure 15C:
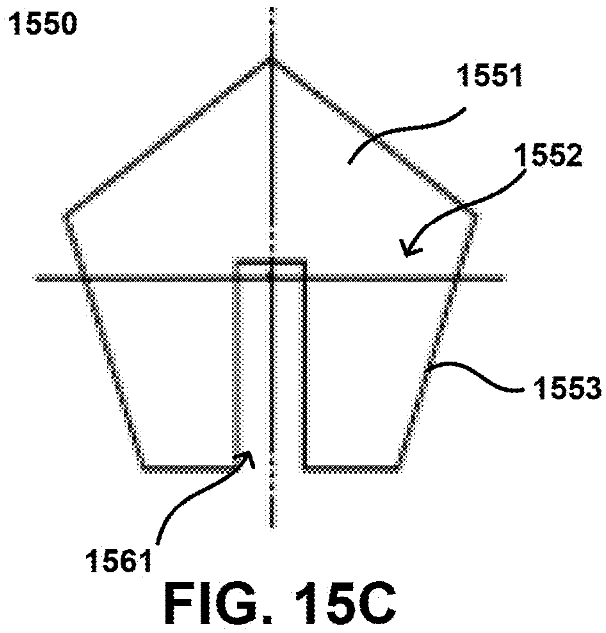
FIG. 15C includes a top-down view of a shaped abrasive particle according to an embodiment.

To measure the draft angle, lines can be drawn along the smallest major surface and the side surface to form an intersecting angle as provided in FIG. 13F. The lines are drawn taking into consideration the shape of the surfaces as a whole and ignoring imperfections or other non-representative surface undulations at the corner of the particle (e.g., cracks or chips due to mounting procedures, etc.). Moreover, the lines representing the smaller major surface and side surface are drawn to represent the portion of the major surface and side surface that connect the sidewall to the smaller major surface at the draft angle. The draft angle (i.e., the angle of the body as measured at the intersection) is determined by the interior angle formed at the intersection of the lines.

FIG. 14 includes a top-down illustration of a shaped abrasive particle according to an embodiment. As illustrated, the shaped abrasive particle 1400 can include a body 1401 having an upper major surface 1403 (i.e., a first major surface) and a bottom major surface (i.e., a second major surface) opposite the upper major surface 1403. The upper surface 1403 and the bottom surface can be separated from each other by at least one side surface 1405, which may include one or more discrete side surface portions, including for example, a first portion 1406 of the side surface 1405, a second portion 1407 of the side surface 1405, and a third portion 1408 of the side surface 1405. In particular, the first portion 1406 of the side surface 1405 can extend between a first corner 1409 and a second corner 1410. Notably, the first corner 1409 can be an external corner joining two portions of the side surface 1405. The first corner 1409 and second corner 1410, which is also an external corner, are adjacent to each other and have no other external corners disposed between them. External corners of a body are defined by the joining of two linear sections when viewing the body of the shaped abrasive particle top down. External corners or exterior corners may also be defined as those corners over which a hypothetical rubber band would be deflected if it were placed around the periphery of the body as defined by the side surface 1405.

The second portion 1407 of the side surface 1405 can extend between a second corner 1410 and a third corner 1411. Notably, the second corner 1410 can be an external corner joining two portions of the side surface 1405. The second corner 1410 and third corner 1411, which can also be an external corner, are adjacent to each other and have no other external corners disposed between them. Also, the third portion 1408 of the side surface 1405 can extend between the third corner 1411 and the first corner 1409, which are both external corners that are adjacent to each other, having no other external corners disposed between them. Moreover, as illustrated in the top down view of FIG. 14, the first portion 1406, second portion 1407, and third portion 1408 of the side surface 1405 may be joined to each other at edges extending between the upper major surface 1403 and the bottom major surface 1404.

The body 1401 can have a length (L or Lmiddle) as shown in FIG. 14, which may be measured as the longest dimension extending from an external corner (e.g., 1410) to a midpoint at the opposite side surface (e.g., the third portion 1408 of the side surface 1405). Notably, in some embodiments, such as illustrated in FIG. 14, the length can extend through a midpoint 1481 of the upper surface 1403 of the body 1401, however, this may not necessarily be the case for every embodiment. Moreover, the body 1401 can have a width (W), which is the measure of the longest dimension of the body 1401 along a discrete side surface portion of the side surface 1405. The height of the body may be generally the distance between the upper major surface 1403 and the bottom major surface (not illustrated). As described in embodiments herein, the height may vary in dimension at different locations of the body 1401, such as at the corners versus at the interior of the body 1401.

As illustrated, the body 1401 of the shaped abrasive particle 1400 can have a generally polygonal shape as viewed in a plane parallel to the upper surface 1403, and more particularly, a hybrid polygonal two-dimensional shape as viewed in the plane of the width and length of the body. As noted in other embodiments herein, the body 1401 can be formed to have a primary aspect ratio, which can be a ratio expressed as width:length, having the values described in embodiments herein. In other instances, the body 1401 can be formed such that the primary aspect ratio (w:1) can be at least about 1.5:1, such as at least about 2:1, at least about 4:1, or even at least about 5:1. Still, in other instances, the abrasive particle 1400 can be formed such that the body 1401 has a primary aspect ratio that is not greater than about 10:1, such as not greater than 9:1, not greater than about 8:1, or even not greater than about 5:1. It will be appreciated that the body 1401 can have a primary aspect ratio within a range between any of the ratios noted above.

In addition to the primary aspect ratio, the abrasive particle 1400 can be formed such that the body 1401 comprises a secondary aspect ratio, which can be defined as a ratio of length:height, wherein the height may be an interior median height (Mhi) measured at the midpoint 1481. In certain instances, the secondary aspect ratio can be at least about 1:1, such as at least about 2:1, at least about 4:1, at least about 5:1, at least about 6:1, at least about 7:1, at least about 8:1, at least about 9:1, or at least about 10:1. Still, in other instances, the abrasive particle 1400 can be formed such that the body 1401 has a secondary aspect ratio that is not greater than about 1:3, such as not greater than 1:2, or even not greater than about 1:1. It will be appreciated that the body 1401 can have a secondary aspect ratio within a range between any of the ratios noted above, such as within a range between about 5:1 and about 1:1.

In accordance with another embodiment, the abrasive particle 1400 can be formed such that the body 1401 comprises a tertiary aspect ratio, defined by the ratio width: height, wherein the height may be an interior median height (Mhi). The tertiary aspect ratio of the body 1401 can be at least about 1:1, such as at least about 2:1, at least about 4:1, at least about 5:1, at least about 6:1, at least about 8:1, or at least about 10:1. Still, in other instances, the abrasive particle 1400 can be formed such that the body 1401 has a tertiary aspect ratio that is not greater than about 3:1, such as not greater than 2:1, or even not greater than about 1:1. It will be appreciated that the body 1401 can have a tertiary aspect ratio within a range between any of the ratios noted above, such as within a range between about 6:1 and about 1:1.

In one aspect, the body 1401 of the shaped abrasive particle 1400 can have a first portion 1406 of the side surface 1405 with a partially-concave shape. As shown in FIG. 14, a partially concave shape includes a curved section 1442, wherein the first curved section length (Lc1) can extend for a fraction of the total length (Lfp1) of the first portion 1406 of the side surface 1405 between the adjacent corners 1409 and 1410. In an embodiment, the total length (Lfp1) can be equivalent to a width of the body 1401. Moreover, as further illustrated, the first curved section 1442 can be disposed between a first linear section 1441 and a second linear section 1443. The first linear section 1441 can terminate at a first end at the external corner 1409 of the body 1401, extend along the first portion 1406 of the side surface 1405 for a length (Ll1), and terminate at a second end at the joining of the first linear section 1441 with the first curved section 1442. The first curved section 1442 and the first linear section 1441 can define a first interior corner 1445, which along with the first linear section 1441 and the first curved section 1442 can define a first interior angle 1447 having an obtuse value. The second linear section 1443 can terminate at a first end at the external corner 1410, extend along the first portion 1406 of the side surface 1405 for a length (Ll2), and terminate at a second end at the joining of the second linear section 1443 with the first curved section 1442. The second linear section 1443 and the first curved section 1442 can define a second interior corner 1446. The second interior corner 1446, along with the second linear section 1443 and the first curved section 1442 can define a second interior angle 1448 having an obtuse value.

As will be appreciated, the first linear section 1441 and the second linear section 1443 can be substantially linear when viewed from the top down, as illustrated in FIG. 14. The first curved section 1442 can have a significant arcuate contour when viewed from the top down, also as shown in FIG. 14. In certain instances, the body 1401 may be referred to as a hybrid polygonal shape, wherein a sum of the external corners is substantially 180 degrees, and wherein at least a portion of the side surface (e.g., the first portion 1406) has an arcuate curvature, such as the contour of the first curved section 1442.

As illustrated in FIG. 14, the first linear section 1441 can have a first linear section length (Ll1) and the first curved section 1442 can have a first curved section length (Lc1). In certain embodiments, the length of the first curved section 1442 can be not less than the length of the first linear section 1441 (i.e., Lc1≥Ll1). Still, in at least one non-limiting embodiment, the length of the first linear section 1441 can be not less than the length of the first curved section 1442 (i.e., Ll1>Lc1). In at least one particular instance, the relationship between the length of the first linear section 1441 and the first curved section 1442 may define a length factor (Ll1/Lc1) that may facilitate certain performance of the shaped abrasive particle 1400. For example, the length factor (Ll1/Lc1) can be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05. For yet another non-limiting embodiment, the length factor (Ll1/Lc1) can be at least about 0.05, such as at least about 0.1, at least about 0.15, or even at least about 0.2. It will be appreciated that the length factor (Ll1/Lc1) can be within a range between any of the minimum and maximum values noted above.

In at least one alternative embodiment, the body 1401 can define another length factor (Lc1/Ll1), which may be suitable for facilitating improved performance e of the shaped abrasive particle and having a value not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, or even not greater than about 0.05. In yet another embodiment, the length factor (Lc1/Ll1) can be at least about 0.05, such as at least about 0.1, at least about 0.15, or even at least about 0.2. It will be appreciated that the length factor (Lc1/Ll1) can be within a range between any of the minimum and maximum values noted above.

As further illustrated, the second linear section 1443 can have a length (Ll2). In at least one embodiment, Ll1 and Ll2 can be substantially equal to each other. In still other instances, Ll1 and Ll2 can be measurably different compared to each other.

In another aspect, the second linear section 1443 can have a particular length relative to the length of the first curved section 1442, which may facilitate improved performance of the body 1401. For example, in one embodiment, Lc1 can be not less than Ll2 (i.e., Lc1≥Ll2). In a more particular embodiment, the relationship between the length (Ll2) of the second linear section 1443 and the length (Lc1) of the first curved section 1442 can define a length factor (Ll2/Lc1), which may be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05. Still, in another non-limiting embodiment, the length factor (Ll2/Lc1) may be at least about 0.05, such as at least about 0.1, at least about 0.15, or even at least about 0.2. It will be appreciated that the length factor (Ll2/Lc1) can be within a range between any of the minimum and maximum values noted above.

In still another embodiment, the relationship between the length (Ll2) of the second linear section 1443 and the length (Lc1) of the first curved section 1442 can define another length factor (Lc1/Ll2), which may be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05. In still another non-limiting embodiment, the length factor (Lc1/Ll2) can be at least about 0.05, such as at least about 0.1, at least about 0.15, at least about 0.2. It will be appreciated that the length factor (Lc1/Ll2) can be within a range between any of the minimum and maximum values noted above.

The body 1401 may be formed such that the first portion 1406 of the side surface 1405 has a particular relationship between the sum of the length (Ll1) of the first linear section 1441 and the length (Ll2) of the second linear section 1443, relative to the length (Lc1) of the first curved section 1442, such that a linear sum factor ((Ll1+Ll2)/Lc1) may be controlled to facilitate improved performance of the body 1401. According to at least one embodiment, the linear sum factor can be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, or even not greater than about 0.05. In yet another non-limiting embodiment, the linear sum factor ((Ll1+Ll2)/Lc1) can be at least about 0.05, such as at least about 0.1, at least about 0.15, or even at least about 0.2. It will be appreciated that the linear sum factor ((Ll1+Ll2)/Lc1) can be within a range between any of the minimum and maximum values noted above.

For still another embodiment, the body 1401 may be formed such that the first portion 1406 of the side surface 1405 can have a particular relationship between the sum of the length (Ll1) of the first linear section 1441 and the length (Ll2) of the second linear section 1443, relative to the length (Lc1) of the first curved section 1442, such that an inverse linear sum factor (Lc1/(Ll1+Ll2)) is defined. The inverse linear sum factor can be controlled to facilitate improved performance of the body 1401. In at least one embodiment the inverse linear sum factor (Lc1/(Ll1+Ll2)) can be not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, or even not greater than about 0.05. In yet another embodiment, the inverse linear sum factor (Lc1/(Ll1+Ll2)) can be at least about 0.05, such as at least about 0.1, at least about 0.15, or even at least about 0.2. It will be appreciated that the inverse linear sum factor (Lc1/(Ll1+Ll2)) can be within a range between any of the minimum and maximum values noted above.

According to one embodiment, the first curved section 1442 can have a particular first curved section length (Lc1) relative to the total length (Lfp1) of the first portion 1406 that may facilitate improved performance of the body 1401. The total length (Lfp1) of the first portion 1406 can be equivalent to a width (W) of the body 1401. In certain instances, the first curved section length (Lc1) can be a fraction of a total length (Lfp1) of the first portion 1406 of the side surface 1405. For example, the relationship between the first curved section length (Lc1) and the total length (Lfp1) of the first portion 1406 can define a length factor (Lc1/Lfp1), which maybe not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05. Still, in another non-limiting embodiment, the length factor (Lc1/Lfp1) may be at least about 0.05, such as at least about 0.1, at least about 0.15, or even at least about 0.2. It will be appreciated that the length factor (Lc1/Lfp1) can be within a range between any of the minimum and maximum values noted above.

Further to the body 1401, the first linear section 1441 can have a particular length (Ll1) relative to the total length (Lfp1) of the first portion 1406 that may facilitate improved performance of the body 1401. In certain instances, the first linear section length (Ll1) can be a fraction of a total length (Lfp1) of the first portion 1406 of the side surface 1405. For example, the relationship between the first linear section length (Ll1) and the total length (Lfp1) of the first portion 1406 can define a length factor (Ll1/Lfp1), which maybe not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05. Still, in another non-limiting embodiment, the length factor (Ll1/Lfp1) may be at least about 0.05, such as at least about 0.1, at least about 0.15, or even at least about 0.2. It will be appreciated that the length factor (Ll1/Lfp1) can be within a range between any of the minimum and maximum values noted above.

Moreover, the second linear section 1443 can have a particular length (Ll2) relative to the total length (Lfp1) of the first portion 1406 that may facilitate improved performance of the body 1401. In certain instances, the second linear section length (Ll2) can be a fraction of a total length (Lfp1) of the first portion 1406 of the side surface 1405. For example, the relationship between the second linear section length (Ll2) and the total length (Lfp1) of the first portion 1406 can define a length factor (Ll2/Lfp1), which maybe not greater than about 1, such as not greater than about 0.95, not greater than about 0.9, not greater than about 0.85, not greater than about 0.8, not greater than about 0.75, not greater than about 0.7, not greater than about 0.65, not greater than about 0.6, not greater than about 0.55, not greater than about 0.5, not greater than about 0.45, not greater than about 0.4, not great not greater than about 0.35, not greater than about 0.3, not greater than about 0.35, not greater than about 0.3, not greater than about 0.25, not greater than about 0.2, not greater than about 0.15, not greater than about 0.1, not greater than about 0.05. Still, in another non-limiting embodiment, the length factor (Ll2/Lfp1) may be at least about 0.05, such as at least about 0.1, at least about 0.15, or even at least about 0.2. It will be appreciated that the length factor (Ll2/Lfp1) can be within a range between any of the minimum and maximum values noted above.

As provided herein, the first curved section 1442 can be joined to the first linear section 1441 and define an interior corner 1445. Moreover, the first curved section 1442 can be joined to the second linear section 1443 and define an interior corner 1446. In particular instances, the first curved section 1442 can have a first end defined at the joint of the interior corner 1445 that is spaced apart from the first external corner 1409 of the body 1401. Moreover, the first curved section 1442 can have a second end defined at the joint of the interior corner 1446, which can be spaced apart from the second external corner 1410 of the body 1401. Notably, in certain embodiments, the first portion 1406 of the side surface 1405 can include the first interior corner 1445 and the second interior corner 1446, which can be spaced apart from each other. In particular, the first interior corner 1445 and the second interior corner 1446 can be separated by the first curved section 1442, and more particularly, disposed at opposite ends of the first curved section 1442. The first interior corner 1445 can be disposed at an edge between the first linear section 1441 and the first curved section 1442 and the second interior corner 1446 can be disposed at an edge between the first curved section 1442 and the second linear section 1443.

The first interior corner 1445, along with the first curved section 1442 and the first linear section 1441, can define the first interior angle 1447, which can have an obtuse value. The first interior angle 1447 can be measured as the angle formed between the first linear section 1441 and a tangent 1483 of the first curved section 1442 that extends from the first interior corner 1445. According to one embodiment, the first interior angle 1447 can have a value between at least about 92 degrees and not greater than about 178 degrees. More particularly, in at least one embodiment, the first interior angle 1447 can have a value of at least about 94 degrees, such as at least about 96 degrees, at least about 98 degrees, at least about 100 degrees, at least about 102 degrees, at least about 104 degrees, at least about 106 degrees, at least about 108 degrees, at least about 110 degrees, at least about 112 degrees, at least about 124 degrees, at least about 126 degrees, at least about 128 degrees, at least about 120 degrees, at least about 122 degrees, at least about 124 degrees, at least about 126 degrees, at least about 128 degrees, at least about 130 degrees, at least about 132 degrees, at least about 134 degrees, at least about 136 degrees, at least about 138 degrees, or even at least about 140 degrees. In yet another embodiment, the first interior angle 1447 can have a value of not greater than about 176 degrees, such as not greater than about 174 degrees, not greater than about 172 degrees, not greater than about 170 degrees, not greater than about 168 degrees, not greater than about 166 degrees, not greater than about 164 degrees, not greater than about 162 degrees, not greater than about 160 degrees, not greater than about 158 degrees, not greater than about 156 degrees, not greater than about 154 degrees, not greater than about 152 degrees, not greater than about 150 degrees, not greater than about 148 degrees, not greater than about 146 degrees, not greater than about 144 degrees, not greater than about 142 degrees, or even not greater than about 140 degrees. It will be appreciated that the first interior angle 1447 can have a value within a range between any of the minimum and maximum values noted above.

The second interior corner 1446, along with the first curved section 1442 and the second linear section 1443, can define the second interior angle 1448, which can have an obtuse value. The second interior angle 1448 can be measured as the angle formed between the second linear section 1443 and a tangent 1484 of the first curved section 1442 extending from the second interior corner 1446. According to one embodiment, the second interior angle 1448 can have a value between at least about 92 degrees and not greater than about 178 degrees. More particularly, in at least one embodiment, the second interior angle 1448 can have a value of at least about 94 degrees, such as at least about 96 degrees, at least about 98 degrees, at least about 100 degrees, at least about 102 degrees, at least about 104 degrees, at least about 106 degrees, at least about 108 degrees, at least about 110 degrees, at least about 112 degrees, at least about 124 degrees, at least about 126 degrees, at least about 128 degrees, at least about 120 degrees, at least about 122 degrees, at least about 124 degrees, at least about 126 degrees, at least about 128 degrees, at least about 130 degrees, at least about 132 degrees, at least about 134 degrees, at least about 136 degrees, at least about 138 degrees, or even at least about 140 degrees. In yet another embodiment, the second interior angle 1448 can have a value of not greater than about 176 degrees, such as not greater than about 174 degrees, not greater than about 172 degrees, not greater than about 170 degrees, not greater than about 168 degrees, not greater than about 166 degrees, not greater than about 164 degrees, not greater than about 162 degrees, not greater than about 160 degrees, not greater than about 158 degrees, not greater than about 156 degrees, not greater than about 154 degrees, not greater than about 152 degrees, not greater than about 150 degrees, not greater than about 148 degrees, not greater than about 146 degrees, not greater than about 144 degrees, not greater than about 142 degrees, or even not greater than about 140 degrees. It will be appreciated that the second interior angle 1448 can have a value within a range between any of the minimum and maximum values noted above.

As further illustrated, the first curved section 1442 of the first portion 1406 of the side surface 1405 can have a substantially concave shape and may curve inwards into the body 1401 toward the midpoint 1481. The first curved section 1442 may define an arc having a single distinct curvature as illustrated in FIG. 14.

Moreover, the first curved section 1442 can have a particular radius of curvature (Rc1) relative to the width (W) (e.g., the total length (Lfp1) in an embodiment) of the body 1401 that may facilitate improved performance of the body. The radius of curvature may be determined by superimposing a best fit circle to the curvature of the first curved section 1442 and determining the radius of the best fit circle. Any suitable computer program, such as ImageJ may be used in conjunction with an image (e.g., SEM image or light microscope image) of suitable magnification of the body 1401 to accurately measure the best fit circle. According to one embodiment, the first curved section 1442 can have a radius of curvature (Rc1) that is at least about 0.01 times the width (W) of the body 1401, such as at least about 0.5 times the width (W) of the body 1401, at least about 0.8 times the width (W) of the body 1401, at least 1.5 times the width (W) of the body 1401, or even at least 2 times the width(W) of the body 1401. In another embodiment, the radius of curvature (Rc1) can be not greater than about 50 times the width (W) of the body 1401, such as not greater than about 20 times the width (W) of the body 1401, not greater than about 15 times the width (W) of the body 1401, not greater than about 10 times the width (W) of the body 1401, or even not greater than about 5 times the width (W) of the body 1401. The first curved section 1442 can have a radius of curvature (Rc1) within a range between any of the minimum and maximum values noted above.

In at least one embodiment, the first curved section 1442 can have a radius of curvature (Rc1) that is not greater than 4 mm or not greater than 3 mm or not greater than 2.5 mm or not greater than 2 mm or even not greater than 1.5 mm. Still, in another embodiment, the first curved section 1442 can have a radius of curvature of at least 0.01 mm, such as at least 0.1 mm or at least 0.5 mm or at least 0.8 mm or even at least 1 mm. It will be appreciated that the radius of curvature of any one of the curved sections described in the embodiments herein can be within a range including any of the minimum and maximum values noted above. However, it will be appreciated that a particular side portion of a side surface can include multiple curved sections.

FIG. 15A includes a top-down view of a shaped abrasive particle according to an embodiment. As illustrated, the shaped abrasive particle 1500 can include a body 1501 having an upper major surface 1502 (i.e., a first major surface) and a bottom major surface 1504 (i.e., a second major surface) opposite the upper major surface 1502. The upper surface 1502 and the bottom surface 1504 can be separated from each other by at least one side surface 1503. The side surface 1503 may include discrete side surface portions, which can be separated from each other by the exterior corners as described in other embodiments herein. As illustrated, and in one particular embodiment, the body 1501 can include at least one partial cut 1521 extending from the side surface 1503 into the interior of the body 1501. A partial cut can define an opening in the body 1501, which can extend through the entire height of the body 1501 from the upper major surface 1502 to the bottom major surface 1504, which is illustrated in the cross-sectional view of FIG. 15B as taken along axis 1582 of the shaped abrasive particle of FIG. 15A. As further illustrated and according to one embodiment, the partial cut 1521 can intersect the side surface of the body 1501, particularly between two exterior corners of the body. In certain instances, the partial cut 1521 may be located near or at the midpoint of a discrete side surface portion between two exterior corners. In other instances, the partial cut 1521 can be located near or at an exterior corner of the body 1501.

In one particular instance, the partial cut 1521 can have a certain two-dimensional shape, which may facilitate improved deployment of the abrasive particle in fixed abrasive articles and/or performance of the shaped abrasive particle. Reference to the shape of the partial cut 1521 will be understood to reference the two-dimensional shape of the opening formed by the sides of the partial cut and the portion of the side surface 1503 removed to form the partial cut 1521. For example, the partial cut 1521 can have a two-dimensional shape, as viewed top-down (as illustrated in FIG. 15A), selected from the group of a polygon, an irregular polygon, an ellipsoidal, an irregular shape, a cross-shape, a star-shape, and a combination thereof. In more particular instances, the partial cut 1521 can have a two-dimensional shape selected from the group of a triangle, a quadrilateral, a trapezoid, a pentagon, a hexagon, a heptagon, an octagon, and a combination thereof. The partial cut 1521 of FIG. 15A has a generally quadrilateral shape, and more particularly, a rectangular two-dimensional shape. Notably, the partial cut 1521 is defined by the surfaces 1521, 1523, 1524, and the portion of the side surface 1503 that has been removed to define the opening of the partial cut 1521. In certain instances, the partial cut 1521 can have linear sides that intersect each other at clearly defined corners within the interior of the body, wherein the corners can define an interior angle of less than 180 degrees, such as less than 100 degrees.

As further illustrated, the partial cut 1521 can have having a length (Lpc) and a width (Wpc). In certain instances, such as illustrated in FIG. 15A, the length of the partial cut (Lpc) can be different than the width of the partial cut (Wpc). More specifically, the length of the partial cut (Lpc) can be greater than the width of the partial cut (Wpc). The relationship between the length of the partial cut (Lpc) and the width of the partial cut (Wpc) can be the same as the relationship described herein between Ll1 and Lc1 for the shaped abrasive particle of FIG. 14, wherein Lpc is relevant to Lc1 and Wpc is relevant to Ll1.

In at least one embodiment, the partial cut 1521 can extend entirely though the height of the body 1501. Moreover, the partial cut 1521 can extend for a fraction of an entire width and/or length of the body 1521. As illustrated in FIG. 15A, the partial cut 1521 can extend from the side surface along the axis 1583 and include the midpoint 1581 of the particle. Still, in other instances, it will be appreciated that the partial cut 1521 may have a shorter length (Lpc), such that it does not extend for such a distance into the interior of the body 1501 from the side surface 1503. Moreover, in at least one embodiment, the partial cut 1521 can have a length (Lpc) defining a longitudinal axis extending substantially perpendicular to the side surface 1503. For example, as illustrated, the partial cut 1521 can have a length (Lpc) extending along the axis 1583, which extends generally perpendicular to the portion of the side surface 1503 intersecting the partial cut 1521. It will be appreciated that while the shaped abrasive particle 1500 is illustrated as having a single partial cut 1521, a shaped abrasive particle can be formed to have a plurality of partial cuts within the body extending from the side surface and into the volume of the body 1501. Each of the partial cuts can have any of the attributes associated with the partial cut 1521 as described herein. Moreover, the partial cuts can have different shapes and sizes relative to each other which may facilitate improved deployment and/or performance in fixed abrasive articles.

According to one embodiment, a shaped abrasive particle including at least one partial cut can be formed with a partial cut of a particular shape and/or dimensions suited to the strength of the body of the shaped abrasive particle. For example, the partial cut 1521 may be formed with a particular length (Lpc) and width (Wpc) and furthermore, the body may have a particular strength, wherein the combination of the length of the partial cut (Lpc), the width of the partial cut (Wpc) and strength of the body have a relationship configured to control the friability of the body 1501.

Referring in particular to FIG. 15B, a cross-sectional view of the shaped abrasive particle along axis 1582 is provided. In certain instances, one or more of the corners 1531, 1532, 1533, and 1534 (1531-1534) defining the cross-sectional shape of the partial cut 1521 may have a certain radius of curvature. Control of the radius of curvature of the one or more corners 1531-1534 may facilitate improved deployment and/or performance of the shaped abrasive particle in a fixed abrasive article. Notably, one or more of the corners 1531-1534 may have a different radius of curvature compared to the exterior corners 1506 and 1507 defined by the edge joining the major surfaces 1502 and 1504 to the side surface 1503. In particular instances, the exterior corners 1506 and 1507 may have a lower radius of curvature compared to the one or more corners 1531-1534 defining the edges of the partial cut 1521 as viewed in cross-section.

Formation of the partial cut in the shaped abrasive particle can be conducted during the forming process, including but not limited to during molding, casting, printing, pressing, extruding, and a combination thereof. For example, the partial cut can be formed during the shaping of the mixture, such as by use of a production tool having a shape configured to form a partial cut in one or more of the precursor shaped abrasive particles, and ultimately within the finally-formed shaped abrasive particles. Alternatively, the partial cut may be formed by one or more post-forming operations, which may be conducted on the mixture after forming, such as on the precursor shaped abrasive particles or finally-formed shaped abrasive particles. Some exemplary post-forming operations that may be suitable for forming the partial cut can include scoring, cutting, stamping, pressing, etching, ionization, heating, ablating, vaporization, heating, and a combination thereof.

It will be appreciated that various types of abrasive particles, including shaped abrasive particles of various sizes, shapes, and contours can be formed to have one or more partial cuts. For example, FIG. 15C includes a top-down view of a shaped abrasive particle according to an embodiment. The shaped abrasive particle 1550 can include a body 1551 having an upper major surface 1552 (i.e., a first major surface) and a bottom major surface (i.e., a second major surface) opposite the upper major surface 1552, and at least one side surface 1553 extending between and separating the upper surface 1552 and the bottom surface (not shown in the top-down view). As illustrated, and in one particular embodiment, the body 1551 can include at least one partial cut 1561 extending from the side surface 1553 into the interior of the body 1551. The partial cut 1561 can have any of the features of other partial cuts of abrasive particles described herein.

Moreover, while not illustrated, in other instances, an abrasive particle can be formed to have a plurality of partial cuts, which may be substantially the same in size in shape. Alternatively, in other embodiments, a shaped abrasive particle may be formed to have a plurality of partial cuts, wherein at least two of the partial cuts of the plurality are different from each other in size, shape, and/or contour. The feature of a partial cut can be combined with any of the other features of embodiments herein, including for example, but not limited to shaped abrasive particles with one or more discrete stepped depressions and the like.

Figure 16A:
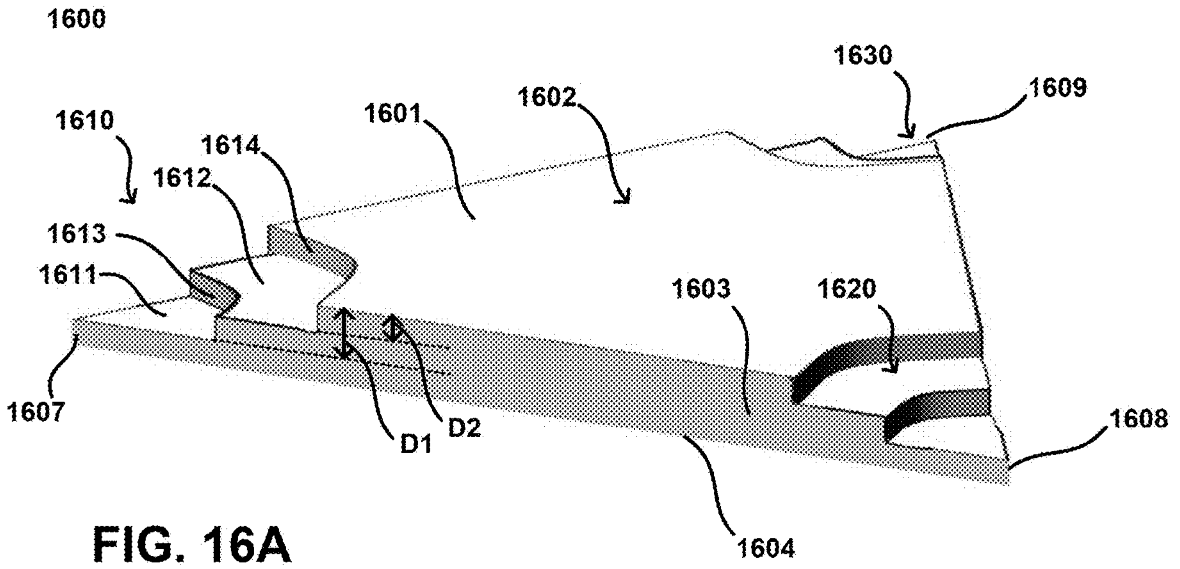
FIG. 16A includes a perspective view illustration of a shaped abrasive particle in accordance with an embodiment.
Figure 16B:
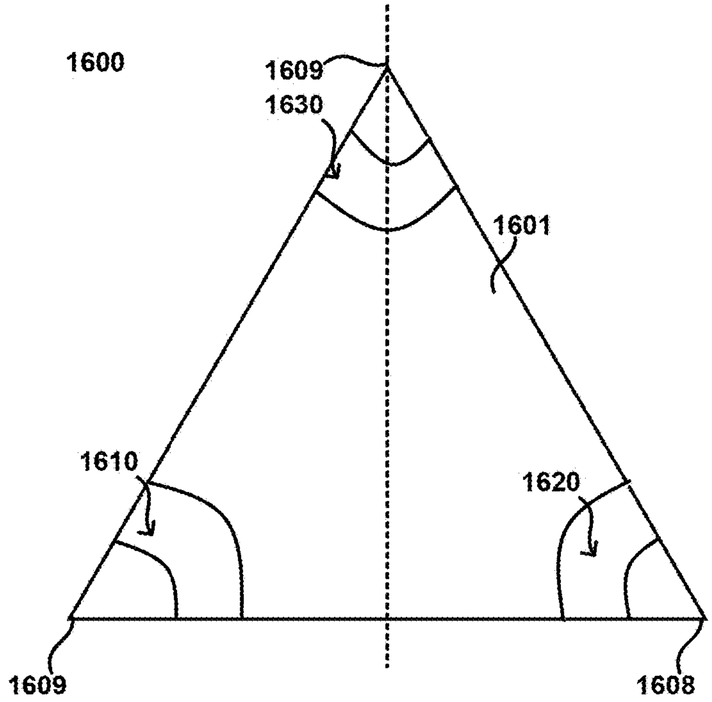
FIG. 16B includes a top-down illustration of the shaped abrasive particle of FIG. 16A.

FIG. 16A includes a perspective view of a shaped abrasive particle according to an embodiment. FIG. 16B includes a top-down view of a shaped abrasive particle of FIG. 16A according to an embodiment. As illustrated, the shaped abrasive particle 1600 can include a body 1601 having an upper major surface 1602 (i.e., a first major surface) and a bottom major surface 1604 (i.e., a second major surface) opposite the upper major surface 1602. The upper surface 1602 and the bottom surface 1604 can be separated from each other by at least one side surface 1603. The side surface 1603 may include discrete side surface portions, which can be separated from each other by the exterior corners as described in other embodiments herein.

According to an embodiment, the shaped abrasive particles herein can include one or more stepped depressions. For example, as illustrated in FIGS. 16A and 16B, the body 1601 can include a first discrete stepped depression 1610, a second discrete stepped depression 1620, and a third discrete stepped depression 1630. The first discrete stepped depression 1610 can be located at the first exterior corner 1607 and spaced apart from the second and third discrete stepped depressions 1620 and 1630. The second discrete stepped depression 1620 can be located at the second exterior corner 1608 and spaced apart from the first and third discrete stepped depressions 1610 and 1630. The third discrete stepped depression 1610 can be located at the third exterior corner 1609 and spaced apart from the first and second discrete stepped depressions 1610 and 1620. The shaped abrasive particles of the embodiments herein can include one or more discrete stepped depressions in various locations on the body of the shaped abrasive particle.

The discrete stepped depressions of the embodiments herein can be formed using any suitable technique. For example, formation of the discrete stepped depressions can be conducted during the forming process, including but not limited to during molding, casting, printing, pressing, extruding, and a combination thereof. For example, the discrete stepped depressions can be formed during the shaping of the mixture, such as by use of a production tool having a shape configured to form a discrete stepped depression in one or more of the precursor shaped abrasive particles, and ultimately within the finally-formed shaped abrasive particles. Alternatively, the discrete stepped depression may be formed by one or more post-forming operations, which may be conducted on the mixture after forming, such as on the precursor shaped abrasive particles or finally-formed shaped abrasive particles. Some exemplary post-forming operations that may be suitable for forming the discrete stepped depression can include scoring, cutting, stamping, pressing, etching, ionization, heating, ablating, vaporization, heating, and a combination thereof.

As illustrated, in at least one embodiment, the first discrete stepped depression 1610 can include a first depression 1611 having a first depth (D1) as measured by the distance between the planar surface defining the first depression 1611 and the upper major surface 1602 of the body 1601. Provision of one or more discrete stepped depressions may facilitate improved deployment and/or performance of the shaped abrasive particles and fixed abrasive articles utilizing such shaped abrasive particles. The first discrete stepped depression 1610 may also include a second depression 1612 surrounding the first depression 1611 having a second depth (D2), wherein the second depth is measured by the distance between the planar surface defining the second depression 1612 and the upper major surface 1602 of the body 1601. The depth can be measured in the same direction as the height of the body 1601 relative to the upper major surface 1602. Moreover, it will be appreciated that the height of the particle at the first depression can be less than the height of the particle at the second depression 1612.

According to one particular embodiment, D1 and D2 can be different compared to each other. For example, D1 can be greater than D2. More particularly, in at least one embodiment, the ratio of D2 to D1 (D2/D1) can have a value of not greater than about 1, such as not greater than about 0.95 or not greater than about 0.9 or not greater than about 0.85 or not greater than about 0.8 or not greater than about 0.75 or not greater than about 0.7 or not greater than about 0.65 or not greater than about 0.6 or not greater than about 0.55 or not greater than about 0.5 or not greater than about 0.45 or not greater than about 0.4 or not great not greater than about 0.35 or not greater than about 0.3 or not greater than about 0.35 or not greater than about 0.3 or not greater than about 0.25 or not greater than about 0.2 or not greater than about 0.15 or not greater than about 0.1 or not greater than about 0.05. Still, in another non-limiting embodiment, the ratio of D2 to D1 (D2/D1) may be at least about 0.05, such as at least about 0.1 or at least about 0.15 or even at least about 0.2 or at least about 0.3 or at least about 0.4 or at least 0.5 or at least 0.6 or at least 0.7 or at least 0.8 or at least 0.9. It will be appreciated that the ratio of D2 to D1 (D2/D1) can be within a range between any of the minimum and maximum values noted above.

In at least one embodiment, the first depression 1611 can encompass the first exterior corner 1607 between adjacent portions of the side surface 1603. As illustrated, the first depression 1611 can include a substantially planar surface that intersects the first corner 1607 and portions of the side surface 1603 adjacent to the first corner 1607. The first depression 1611 can terminate at a first vertical surface 1613 that extends substantially perpendicular to the major surface of the first depression 1611, and joins the major surface of the first depression 1611 and the major surface of the second depression 1612. It will be appreciated that the first depression 1611 can have various other shapes and contours, and is not limited to a planar surface. The first depression 1611 can include a combination of planar and curved edges and/or surfaces.

The first vertical surface 1613 of FIG. 16A is illustrated as having a generally curved contour defining a concave shape as viewed top down (see FIG. 16B). The curved contour of the first vertical surface 1613 gives the first depression 1611 a curved two-dimensional shape when viewed top down. It will be appreciated that other contours of the first vertical surface 1613 are contemplated, including but not limited to, linear, arcuate, ellipsoidal, and a combination thereof.

Moreover, in at least one embodiment, the discrete stepped depression 1610 can be formed such that the second depression 1612 can encompass the first depression 1611 and the first exterior corner 1607. As illustrated, the second depression 1612 can include a substantially planar surface that intersects the first vertical surface 1613 and portions of the side surface 1603 adjacent to the first corner 1607 and the first depression 1611. The substantially planar surface of the second depression 1612 can intersect the side surface 1603 on both sides of the first corner 1607 and the first depression 1611. The second depression 1612 can begin at the joining of the first vertical surface 1613 with the major surface of the second depression 1612 and can terminate at a second vertical surface that extends substantially perpendicular to the major surface of the second depression 1612. The second vertical surface 1614 can extend toward and intersect the upper major surface 1602. It will be appreciated that the second depression 1612 can have various other shapes and contours, and is not limited to a planar surface. The second depression 1612 can include a combination of planar and curved edges and/or surfaces.

The second vertical surface 1614 of FIG. 16A is illustrated as having a generally curved contour defining a concave shape as viewed top down (see FIG. 16B). The curved contour of the second vertical surface 1614 gives the second depression 1612 a curved two-dimensional shape when viewed top down. It will be appreciated that other contours of the second vertical surface 1614 are contemplated, including but not limited to, linear, arcuate, ellipsoidal, and a combination thereof.

The first depression 1611 and the second depression 1612 can have different areas with respect to each other. Notably, in at least one embodiment, the first area of the major surface of the first depression 1611 can be different than (e.g., less than or greater than) the second area of the major surface of the second depression 1612. Controlling the relative area of the first area and the second area for a discrete stepped depression may facilitate improved deployment and/or performance of the shaped abrasive particle. According to one particular embodiment, the first area of the first depression 1611 can be less than the second area of the second depression 1612. Still, in another embodiment, the first area of the first depression 1611 can be greater than than the second area of the second depression 1612.

Figure 16C:
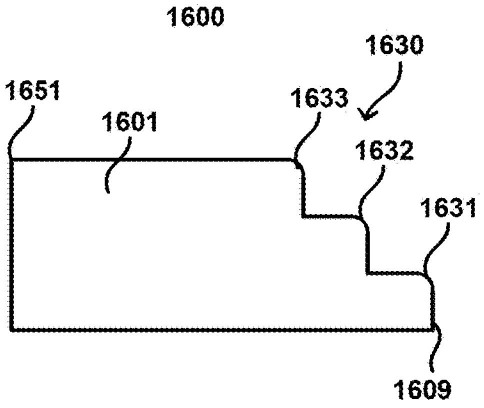
FIG. 16C includes a cross-sectional view of a portion of the shaped abrasive particle of FIG. 16B.

FIG. 16C includes a cross-sectional view of a portion of the shaped abrasive particle 1600 of FIGS. 16A and 16B along the dotted line illustrated in FIG. 16B. Notably, the illustration includes a cross-sectional view of the third discrete stepped depression 1630. According to one embodiment, the corners 1631, 1632, and 1633 (1631-1633) joining the third exterior corner 1609 and first and second depressions 1634 and 1635 can be rounded. In particular instances, the corners 1631-1633 can have rounded contours having a certain radius of curvature. In an embodiment, interior corners located between corners 1631-1633 can be rounded. Some rounding of the corners, particularly a radius of curvature that is greater (i.e., a tip sharpness that is less) than other corners (e.g., the corner 1651) may facilitate improved deployment and/or performance of the shaped abrasive particle.

Figure 16D:
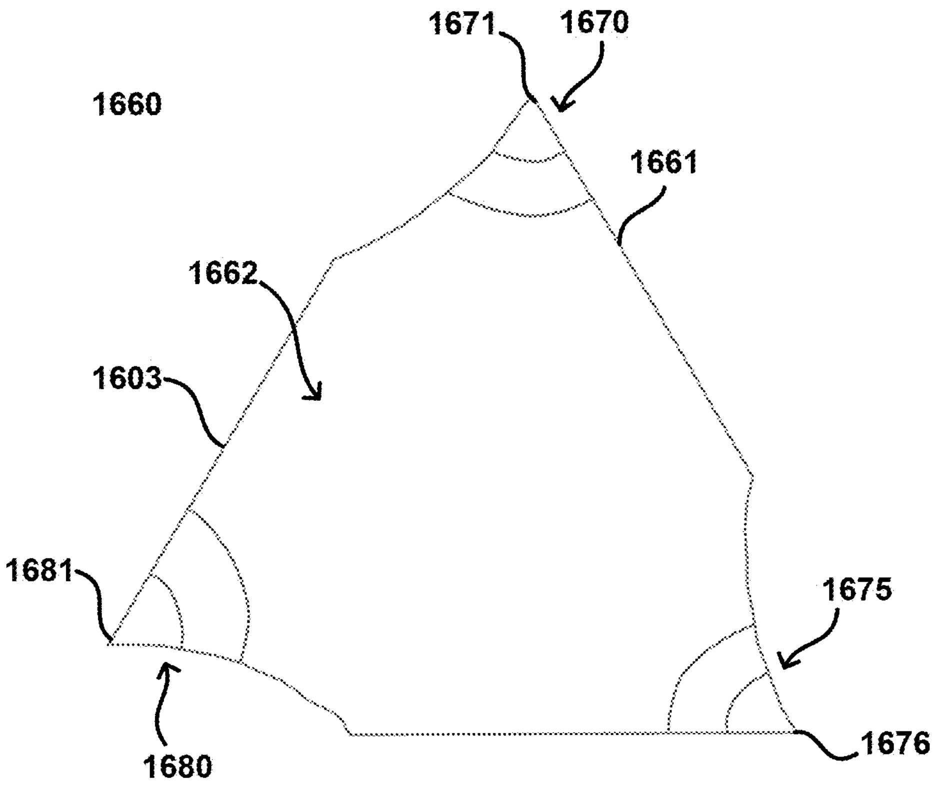
FIG. 16D includes a top-down illustration of a shaped abrasive particle according to an embodiment.
Figure 16E:
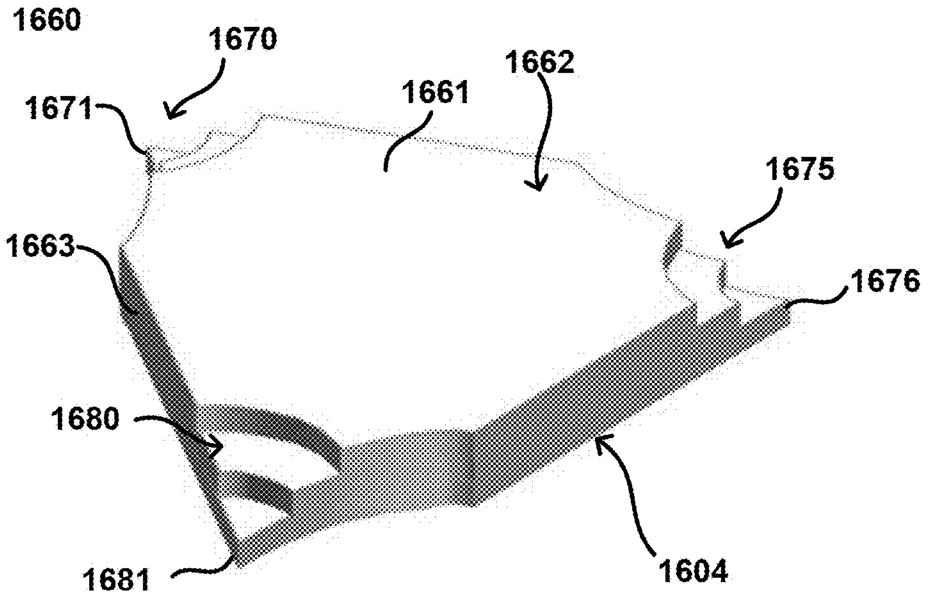
FIG. 16E includes a perspective view illustration of the shaped abrasive particle of FIG. 16D.

It will be appreciated that various types of shaped abrasive particles can include one or more stepped depressions, including but not limited to shaped abrasive particles of various shapes, sizes, and contours. Moreover, the placement of the one or more stepped depressions may be varied to control the performance of the shaped abrasive particle and associated fixed abrasive articles. FIG. 16D includes a top-down view of an alternative shaped abrasive particle including at least one stepped depression according to an embodiment. FIG. 16E includes a perspective view of the shaped abrasive particle of FIG. 16D. As illustrated, the shaped abrasive particle 1660 can include a body 1661 having an upper major surface 1662 (i.e., a first major surface) and a bottom major surface 1664 (i.e., a second major surface) opposite the upper major surface 1662. The upper surface 1662 and the bottom surface 1664 can be separated from each other by at least one side surface 1663. The side surface 1663 may include discrete side surface portions, which can be separated from each other by the exterior corners as described in other embodiments herein.

The shaped abrasive particle 1660 herein can include one or more stepped depressions. For example, as illustrated in FIGS. 16D and 16E, the body 1661 can include a first discrete stepped depression 1670, a second discrete stepped depression 1675, and a third discrete stepped depression 1680. The first discrete stepped depression 1670 can be located at the first exterior corner 1671 and spaced apart from the second and third discrete stepped depressions 1675 and 1680. The second discrete stepped depression 1675 can be located at the second exterior corner 1676 and spaced apart from the first and third discrete stepped depressions 1670 and 1680. The third discrete stepped depression 1680 can be located at the third exterior corner 1681 and spaced apart from the first and second discrete stepped depressions 1670 and 1675. The first discrete stepped depression 1670, second discrete stepped depression 1675, and third discrete stepped depression 1680 can have any of the features of the discrete stepped depressions described in the embodiments herein. For example, as illustrated, each of the discrete stepped depressions 1670, 1675, and 1680 can include multiple depressions separated by vertical surfaces and having certain heights, which may have a particular relationship relative to each other that may facilitate certain performance of the shaped abrasive particle. As also described in embodiments herein, each of the discrete stepped depressions 1670, 1675, and 1680 may have certain shapes and contours, which may be the same or different compared to each other.

Figure 17A:
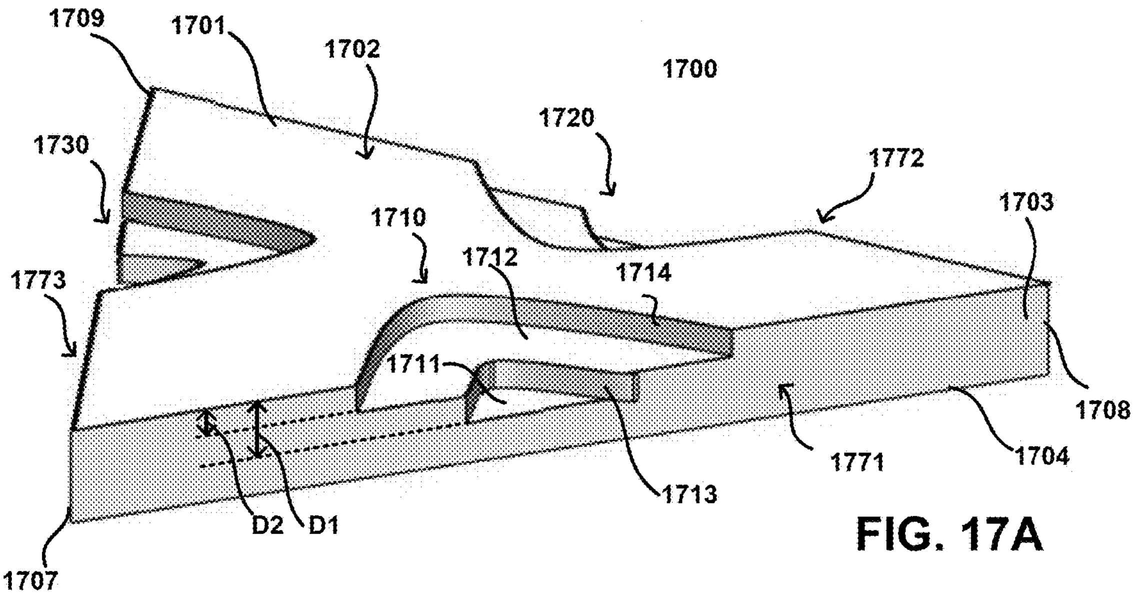
FIG. 17A includes a perspective view illustration of a shaped abrasive particle in accordance with an embodiment.
Figure 17B:
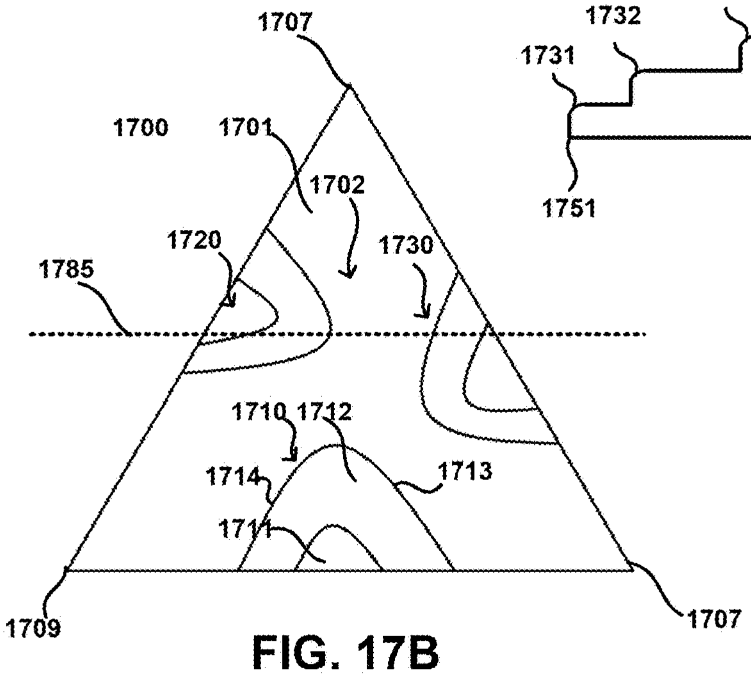
FIG. 17B includes a top-down illustration of the shaped abrasive particle of FIG. 17A.
Figure 17C:
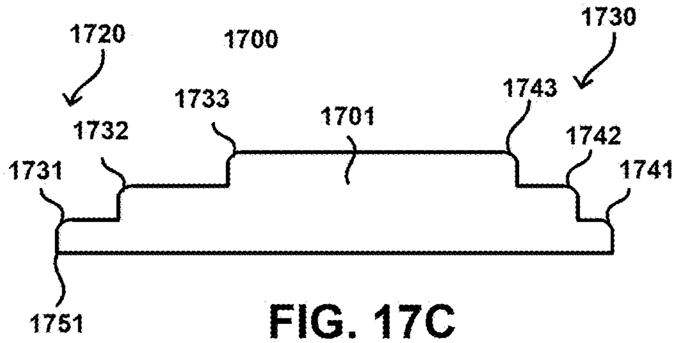
FIG. 17C includes a cross-sectional view of a portion of the shaped abrasive particle of FIG. 17B.

FIG. 17A includes a perspective view of a shaped abrasive particle according to an embodiment. FIG. 17B includes a top-down view of a shaped abrasive particle of FIG. 17A according to an embodiment. FIG. 17C includes a cross-sectional illustration of a portion of the shaped abrasive particle of FIG. 17B through the axis 1785. As illustrated, the shaped abrasive particle 1700 can include a body 1701 having an upper major surface 1702 (i.e., a first major surface) and a bottom major surface 1704 (i.e., a second major surface) opposite the upper major surface 1702. The upper surface 1702 and the bottom surface 1704 can be separated from each other by at least one side surface 1703. The side surface 1703 may include discrete side surface portions, which can be separated from each other by the exterior corners as described in other embodiments herein.

According to an embodiment, the shaped abrasive particles herein can include one or more stepped depressions. For example, as illustrated in FIGS. 17A-C, the body 1701 can include a first discrete stepped depression 1710, a second discrete stepped depression 1720, and a third discrete stepped depression 1730. The first discrete stepped depression 1710 can be located along a first side surface portion 1771 extending between the first and second exterior corners 1707 and 1708. The first discrete stepped depression 1710 can be spaced apart from the first and second discrete stepped depressions 1720 and 1730. Notably, the boundaries of the first discrete stepped depression 1710 as defined by the intersection of the first and second depressions 1711 and 1712 with the first side surface portion 1771 is spaced away from the first and second exterior corners 1707 and 1708. In one particular embodiment, the first discrete stepped depression 1710 can be formed such that no portion of the first discrete stepped depression 1710 intersects an exterior corner of the body 1701. While various details of the shape and contour of portions of the first discrete stepped depression 1710 are described herein, it will be appreciated that other shapes, sizes, and contours of the surfaces can be utilized beyond those illustrated herein.

As further illustrated, the body 1701 can further include a second discrete stepped depression 1720. The second discrete stepped depression 1720 can be located along a second side surface portion 1772 extending between the second and third exterior corners 1708 and 1709. The second discrete stepped depression 1720 can be spaced apart from the first and third discrete stepped depressions 1710 and 1730. Notably, the boundaries of the second discrete stepped depression 1720 can be spaced away from the second and third exterior corners 1708 and 1709. In one particular embodiment, the second discrete stepped depression 1720 can be formed such that no portion of the second discrete stepped depression 1720 intersects an exterior corner of the body 1701. While various details of the shape and contour of portions of the second discrete stepped depression 1720 are described herein, it will be appreciated that other shapes, sizes, and contours of the surfaces can be utilized beyond those illustrated herein.

As further illustrated, the body 1701 can further include a third discrete stepped depression 1730. The third discrete stepped depression 1730 can be located along a second side surface portion 1773 extending between the first and third exterior corners 1707 and 1709. The third discrete stepped depression 1730 can be spaced apart from the first and second discrete stepped depressions 1710 and 1720. Notably, the boundaries of the third discrete stepped depression 1730 can be spaced away from the first and third exterior corners 1707 and 1709. In one particular embodiment, the third discrete stepped depression 1730 can be formed such that no portion of the third discrete stepped depression 1730 intersects an exterior corner of the body 1701. While various details of the shape and contour of portions of the third discrete stepped depression 1730 are described herein, it will be appreciated that other shapes, sizes, and contours of the surfaces can be utilized beyond those illustrated herein.

Any one of the first, second, and/or third discrete stepped depressions of the body 1701 can have any one or more of the features of other discrete stepped depressions as described in embodiments herein. As illustrated, in at least one embodiment, the first discrete stepped depression 1710 can include a first depression 1711 having a first depth (D1) as measured by the distance between the planar surface defining the first depression 1711 and the upper major surface 1702 of the body 1701. Provision of one or more discrete stepped depressions may facilitate improved deployment and/or performance of the shaped abrasive particles and fixed abrasive articles utilizing such shaped abrasive particles. The first discrete stepped depression 1710 may also include a second depression 1712 surrounding the first depression 1711 having a second depth (D2), wherein the second depth is measured by the distance between the planar surface defining the second depression 1712 and the upper major surface 1702 of the body 1701. The depth can be measured in the same direction as the height of the body 1701. Moreover, it will be appreciated that the height of the particle at the first depression can be less than the height of the particle at the second depression 1712.

According to one particular embodiment, D1 and D2 can be different compared to each other. For example, D1 can be greater than D2. More particularly, in at least one embodiment, the ratio of D2 to D1 (D2/D1) can have a value of not greater than about 1, such as not greater than about 0.95 or not greater than about 0.9 or not greater than about 0.85 or not greater than about 0.8 or not greater than about 0.75 or not greater than about 0.7 or not greater than about 0.65 or not greater than about 0.6 or not greater than about 0.55 or not greater than about 0.5 or not greater than about 0.45 or not greater than about 0.4 or not great not greater than about 0.35 or not greater than about 0.3 or not greater than about 0.35 or not greater than about 0.3 or not greater than about 0.25 or not greater than about 0.2 or not greater than about 0.15 or not greater than about 0.1 or not greater than about 0.05. Still, in another non-limiting embodiment, the ratio of D2 to D1 (D2/D1) may be at least about 0.05, such as at least about 0.1 or at least about 0.15 or even at least about 0.2 or at least about 0.3 or at least about 0.4 or at least 0.5 or at least 0.6 or at least 0.7 or at least 0.8 or at least 0.9. It will be appreciated that the ratio of D2 to D1 (D2/D1) can be within a range between any of the minimum and maximum values noted above. Moreover, it will be appreciated that any of the discrete stepped depressions of any of the embodiments herein can have this relationship between two or more depressions.

As illustrated, the first depression 1711 can include a substantially planar surface that intersects the side surface 1703. The first depression 1711 can terminate at a first vertical surface 1713 that extends substantially perpendicular to the major surface of the first depression 1711, and joins the major surface of the first depression 1711 and the major surface of the second depression 1712. It will be appreciated that the first depression 1711 can have various other shapes and contours, and is not limited to a planar surface. The first depression 1711 can include a combination of planar and curved edges and/or surfaces.

The first vertical surface 1713 of FIG. 17A is illustrated as having a generally curved contour defining a concave shape as viewed top down (see FIG. 17B). The curved contour of the first vertical surface 1713 can give the first depression 1711 a curved two-dimensional shape when viewed top down. It will be appreciated that other contours of the first vertical surface 1713 are contemplated, including but not limited to, linear, arcuate, ellipsoidal, and a combination thereof.

Moreover, in at least one embodiment, the discrete stepped depression 1710 can be formed such that the second depression 1712 can encompass the first depression 1711 and a larger portion of the side surface as compared to the portion of the side surface intersecting the first depression 1711. As illustrated, the second depression 1712 can include a substantially planar surface that intersects the first vertical surface 1713 and portions of the side surface 1703, and more particularly, the first side surface portion 1771. The substantially planar surface of the second depression 1712 can intersect the side surface 1703 on both sides of the first depression 1711. The second depression 1712 can begin at the joining of the first vertical surface 1713 with the major surface of the second depression 1712 and can terminate at a second vertical surface 1714 that extends substantially perpendicular to the major surface of the second depression 1712. The second vertical surface 1714 can extend toward and intersect the upper major surface 1702. It will be appreciated that the second depression 1712 can have various other shapes and contours, and is not limited to a planar surface. The second depression 1712 can include a combination of planar and curved edges and/or surfaces.

The second vertical surface 1714 of FIG. 17A is illustrated as having a generally curved contour defining a concave shape as viewed top-down (see FIG. 17B). The curved contour of the second vertical surface 1714 can give the second depression 1712 a curved two-dimensional shape when viewed top down. It will be appreciated that other contours of the second vertical surface 1714 are contemplated, including but not limited to, linear, arcuate, ellipsoidal, and a combination thereof.

As described in accordance with other features of discrete stepped depressions herein, the first depression 1711 and the second depression 1712 can have different areas with respect to each other. Notably, in at least one embodiment, the first area of the major surface of the first depression 1711 can be different than (e.g., less than or greater than) the second area of the major surface of the second depression 1712. Controlling the relative area of the first area and the second area for a discrete stepped depression may facilitate improved deployment and/or performance of the shaped abrasive particle. According to one particular embodiment, the first area of the first depression 1711 can be less than the second area of the second depression 1712. Still, in another embodiment, the first area of the first depression 1711 can be greater than than the second area of the second depression 1712.

FIG. 17C includes a cross-sectional view of a portion of the shaped abrasive particle 1700 of FIGS. 17A and 17B. Notably, the illustration includes a cross-sectional view of portions of the second and third discrete stepped depression 1720 and 1730. According to one embodiment, the corners 1731, 1732, and 1733 (1731-1733) of the second discrete stepped depression 1720 can have rounded contours having a certain radius of curvature. In an embodiment, interior corners located between corners 1731-1733 can be rounded. Some rounding of the corners, particularly a radius of curvature that is greater (i.e., a high tip sharpness value) than other corners (e.g., the corner 1751) may facilitate improved deployment and/or performance of the shaped abrasive particle. In at least one embodiment, the corners 1731-1733 can have substantially the same radius of curvature compared to each other. In other instances, the corners 1731-1733 can have different radius of curvatures compared to each other.

According to one embodiment, the corners 1741, 1742, and 1743 (1741-1743) of the third discrete stepped depression 1730 can have rounded contours having a certain radius of curvature. Some rounding of the corners, particularly a radius of curvature that is greater (i.e., a high tip sharpness value) than other corners (e.g., the corner 1751) may facilitate improved deployment and/or performance of the shaped abrasive particle. In at least one embodiment, the corners 1741-1743 can have substantially the same radius of curvature with respect to each other. In other instances, the corners 1741-1743 can have different radius of curvatures compared to each other. Still, it will be appreciated that the corners 1731-1733 and the corners 1741-1743 can have substantially the same radius of curvature with respect to each other. In other instances, the corners 1731-1733 and the corners 1741-1743 can have different radius of curvatures compared to each other.

Figure 17D:
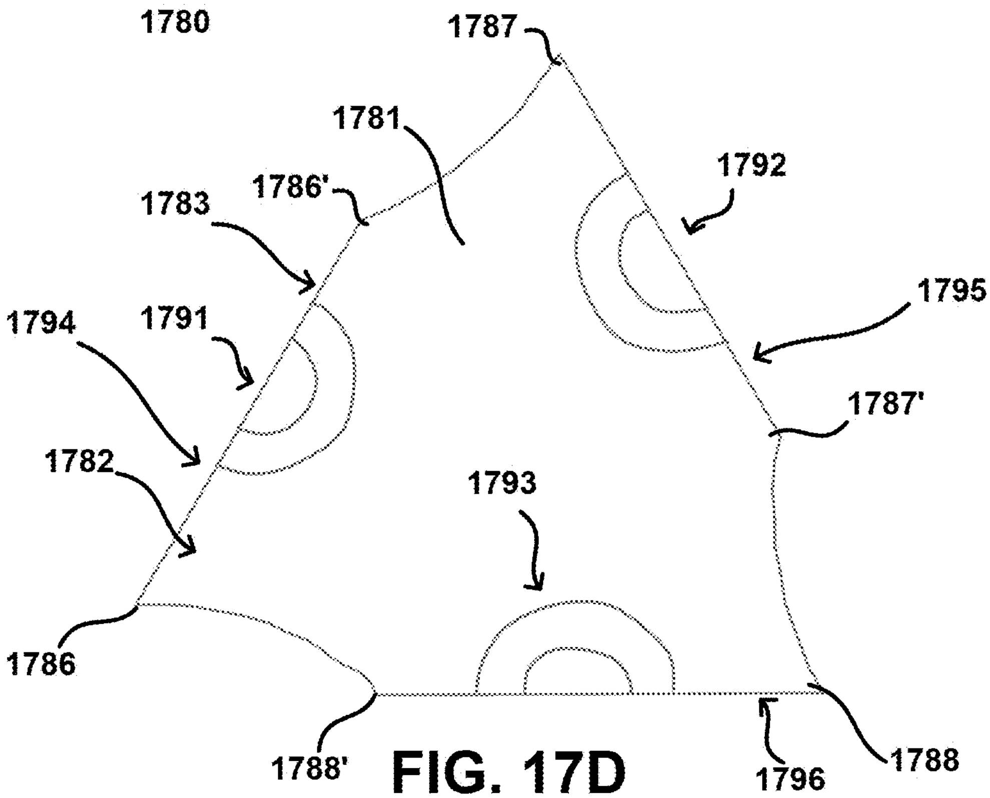
FIG. 17D includes a top-down illustration of the shaped abrasive particle according to an embodiment.
Figure 17E:
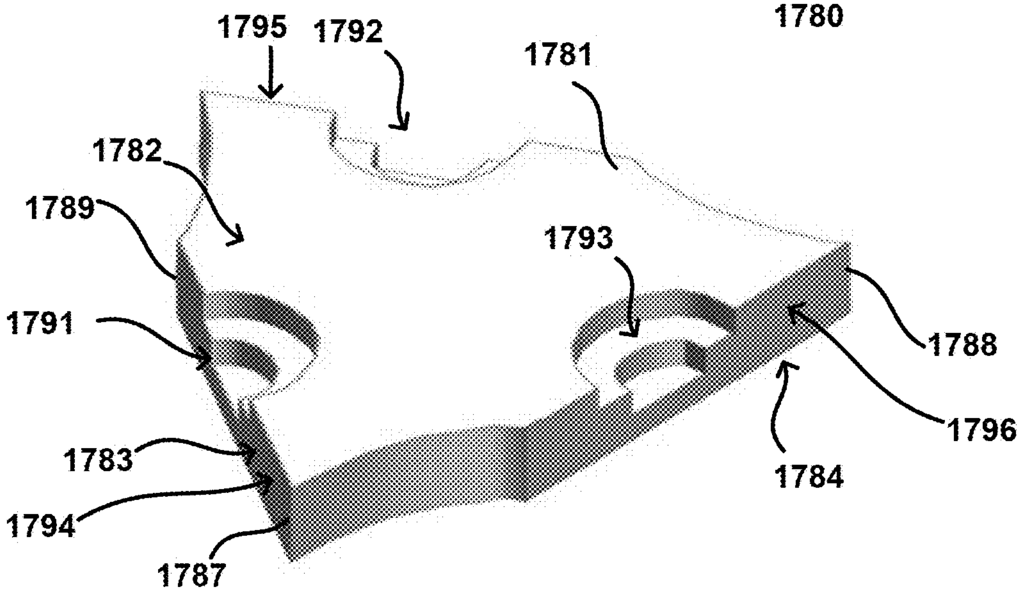
FIG. 17E includes a perspective view of the shaped abrasive particle of FIG. 17D.

It will be appreciated that various types of shaped abrasive particles can include one or more stepped depressions as described in the embodiments herein, including but not limited to shaped abrasive particles of various shapes, sizes, and contours. Moreover, the placement of the one or more stepped depressions may be varied to control the performance of the shaped abrasive particle and associated fixed abrasive articles. For example, FIG. 17D includes a top-down view of an alternative shaped abrasive particle including at least one stepped depression according to an embodiment. FIG. 17E includes a perspective view of the shaped abrasive particle of FIG. 17D. As illustrated, the shaped abrasive particle 1780 can include a body 1781 having an upper major surface 1782 (i.e., a first major surface) and a bottom major surface 1784 (i.e., a second major surface) opposite the upper major surface 1782. The upper surface 1782 and the bottom surface 1784 can be separated from each other by at least one side surface 1783. The side surface 1783 may include discrete side surface portions, which can be separated from each other by the exterior corners as described in other embodiments herein.

The shaped abrasive particle 1780 herein can include one or more stepped depressions. For example, as illustrated in FIGS. 17D and 17E, the body 1781 can include a first discrete stepped depression 1791, a second discrete stepped depression 1792, and a third discrete stepped depression 1793. The first discrete stepped depression 1791 can be located along a first side surface portion 1794, which extends between the exterior corners 1786 and 1786' and defines a linear portion of the side surface 1783 as opposed to the arcuate side surface section extending between the exterior corners 1786' and 1787. The second discrete stepped depression 1792 can be located along a second side surface portion 1795, which extends between the exterior corners 1787 and 1787' and defines a linear portion of the side surface 1783 as opposed to the arcuate side surface section extending between the exterior corners 1787' and 1788. The third discrete stepped depression 1793 can be located along a third side surface portion 1796, which extends between the exterior corners 1788 and 1788' and defines a linear portion of the side surface 1783 as opposed to the arcuate side surface section extending between the exterior corners 1788' and 1786. The discrete stepped depressions 1791, 1792, and 1793 can have any of the features of the discrete stepped depressions described in the embodiments herein. For example, as illustrated, each of the discrete stepped depressions 1791, 1792, and 1793 can include multiple depressions separated by vertical surfaces and having certain heights, which may have a particular relationship relative to each other that may facilitate certain performance of the shaped abrasive particle. As also described in embodiments herein, each of the discrete stepped depressions 1791, 1792, and 1793 may have certain shapes and contours, which may be the same or different compared to each other.

Moreover, while the embodiment of FIGS. 17D and 17E have illustrated the discrete stepped depressions 1791, 1792, and 1793 can be located along the linear portions of the side surface, it is contemplated that certain shaped abrasive particles may be formed to have one or more discrete stepped depressions at an arcuate portion of the side surface. For example, in at least one embodiment, the first discrete stepped depression may be located along the arcuate side surface portion extending between the exterior corners 1786' and 1787.

Furthermore, for any of the embodiments herein including discrete stepped depressions, it will be appreciated that the discrete stepped depressions can be present on one or more of the major surfaces and/or side surfaces of a body of a shaped abrasive particle. Moreover, a shaped abrasive particle can include a plurality of discrete stepped depressions, wherein the depressions have different shapes, sizes, and/or positions compared to each other. The discrete stepped depressions of the embodiments herein can be formed using any of the processes defined in the embodiments herein.

Figure 18A:
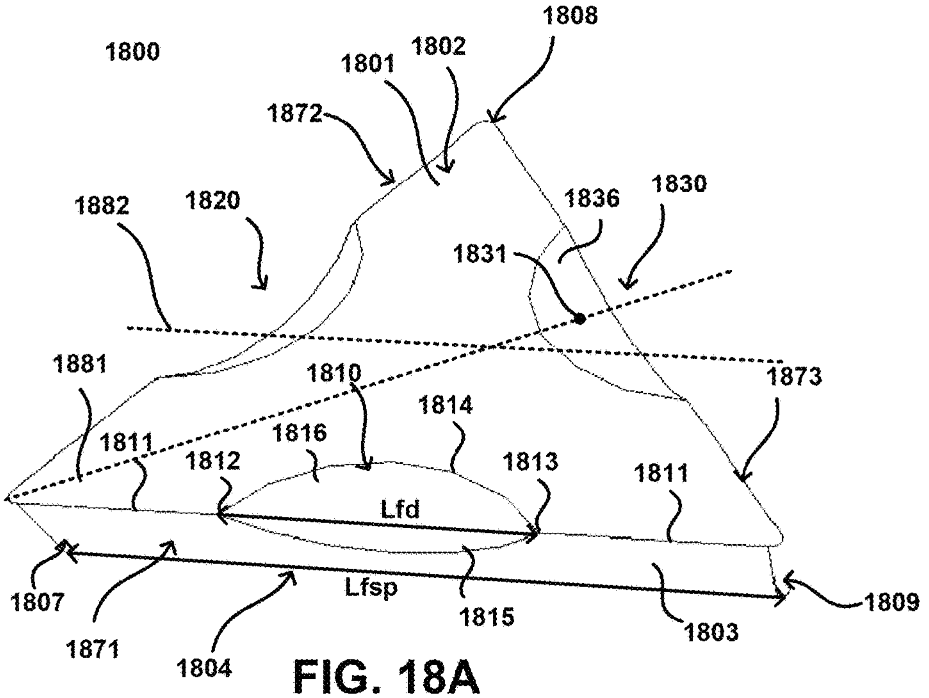
FIG. 18A includes a perspective view illustration of a shaped abrasive particle in accordance with an embodiment.
Figure 18B:
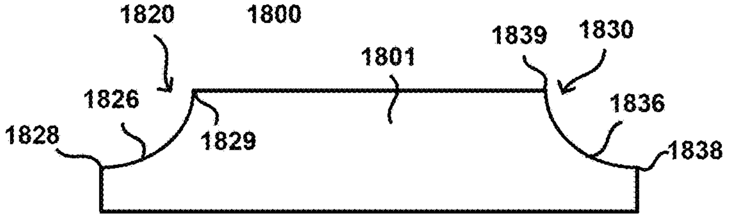
FIG. 18B includes a cross-sectional view of a portion of the shaped abrasive particle of FIG. 18A.

FIG. 18A includes a perspective view of a shaped abrasive particle according to an embodiment. FIG. 18B includes a cross-sectional illustration of a portion of the shaped abrasive particle of FIG. 18A through the axis 1882. As illustrated, the shaped abrasive particle 1800 can include a body 1801 having an upper major surface 1802 (i.e., a first major surface) and a bottom major surface 1804 (i.e., a second major surface) opposite the upper major surface 1802. The upper surface 1802 and the bottom surface 1804 can be separated from each other by at least one side surface 1803. The side surface 1803 may include discrete side surface portions, which can be separated from each other by the exterior corners as described in other embodiments herein.

According to an embodiment, the shaped abrasive particles herein can include one or more depressions. For example, as illustrated in FIG. 18A, the body 1801 can include a first depression 1810, a second depression 1820, and a third depression 1830. The first depression 1810 can be located along a first side surface portion 1871 extending between the first and second exterior corners 1807 and 1808. The first depression 1810 can be spaced apart from the first and second depressions 1820 and 1830. Notably, the boundaries of the first depression 1810 as defined by the edges 1814 and 1815 and the corners 1812 and 1813 can be spaced away from the first and second exterior corners 1807 and 1808. In one particular embodiment, the first depression 1810 can be formed such that no portion of the first depression 1810 intersects an exterior corner of the body 1801. Still, in at least one alternative embodiment, a shaped abrasive particle can be formed such that at least one depression intersects one or more exterior corners of the body. While various details of the shape and contour of portions of the first depression 1810 are described herein, it will be appreciated that other shapes, sizes, and contours of the surfaces can be utilized beyond those illustrated herein.

The depressions can be formed using any of the processes defined in the embodiments herein. The depressions of the embodiments herein can be formed using any suitable technique. For example, formation of one or more depressions can be conducted during the forming process, including but not limited to during molding, casting, printing, pressing, extruding, and a combination thereof. For example, the depressions can be formed during the shaping of the mixture, such as by use of a production tool having a shape configured to form a depression in one or more of the precursor shaped abrasive particles, and ultimately within the finally-formed shaped abrasive particles. Alternatively, the depressions may be formed by one or more post-forming operations, which may be conducted on the mixture after forming, such as on the precursor shaped abrasive particles or finally-formed shaped abrasive particles. Some exemplary post-forming operations that may be suitable for forming the discrete stepped depression can include scoring, cutting, stamping, pressing, etching, ionization, heating, ablating, vaporization, heating, and a combination thereof.

As further illustrated, the body 1801 can further include a second depression 1820. The second depression 1820 can be located along a second side surface portion 1872 extending between the second and third exterior corners 1808 and 1809. The second depression 1820 can be spaced apart from the first and third depressions 1810 and 1830. Notably, the boundaries of the second depression 1820 can be spaced away from the second and third exterior corners 1808 and 1809. In one particular embodiment, the second depression 1820 can be formed such that no portion of the second depression 1820 intersects an exterior corner of the body 1801. While various details of the shape and contour of portions of the second discrete stepped depression 1820 are described herein, it will be appreciated that other shapes, sizes, and contours of the surfaces can be utilized beyond those illustrated herein.

As further illustrated, the body 1801 can further include a third depression 1830. The third depression 1830 can be located along a second side surface portion 1873 extending between the first and third exterior corners 1807 and 1809. The third depression 1830 can be spaced apart from the first and second depressions 1810 and 1820. Notably, the boundaries of the third discrete stepped depression 1830 can be spaced away from the first and third exterior corners 1807 and 1809. In one particular embodiment, the third depression 1830 can be formed such that no portion of the third discrete stepped depression 1830 intersects an exterior corner of the body 1801. While various details of the shape and contour of portions of the third discrete stepped depression 1830 are described herein, it will be appreciated that other shapes, sizes, and contours of the surfaces can be utilized beyond those illustrated herein.

Figure 18C:
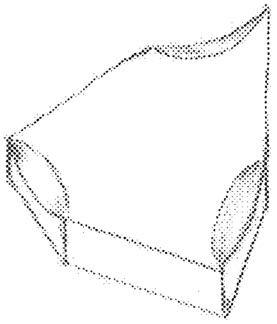
FIGS. 18C-18E include perspective view illustrations of shaped abrasive particles according to embodiments.
Figure 18D:
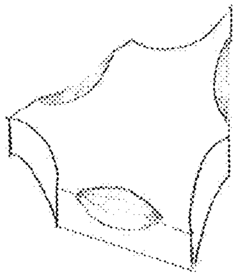

Any one of the first, second, and/or third depressions 1810, 1820, and 1830 of the body 1801 can have any one or more of the features of other depressions as described in embodiments herein. Furthermore, it will be appreciated, as illustrated in FIGS. 18C and 18D, various different types of shaped abrasive particles can include various numbers and placements of depressions. As illustrated in FIG. 18A, in at least one embodiment, the first depression 1810 can include a first surface 1816 having a curved contour. The first depression 1810 can be defined by a first edge 1814 intersecting the major surface 1802 and extending between corners 1812 and 1813 that are located on the edge 1811 defined by the joining of the first side surface portion 1871 with the major upper surface 1802 of the body 1801.

According to one particular embodiment, the first edge 1814 can have a curved contour. More particularly, the first edge 1814 can be a monotonic curve 1814, wherein the degree of curvature is substantially the same and defining a smooth arcuate path through a portion of the major upper surface 1802. According to another embodiment, the second edge 1815 can have a curved contour. More particularly, the second edge 1815 can be monotonic curve 1815, wherein the degree of curvature is substantially the same and the second edge 1815 defines a smooth arcuate path through a portion of the first side surface portion 1871. It will be appreciated and is contemplated herein, that the first and second edges 1814 and 1815 can include linear contours, and may include a combination of linear and curved sections.

According to one particular embodiment, the first edge 1814 can be initiated at a corner 1812 located on the edge 1811 and extend through the upper major surface 1802 and terminate at the corner 1813 located on the edge 1811 of the body. Moreover, the second edge 1815 can be initiated at a corner 1812 located on the edge 1811 and extend through the first side surface portion 1871 and terminate at the corner 1813 located on the edge 1811 of the body. As such, in one particular embodiment, the first and second edges 1814 and 1815 are intersecting and joined to each other at the first and second corners 1812 and 1813 located on the edge 1811.

In one aspect, the first depression 1810 can include a first surface 1816, which can have a curved contour. In particular, the first surface 1816 can have a concave contour, and more particularly, the first surface 1816 can define a concave contour in the edge 1811 of the first side surface 1817 of the body 1801. In certain instances, the first surface 1816 can have a curvature defined by a portion of a sphere. For example, as illustrated with respect to the third depression 1830 having a third surface 1836, the lowest point 1831 of the concave third surface 1836 is positioned in the center of the third surface 1836 along an axis 1881 extending from the first exterior corner 1807 and through a midpoint of the body 1801.

As further illustrated in FIG. 18A, the first depression 1810 can have a first length (Lfd) defining the longest dimension of the first depression 1810. The length of the first depression 1810 can extend substantially along the edge 1811. Moreover, the length (Lfd) of the first depression 1810 may be controlled relative to other dimensions of the body, which may facilitate improved deployment and/or performance of the shaped abrasive particle 1800. For example, the length (Lfd) of the first depression 1810 can have a particular relationship relative to the length (Lfsp) of the first side surface portion 1871 of the side surface 1803. Notably, the length (Lfd) of the first depression 1810 can be less than the length (Lfsp) of the first side surface portion 1871. Moreover, the relative length (Lfd) of the first depression 1810 to the length (Lfsp) of the first side surface portion 1871 can be the same as the relationship set forth between the first curved section length (Lc1) relative to the total length (Lfp1) of the first portion as set forth in the embodiment of FIG. 14 herein. For example, the relationship between the length (Lfd) and the length (Lfsp) can define a length factor (Lfd/Lfsp), which maybe not greater than about 1, such as not greater than about 0.95 or not greater than about 0.9 or not greater than about 0.85 or not greater than about 0.8 or not greater than about 0.75 or not greater than about 0.7 or not greater than about 0.65 or not greater than about 0.6 or not greater than about 0.55 or not greater than about 0.5 or not greater than about 0.45 or not greater than about 0.4 or not great not greater than about 0.35 or not greater than about 0.3 or not greater than about 0.35 or not greater than about 0.3 or not greater than about 0.25 or not greater than about 0.2 or not greater than about 0.15 or not greater than about 0.1 or not greater than about 0.05. Still, in another non-limiting embodiment, the length factor (Lfd/Lfsp) may be at least about 0.05, such as at least about 0.1, at least about 0.15, or even at least about 0.2. It will be appreciated that the length factor (Lfd/Lfsp) can be within a range between any of the minimum and maximum values noted above.

FIG. 18B includes a cross-sectional view of a portion of the shaped abrasive particle 1800 along the axis 1882. Notably, the illustration includes a cross-sectional view of portions of the second and third depression 1820 and 1830. According to one embodiment, the surface 1826 of the second depression 1820 can have a curved shape, and more particularly, a generally concave shape extending into the volume of the body 1801 of the shaped abrasive particle 1800. The surface 1826 can include corners 1828 and 1829 of the edges as viewed in cross-section, which are relatively sharp as illustrated. In certain other instances, the corners 1828 and 1829 can be more rounded, defining larger radius of curvatures, as illustrated and described in other embodiments herein. As further illustrated in FIG. 18B, the surface 1836 of the third depression 1830 can have a curved shape, and more particularly, a generally concave shape extending into the volume of the body 1801 of the shaped abrasive particle 1800. The surface 1836 can include corners 1838 and 1839 of the edges as viewed in cross-section, which are relatively sharp as illustrated. In certain other instances, the corners 1838 and 1839 can be more rounded, having larger radius of curvatures, as illustrated and described in other embodiments herein.

Figure 18E:
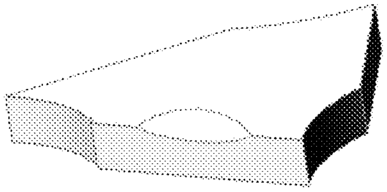

FIGS. 18C,18D, and 18E include perspective view illustrations of other shaped abrasive particles including depressions according to embodiments. The shaped abrasive particles of FIGS. 18C and 18D include depressions located on certain portions of the edges between the side surface and the upper major surfaces of the particles. The depression can have any of the features of the depressions described in the embodiments herein. Notably, the shaped abrasive particle of FIG. 18C includes depressions located on the portions of the side surface having a curved contour. The shaped abrasive particle of FIG. 18D include depressions located on portions of the side surface having a linear shape. As further illustrated in FIG. 18E, a shaped abrasive particle can be formed to have a single depression according to an embodiment.

Figure 19A:
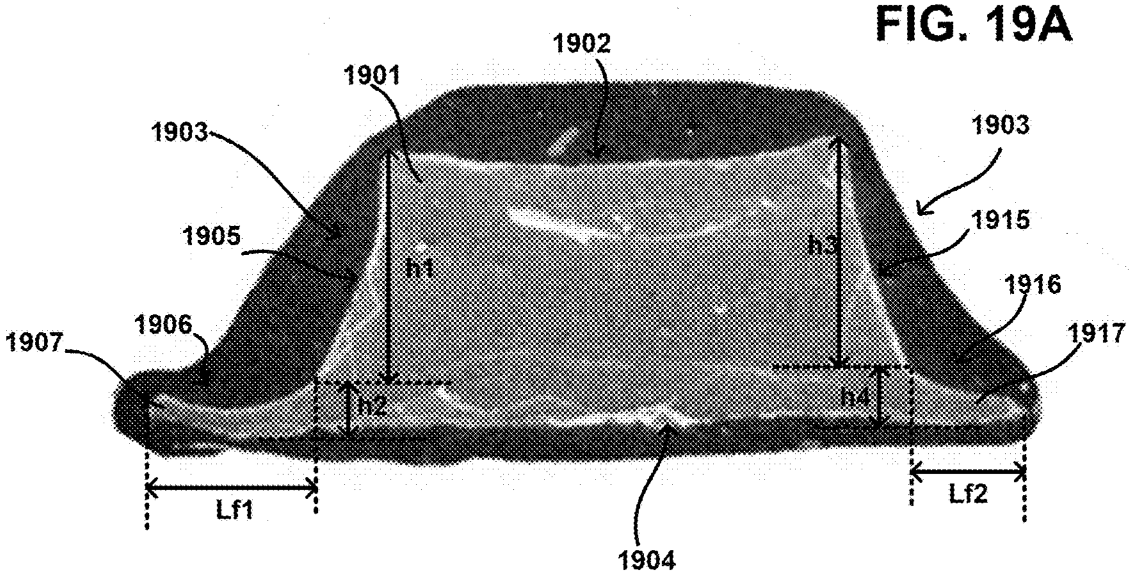
FIG. 19A includes a cross-sectional view of a portion of the shaped abrasive particle according to an embodiment.
Figure 19B:
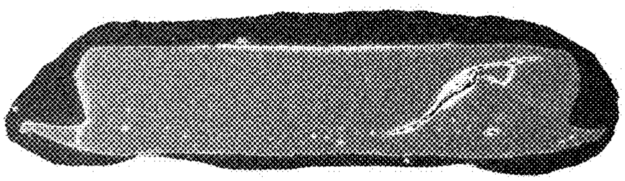
FIGS. 19B-19E include cross-sectional views of shaped abrasive particles according to embodiments herein.
Figure 19C:
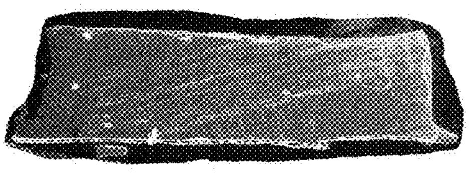
Figure 19D:
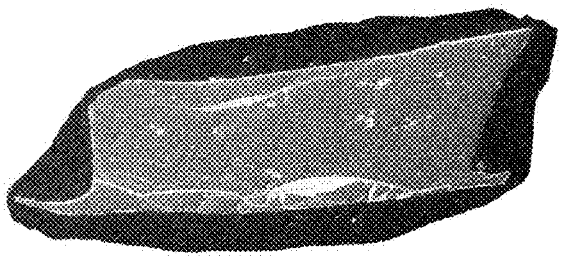
Figure 19E:
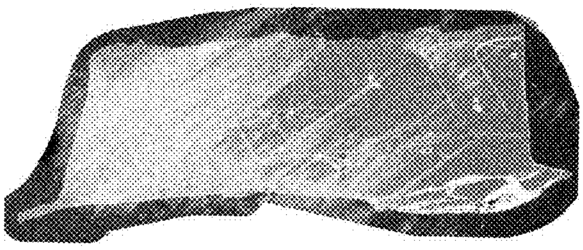

FIG. 19A includes a cross-sectional view of a shaped abrasive particle according to an embodiment. As illustrated, the shaped abrasive particle 1900 can include a body 1901 having an upper major surface 1902 (i.e., a first major surface) and a bottom major surface 1904 (i.e., a second major surface) opposite the upper major surface 1902. The upper surface 1902 and the bottom surface 1904 can be separated from each other by at least one side surface 1903. The side surface 1903 may include discrete side surface portions, which can be separated from each other by the exterior corners as described in other embodiments herein.

In at least one embodiment, the side surface 1903 can include a first region 1905 having a first height (h1). The side surface 1903 can further include a second region 1906 having a second height (h2). The sum of the first and second heights (h1 and h2) of the first and second regions 1905 and 1906 can define the total height of the body 1901 at the side surface 1903. In particular instances, the first height (h1) can have a particular relationship relative to the total height. For example, the first height (h1) can extend for a majority of the height of the body 1901 at the side surface 1903. In still another embodiment, the second height (h2) can extend for a minority of the height of the body 1901 at the side surface 1903.

In at least one embodiment, h1 is greater than h2. The relationship between h1 and h2 can be defined by a ratio (h2/h1) wherein the ratio (h2/h1) can have a value of not greater than about 1, such as not greater than about 0.95 or not greater than about 0.9 or not greater than about 0.85 or not greater than about 0.8 or not greater than about 0.75 or not greater than about 0.7 or not greater than about 0.65 or not greater than about 0.6 or not greater than about 0.55 or not greater than about 0.5 or not greater than about 0.45 or not greater than about 0.4 or not great not greater than about 0.35 or not greater than about 0.3 or not greater than about 0.35 or not greater than about 0.3 or not greater than about 0.25 or not greater than about 0.2 or not greater than about 0.15 or not greater than about 0.1 or not greater than about 0.05. Still, in another non-limiting embodiment, the ratio (h2/h1) can be at least about 0.05, such as at least about 0.1 or at least about 0.15, or even at least about 0.2. It will be appreciated that the ratio (h2/h1) can be within a range between any of the minimum and maximum values noted above.

As further illustrated, in certain shaped abrasive particles of the embodiments herein, the side surface 1903 can include a second region 1906 including a flange 1907 joined to the side surface 1903 and the bottom major surface 1904 of the body 1901 and further extending outward from the side surface 1903 of the body 1901. The flange may be formed due to overfilling of the production tool with a mixture, and may facilitate improved deployment and/or performance of the shaped abrasive particle. In at least one embodiment, the flange 1907 can have a length (Lf1). In at least one embodiment, the length (Lf1) of the flange 1907 can be different compared to the height (h2) of the second region 1906. For example, the length (Lf1) can be greater than the height (h2). In some instances, the flange 1907 may have a rectangular cross-sectional contour. For example, as illustrated in FIG. 19A, the flange 1907 has a rounded or curved cross-sectional shape.

As further illustrated in FIG. 19A, the side surface 1903 further includes a third region 1915 and fourth region 1916 on opposite sides of the body 1901 from the first region 1905 and second region 1906. The third region 1915 can have a third height (h3) and the fourth region 1916 can have a fourth height (h4). The sum of the third and fourth heights (h3 and h4) can define the total height of the body 1901 at the side surface 1903 for the third and fourth regions 1915 and 1916. In particular instances, the third height (h3) can extend for a majority of the height of the body 1901 at the side surface 1903 and the fourth height (h4) can extend for a minority of the total height of the body 1901 at the side surface 1903. The relative differences between the third height (h3) and the fourth height (h4) can be the same as described herein for the first height (h1) and the second height (h2).

The side surface 1903 can further include a flange 1917 joined to the side surface 1903 and the bottom major surface 1904 of the body 1901 and further extending outward from the side surface 1903 of the body 1901 in the fourth region 1916. The flange 1917 may be formed due to overfilling of the production tool with a mixture, and may facilitate improved deployment and/or performance of the shaped abrasive particle. The flange 1917 can have any of the features of other flanges described herein.

FIGS. 19B, 19C, 19D, and 19E include cross-sectional images of shaped abrasive particles having at least one or more features of the shaped abrasive particle of FIG. 19A. Notably, the shaped abrasive particles of FIGS. 19B-19E can have side surfaces that include first and second regions defining different heights of the particle as described in the particular illustrated in FIG. 19A. Additionally, the shaped abrasive particles of FIGS. 19B-19E include one or more flanges joined to the side surface as described in embodiments herein. As illustrated, the flange may have various sizes and shapes relative to the other surfaces of the particle, which may assist with improving deployment and/or performance of the abrasive particles.

The shaped abrasive particles having a flange extending from a side surface can be formed using any of the processes defined in the embodiments herein. As noted herein, the flange and particular aspects of the side surface can be created during the forming process, such as by the overfilling of a production tool with the mixture. Still, other processes for forming such particles having the cross-sectional shape as illustrated in FIGS. 19A-19E can include molding, casting, printing, pressing, extruding, drying, heating, sintering, and a combination thereof. Alternatively, the features of the shaped abrasive particles of FIGS. 19A-E may be formed by one or more post-forming operations, which may be conducted on the mixture after forming, such as on the precursor shaped abrasive particles or finally-formed shaped abrasive particles. Some exemplary post-forming operations that may be suitable for forming the discrete stepped depression can include scoring, cutting, stamping, pressing, etching, ionization, heating, ablating, vaporization, heating, and a combination thereof.

Figure 20A:
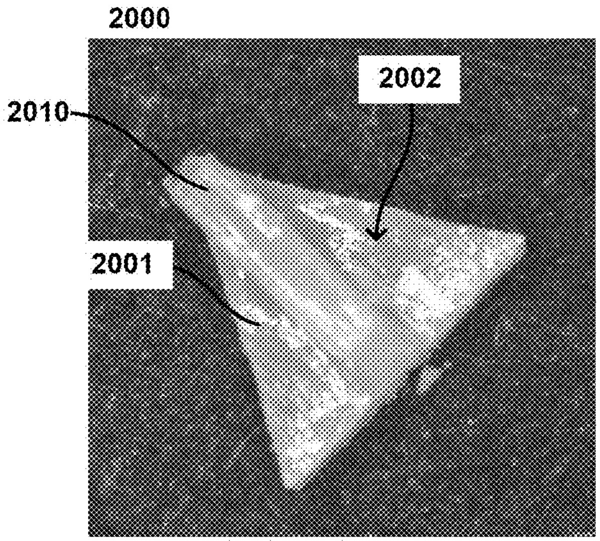
FIG. 20A includes a top-down image of a shaped abrasive particle according to an embodiment.
Figure 20B:
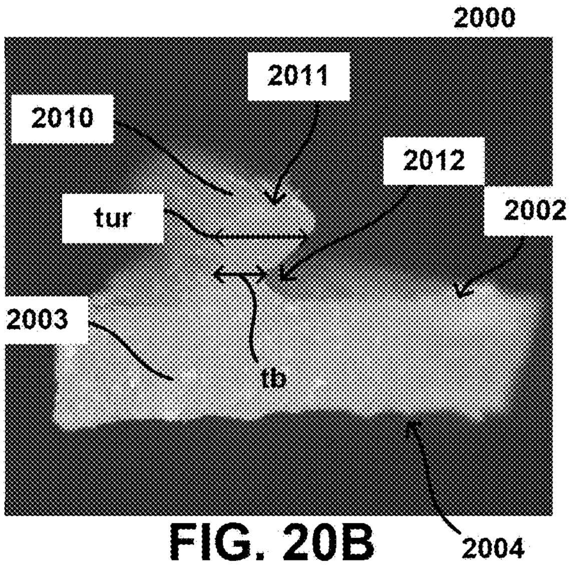
FIG. 20B includes a side view image of shaped abrasive particles according to an embodiment.

FIG. 20A includes a top-down image of a shaped abrasive particle according to an embodiment. FIG. 20B includes a side view image illustration of the shaped abrasive particle of FIG. 20A. As illustrated, the shaped abrasive particle 2000 can include a body 2001 having an upper major surface 2002 (i.e., a first major surface) and a bottom major surface 2004 (i.e., a second major surface) opposite the upper major surface 2002. The upper surface 2002 and the bottom surface 2004 can be separated from each other by at least one side surface 2003. The side surface 2003 may include discrete side surface portions, which can be separated from each other by the exterior corners as described in other embodiments herein.

According to an embodiment, the shaped abrasive particles herein can include one or more protrusions, including for example, the protrusion 2010 extending along and vertically above the upper major surface 2002. The protrusion may facilitate improved deployment and/or performance of the shaped abrasive particle. In particular embodiments, the protrusion can have a base 2012 and an upper region 2011, wherein the base is integrally joined and formed with the body 2001 and the upper major surface 2002 of the shaped abrasive particle. In at least one embodiment, the upper region 2011 can have a rounded contour. As illustrated in FIG. 20B, the upper region 2011 may have a generally ellipsoidal shape as viewed from the side of the body 2001. Moreover, in at least one embodiment, the base 2012 may have a thickness (tb) that is different than a thickness (tur) of the upper region 2011. Notably, in one embodiment, the base 2012 may have a thickness (tb) that is significantly less than the thickness (tur) of the upper region 2011, such that the base has a neck region of a narrower size relative to the thickness (tur) of the upper region 2011.

Figure 20C:
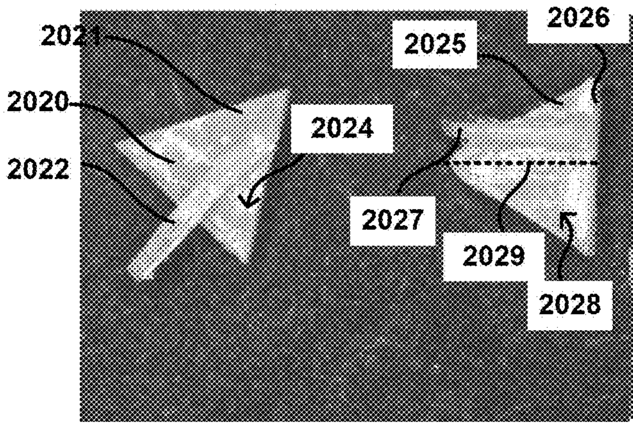
FIGS. 20C-20F include top-down images of shaped abrasive particles according to embodiments herein.
Figure 20D:
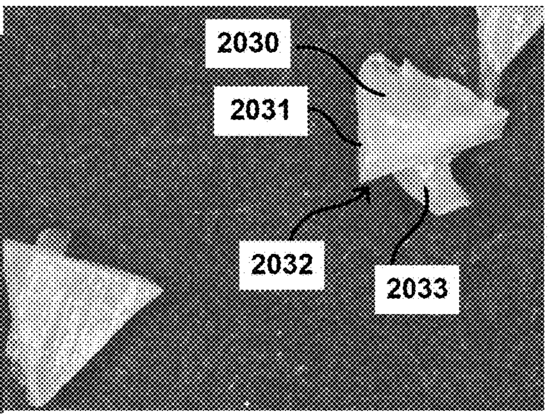
Figure 20E:
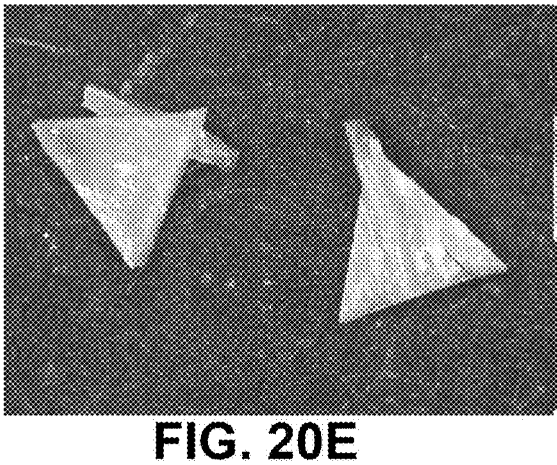

FIGS. 20C-20E include images of other shaped abrasive particles including protrusions. Notably, as illustrated, the position, size and contour of the protrusion can be varied, which may facilitate various advantages in the deployment and/or performance of the abrasive particle and associated fixed abrasive article. As illustrated in FIG. 20C, the abrasive particle 2020 includes a body 2021 and a protrusion 2022 extending along and vertically above the upper major surface 2024 of the body 2021. The protrusion may facilitate improved deployment and/or performance of the shaped abrasive particle. In particular embodiments, such as illustrated in FIG. 20C, the protrusion can have a length that is greater than the length of the particle, such that at least a portion of the protrusion extends beyond the terminal edges of the upper major surface 2024. As further illustrated in FIG. 20C, an alternative embodiment, at least one shaped abrasive particle, such as shaped abrasive particle 2025 can have a body 2026 and a protrusion 2027 extending along the upper major surface 2028, wherein the protrusion 2027 is disposed a distance laterally from a bisecting axis 2029 of the body 2026. That is, as illustrated, the entire protrusion 2027 can be off-center such that it is spaced a distance away from a bisecting axis 2029 of the upper major surface 2028 as viewed top down.

Figure 20F:
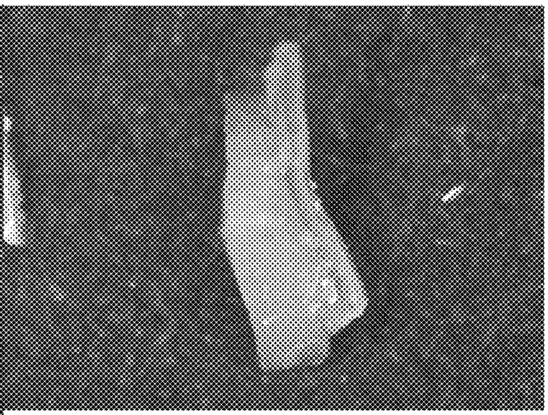

Furthermore, in certain instances, the protrusions may be suitable for placing the shaped abrasive particles in a desired position and/or orientation. For example, as illustrated in FIG. 20D, the shaped abrasive particle 2030 can have a body 2031 including a protrusion 2033 extending from a major surface 2032 of the body 2031. As further illustrated, the protrusion 2033 has placed the body 2031 in a controlled position on the surface as provided in the image. The size, shape, and contours of the surfaces of the protrusion 2033 may be controlled to facilitate improved control of the position of the shaped abrasive particles on a surface, including for example, a substrate that may be used to form a fixed abrasive article, such that the fixed abrasive article can utilize shaped abrasive particles in controlled positions which may facilitate improved abrasive capabilities of the fixed abrasive article. FIG. 20E includes an additional top-down image of shaped abrasive particles having a protrusion. FIG. 20F includes a side image of a shaped abrasive particle including a protrusion.

The shaped abrasive particles having a protrusion can be formed using any of the processes defined in the embodiments herein. As noted herein, the protrusion can be created during the forming process, such as by utilization of a doctor blade having an opening or non-linear shape to allow for non-uniform filling of the cavities of the production tool. Still, other processes for forming such particles having the c shapes as illustrated in FIGS. 20A-20F can include molding, casting, printing, pressing, extruding, drying, heating, sintering, and a combination thereof. Alternatively, the features of the shaped abrasive particle of FIG. 20 may be formed by one or more post-forming operations, which may be conducted on the mixture after forming, such as on the precursor shaped abrasive particles or finally-formed shaped abrasive particles. Some exemplary post-forming operations that may be suitable for forming the discrete stepped depression can include scoring, cutting, stamping, pressing, etching, ionization, heating, ablating, vaporization, heating, and a combination thereof. In certain instances, one or more surfaces (e.g., the upper major surface) of the shaped abrasive particles may have very fine lines, which is artifact of aspects of the forming process, including the movement of a doctor blade over the surface of the gel while it resides in the production tool.

Figure 21A:
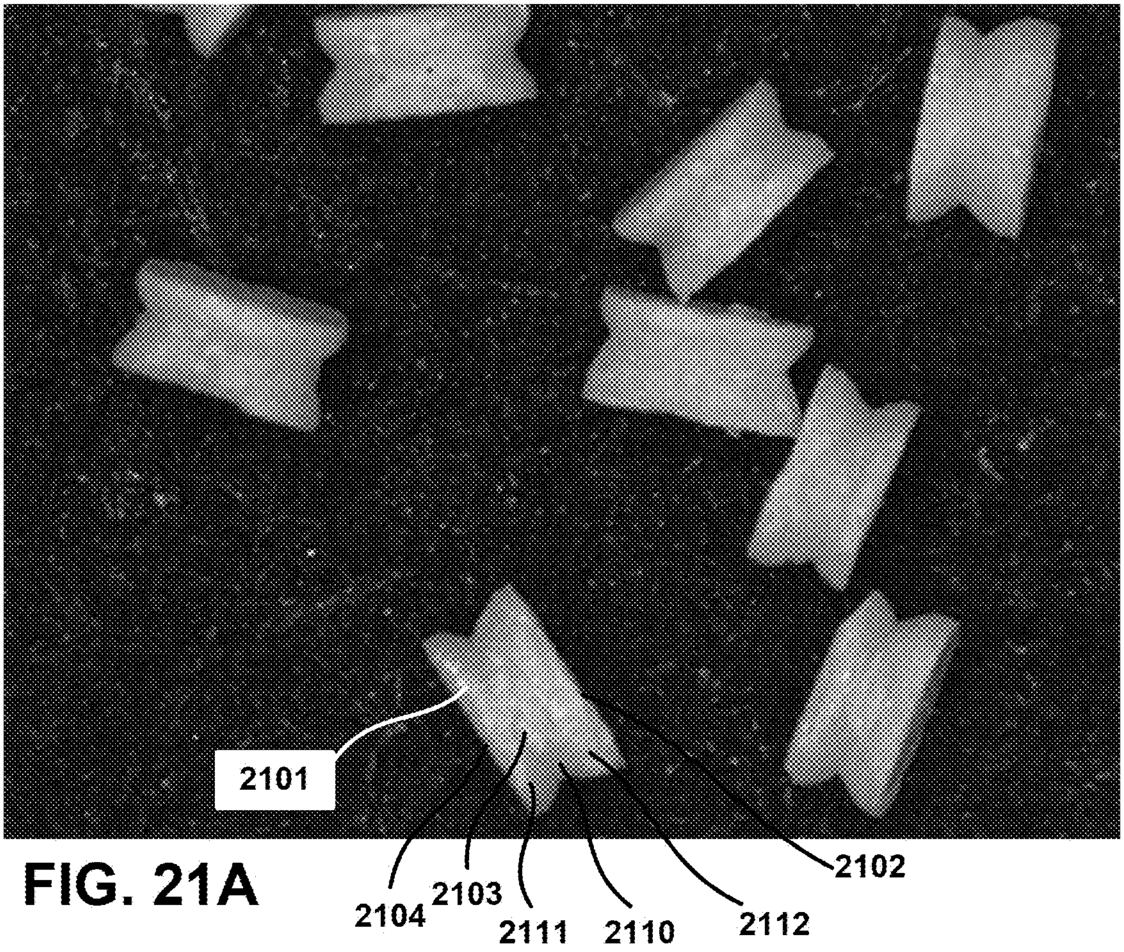
FIG. 21A includes a top-down image of shaped abrasive particles.
Figure 21B:
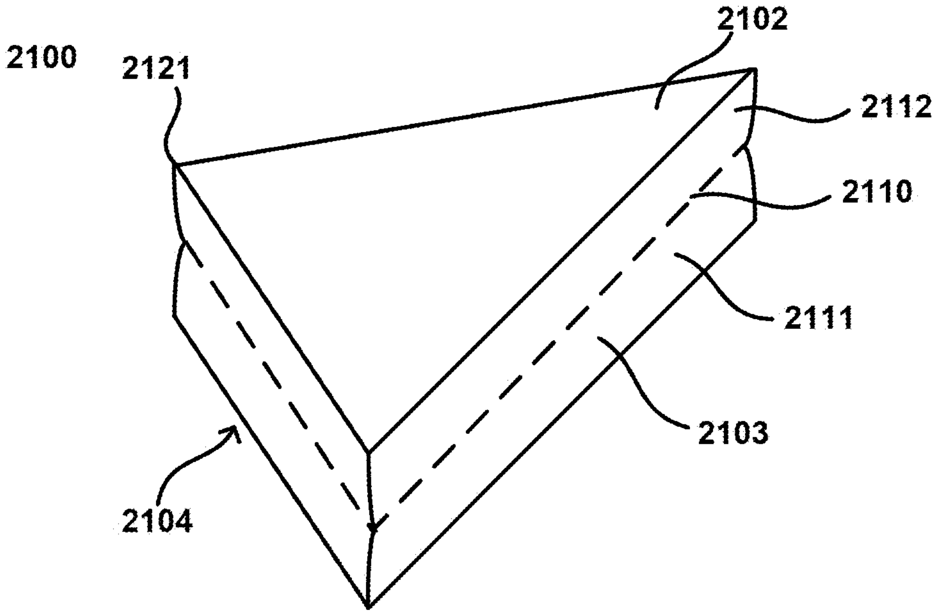
FIG. 21B includes a perspective view illustration of a shaped abrasive particle according to an embodiment.

FIG. 21A includes images of the sides of shaped abrasive particles. FIG. 21B includes a perspective view illustration of a shaped abrasive particle according to an embodiment. As illustrated, the shaped abrasive particle 2100 can include a body 2101 having an upper major surface 2102 (i.e., a first major surface) and a bottom major surface 2104 (i.e., a second major surface) opposite the upper major surface 2102. The upper surface 2102 and the bottom surface 2104 can be separated from each other by at least one side surface 2103. The side surface 2103 may include one or more depressions 2110 extending peripherally around the body 2101 at a central region of the body. As provided in FIGS. 21A and B, the body 2101 as viewed from the side can have an hourglass shape. Notably, the side surface 2103 may include a depression 2110 extending around the periphery of the body 2101 and contained between a first convex portion 2111 joined to the depression 2110 and the bottom major surface 2104 and a second convex portion 2112 joined to the depression 2110 and the upper major surface 2102 of the body 2101. Notably, the first and second convex portions 2111 and 2112 can join together at the depression 2110 and define a generally V-shaped depression or notch in the side surface 2103 of the body 2101.

In at least one embodiment, the shaped abrasive particles of the embodiments herein can have a depression extending peripherally around the body and also have particularly sharp exterior corners as viewed top down at one of the major surfaces as described in embodiments herein. For example, as described in association with the embodiment of FIG. 12B, the shaped abrasive particle 2100 can have one or more exterior corners, such as exterior corner 2121 having an average tip sharpness of not greater than 250 microns. According to one particular embodiment, the average tip sharpness can be not greater than 240 microns, such as not greater than 230 microns or not greater than 220 microns or not greater than 210 microns or not greater than 200 microns or not greater than 190 microns or not greater than 180 microns or not greater than 170 microns or not greater than 160 microns or not greater than 150 microns or not greater than 140 microns or not greater than 130 microns or not greater than 120 microns or not greater than 110 microns or not greater than 100 microns or not greater than 90 microns or not greater than 80 microns or not greater than 70 microns or not greater than 60 microns or not greater than 50 microns or not greater than 40 microns or not greater than 30 microns or not greater than 20 microns. In yet another non-limiting embodiment, the average tip sharpness can be at least 0.1 microns, such as at least 1 micron at least 2 microns or at least 5 microns or at least 10 microns or at least 15 microns or at least 20 microns. In at least one particular embodiment, the average tip sharpness can be within a range including any of the minimum and maximum values herein, including but not limited to within a range of at least 1 micron and not greater than 250 microns or even within a range of at least 1 micron and not greater than 100 microns.

The combination of the side surface shape and particularly sharp exterior corners may facilitate improved deployment and/or performance of the shaped abrasive particles. Moreover, such a combination may be particularly unique to shaped abrasive particles formed from a production tooling having the openings formed by etching processes. Some etching processes may create production tools having a cavity with a side surface configured to impart a hourglass shape to the body of the shaped abrasive particle as viewed from the side. However, conventional production tools having cavities or openings formed by etching also define shapes having highly rounded corners, and thus the average tip sharpness of the resulting shaped abrasive particles may be greater than 300 microns. The present shaped abrasive particles may be formed with production tools having side surfaces that have been etched and corners that have been processed or treated (e.g., machining or ablation) that reduce the radius of curvature (i.e., low the average tip sharpness) of the exterior corners as viewed top-down. The combination of an hourglass shape, which may define draft angles significantly less than 90 degrees, combined with exterior corners having a particularly low average tip sharpness may be facilitate improved deployment and/or performance of the abrasive particles and associated fixed abrasive articles.

Figure 22A:
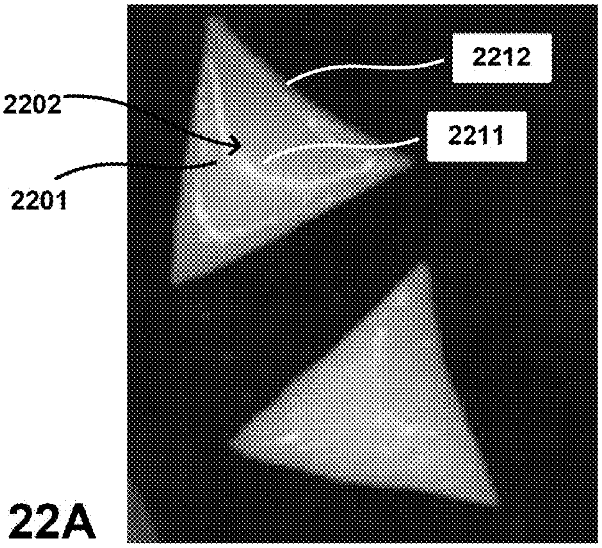
FIG. 22A includes a top-down image of shaped abrasive particles according to an embodiment.

FIG. 22A includes a top-down image of a shaped abrasive particle according to an embodiment. As provided, the shaped abrasive particle can include a body 2201 having an upper major surface 2202 having graded thickness that is decreasing from the region 2211 to the edge 2212. The graded thickness can be a decreasing height of the grain from the region 2211 to the edge 2212 or a regions near the edge 2212. Such shape features may facilitate improved deployment and/or performance of the shaped abrasive particles. Such shape features may be formed during processing, and may be controlled by the manner in which the cavities of a production tool are filled. Notably, one may control the pressure applied to the mixture and the orientation of the openings relative to the direction of translation of the production tool to control the formation of such shape features.

Figure 22B:
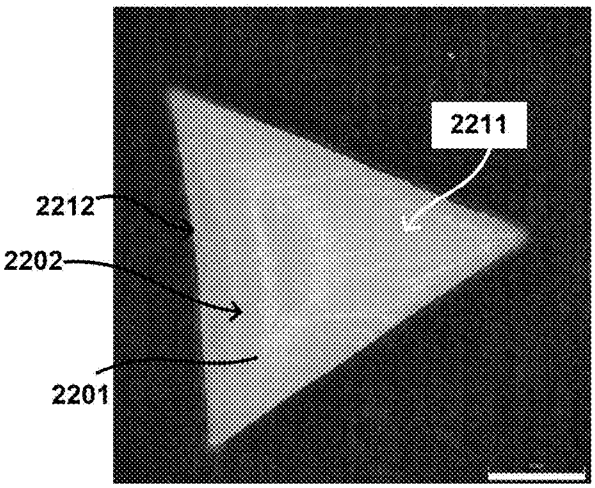
FIG. 22B includes a top-down image of shaped a abrasive particle according to an embodiment.
Figure 22C:
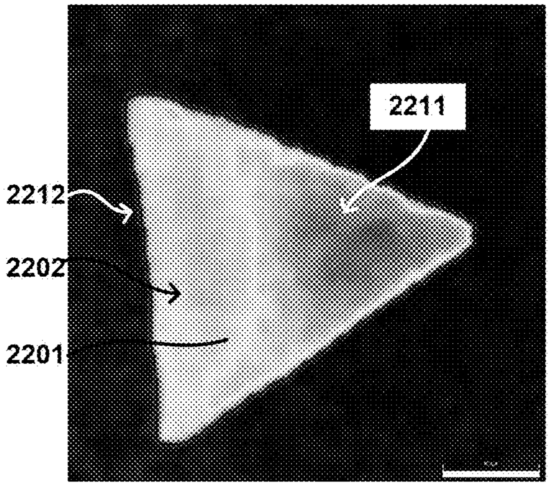
FIG. 22C includes a top-down topographical image of the shaped abrasive particle of FIG. 22B.
Figure 22D:
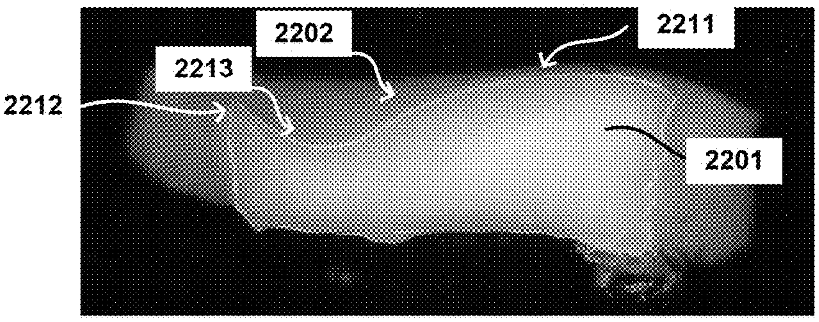
FIG. 22D includes a cross-sectional illustration of the shaped abrasive particles of FIGS. 22B and 22C.
Figure 23A:
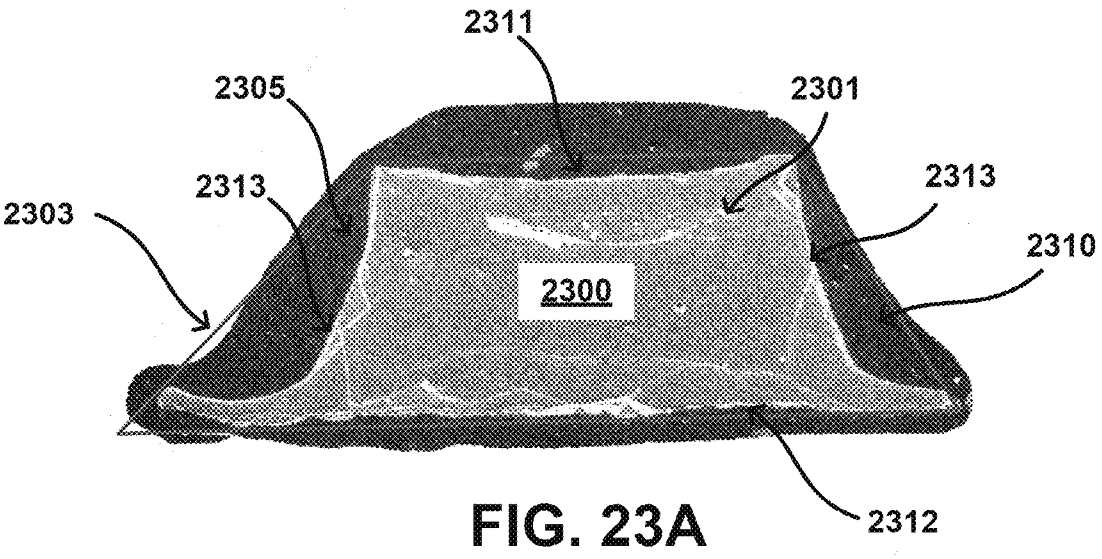
FIG. 23A includes a cross-sectional view of a shaped abrasive particle according to an embodiment.
Figure 23B:
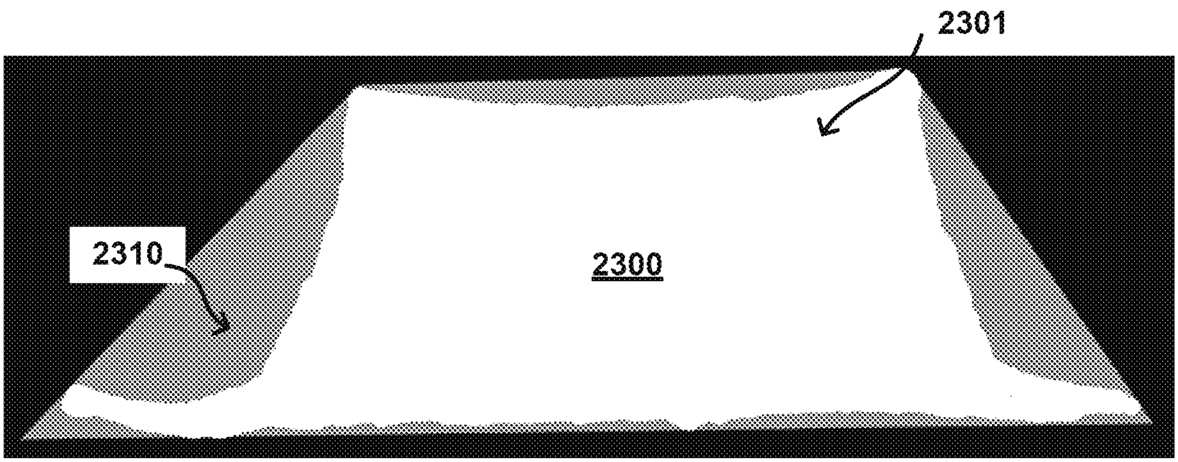
FIG. 23B includes a cross-sectional view of portion of the shaped abrasive particle of FIG. 23A according to an embodiment.

FIG. 22B and FIG. 22C include top-down images of a shaped abrasive particle having a graded thickness. FIG. 22D includes a cross-sectional illustration of the shaped abrasive particles of FIGS. 22B and 22C. Notably, FIG. 22C provides a topographical view of the shaped abrasive particle of FIG. 22B including the graded thickness of the upper major surface 2202 from the region 2211 to the edge 2212. FIG. 22D includes a cross-sectional illustration of the shaped abrasive particle of FIG. 22B. The cross-sectional view of FIG. 22D provides further illustration of the graded thickness of the shaped abrasive particle. As further illustrated, the graded thickness includes a depression 2213 as a lowest point adjacent the edge 2212. As such, in certain instances, the lowest point in the upper surface 2202 may not be at the edge 2212.

A Fixed Abrasive Article

After forming or sourcing the shaped abrasive particles, the particles can be combined with other materials to form a fixed abrasive article. In a fixed abrasive, the shaped abrasive particles can be coupled to a matrix or substrate and used for material removal operations. Some suitable exemplary fixed abrasive articles can include bonded abrasive articles wherein the shaped abrasive particles are contained in a three dimensional matrix of bond material. In other instances, the fixed abrasive article may be a coated abrasive article, wherein the shaped abrasive particles may be dispersed in a single layer overlying a backing and bonded to the backing using one or more adhesive layers.

Figure 5A:
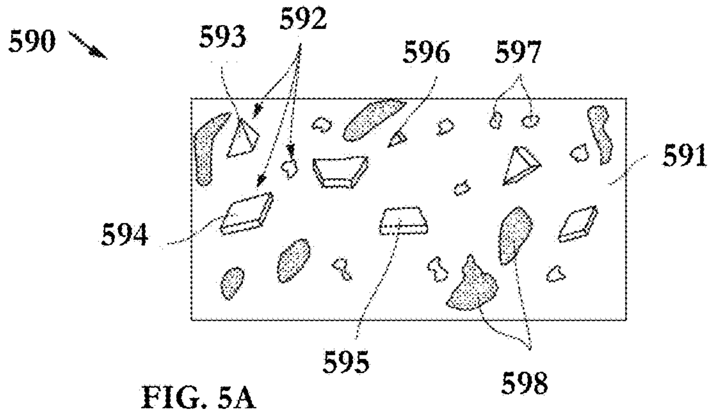
FIG. 5A includes an illustration of a bonded abrasive article incorporating shaped abrasive particles in accordance with an embodiment.

FIG. 5A includes an illustration of a bonded abrasive article incorporating the abrasive particulate material in accordance with an embodiment. As illustrated, the bonded abrasive 590 can include a bond material 591, abrasive particulate material 592 contained in the bond material, and porosity 598 within the bond material 591. In particular instances, the bond material 591 can include an organic material, inorganic material, and a combination thereof. Suitable organic materials can include polymers, such as epoxies, resins, thermosets, thermoplastics, polyimides, polyamides, and a combination thereof. Certain suitable inorganic materials can include metals, metal alloys, vitreous phase materials, crystalline phase materials, ceramics, and a combination thereof.

In some instances, the abrasive particulate material 592 of the bonded abrasive 590 can include shaped abrasive particles 593, 594, 595, and 596. In particular instances, the shaped abrasive particles 593, 594, 595, and 596 can be different types of particles, which can differ from each other in composition, two-dimensional shape, three-dimensional shape, size, and a combination thereof as described in the embodiments herein. Alternatively, the bonded abrasive article can include a single type of shaped abrasive particle.

The bonded abrasive 590 can include a type of abrasive particulate material 597 representing diluent abrasive particles, which can differ from the shaped abrasive particles 593, 594, 595, and 596 in composition, two-dimensional shape, three-dimensional shape, size, and a combination thereof.

The porosity 598 of the bonded abrasive 590 can be open porosity, closed porosity, and a combination thereof. The porosity 598 may be present in a majority amount (vol %) based on the total volume of the body of the bonded abrasive 590. Alternatively, the porosity 598 can be present in a minor amount (vol %) based on the total volume of the body of the bonded abrasive 590. The bond material 591 may be present in a majority amount (vol %) based on the total volume of the body of the bonded abrasive 590. Alternatively, the bond material 591 can be present in a minor amount (vol %) based on the total volume of the body of the bonded abrasive 590. Additionally, abrasive particulate material 592 can be present in a majority amount (vol %) based on the total volume of the body of the bonded abrasive 590. Alternatively, the abrasive particulate material 592 can be present in a minor amount (vol %) based on the total volume of the body of the bonded abrasive 590.

Figure 5B:
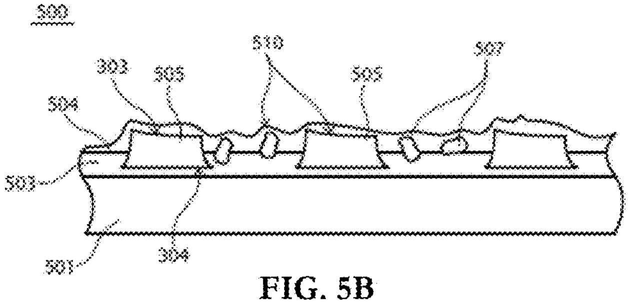
FIG. 5B includes a cross-sectional illustration of a portion of a coated abrasive article according to an embodiment.

FIG. 5B includes a cross-sectional illustration of a coated abrasive article in accordance with an embodiment. In particular, the coated abrasive article 500 can include a substrate 501 (e.g., a backing) and at least one adhesive layer overlying a surface of the substrate 501. The adhesive layer can include a make coat 503 and/or a size coat 504. The coated abrasive article 500 can include abrasive particulate material 510, which can include shaped abrasive particles 505 of any of the embodiments herein and a second type of abrasive particulate material 507 in the form of diluent abrasive particles having a random shape, which may not necessarily be shaped abrasive particles. The shaped abrasive particles 505 of FIG. 5B are illustrated generally for purposes or discussion, and it will be appreciated that the coated abrasive article can include any shaped abrasive particles of the embodiments herein. The make coat 503 can be overlying the surface of the substrate 501 and surrounding at least a portion of the shaped abrasive particles 505 and second type of abrasive particulate material 507. The size coat 504 can be overlying and bonded to the shaped abrasive particles 505 and second type of abrasive particulate material 507 and the make coat 503.

According to one embodiment, the substrate 501 can include an organic material, inorganic material, and a combination thereof. In certain instances, the substrate 501 can include a woven material. However, the substrate 501 may be made of a non-woven material. Particularly suitable substrate materials can include organic materials, including polymers such as polyester, polyurethane, polypropylene, and/or polyimides such as KAPTON from DuPont, and paper. Some suitable inorganic materials can include metals, metal alloys, and particularly, foils of copper, aluminum, steel, and a combination thereof. The backing can include one or more additives selected from the group of catalysts, coupling agents, curants, anti-static agents, suspending agents, anti-loading agents, lubricants, wetting agents, dyes, fillers, viscosity modifiers, dispersants, defoamers, and grinding agents.

A polymer formulation may be used to form any of a variety of layers of the coated abrasive article 500 such as, for example, a frontfill, a pre-size, the make coat, the size coat, and/or a supersize coat. When used to form the frontfill, the polymer formulation generally includes a polymer resin, fibrillated fibers (preferably in the form of pulp), filler material, and other optional additives. Suitable formulations for some frontfill embodiments can include material such as a phenolic resin, wollastonite filler, defoamer, surfactant, a fibrillated fiber, and a balance of water. Suitable polymeric resin materials include curable resins selected from thermally curable resins including phenolic resins, urea/formaldehyde resins, phenolic/latex resins, as well as combinations of such resins. Other suitable polymeric resin materials may also include radiation curable resins, such as those resins curable using electron beam, UV radiation, or visible light, such as epoxy resins, acrylated oligomers of acrylated epoxy resins, polyester resins, acrylated urethanes and polyester acrylates and acrylated monomers including monoacrylated, multiacrylated monomers. The formulation can also comprise a nonreactive thermoplastic resin binder which can enhance the self-sharpening characteristics of the deposited abrasive particles by enhancing the erodability. Examples of such thermoplastic resin include polypropylene glycol, polyethylene glycol, and polyoxypropylene-polyoxyethene block copolymer, etc. Use of a frontfill on the substrate 501 can improve the uniformity of the surface, for suitable application of the make coat 503 and improved application and orientation of shaped abrasive particles 505 in a predetermined orientation.

The make coat 503 can be applied to the surface of the substrate 501 in a single process, or alternatively, the abrasive particulate material 510 can be combined with a make coat 503 material and applied as a mixture to the surface of the substrate 501. Suitable materials of the make coat 503 can include organic materials, particularly polymeric materials, including for example, polyesters, epoxy resins, polyurethanes, polyamides, polyacrylates, polymethacrylates, polyvinyl chlorides, polyethylene, polysiloxane, silicones, cellulose acetates, nitrocellulose, natural rubber, starch, shellac, and mixtures thereof. In one embodiment, the make coat 503 can include a polyester resin. The coated substrate can then be heated in order to cure the resin and the abrasive particulate material to the substrate. In general, the coated substrate 501 can be heated to a temperature of between about 100° C. to less than about 250° C. during this curing process.

The abrasive particulate material 510 can include shaped abrasive particles 505 according to embodiments herein. In particular instances, the abrasive particulate material 510 may include different types of shaped abrasive particles 505. The different types of shaped abrasive particles can differ from each other in composition, in two-dimensional shape, in three-dimensional shape, in size, and a combination thereof as described in the embodiments herein. As illustrated, the coated abrasive 500 can include a shaped abrasive particle 505, which may have any of the shapes of the shaped abrasive particles of the embodiments herein.

The other type of abrasive particles 507 can be diluent particles different than the shaped abrasive particles 505. For example, the diluent particles can differ from the shaped abrasive particles 505 in composition, in two-dimensional shape, in three-dimensional shape, in size, and a combination thereof. For example, the abrasive particles 507 can represent conventional, crushed abrasive grit having random shapes. The abrasive particles 507 may have a median particle size less than the median particle size of the shaped abrasive particles 505.

After sufficiently forming the make coat 503 with the abrasive particulate material 510, the size coat 504 can be formed to overlie and bond the abrasive particulate material 510 in place. The size coat 504 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

According to one embodiment, the shaped abrasive particles 505 can be oriented in a predetermined orientation relative to each other and/or the substrate 501. While not completely understood, it is thought that one or a combination of dimensional features may be responsible for improved orientation of the shaped abrasive particles 505. According to one embodiment, the shaped abrasive particles 505 can be oriented in a flat orientation relative to the substrate 501, such as that shown in FIG. 5B. In the flat orientation, the bottom surface 304 of the shaped abrasive particles can be closest to a surface of the substrate 501 and the upper surface 303 of the shaped abrasive particles 505 can be directed away from the substrate 501 and configured to conduct initial engagement with a workpiece.

Figure 6:
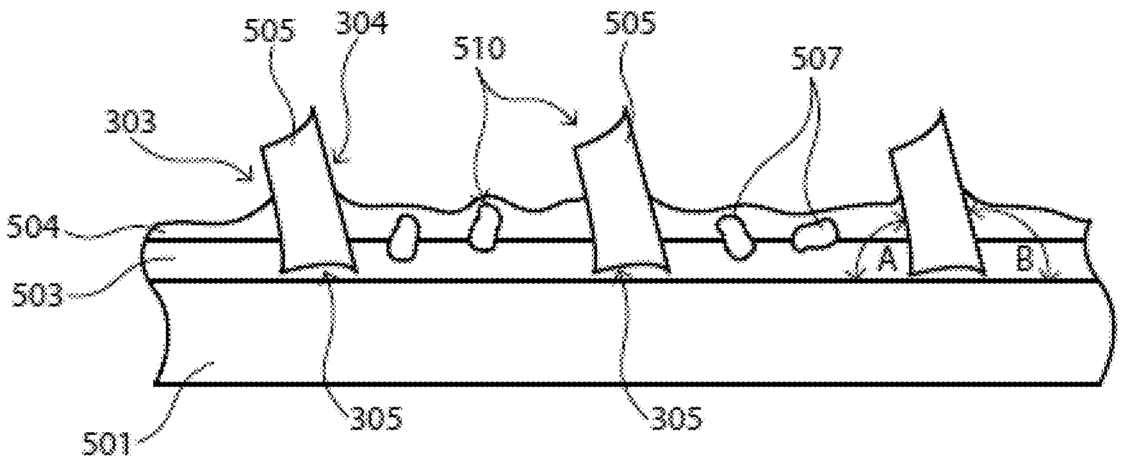
FIG. 6 includes a cross-sectional illustration of a portion of a coated abrasive article according to an embodiment.

According to another embodiment, the shaped abrasive particles 505 can be placed on a substrate 501 in a predetermined side orientation, such as that shown in FIG. 6. In particular instances, a majority of the shaped abrasive particles 505 of the total content of shaped abrasive particles 505 on the abrasive article 500 can have a predetermined side orientation. In the side orientation, the bottom surface 304 of the shaped abrasive particles 505 can be spaced away from and angled relative to the surface of the substrate 501. In particular instances, the bottom surface 304 can form an obtuse angle (B) relative to the surface of the substrate 501. Moreover, the upper surface 303 is spaced away and angled relative to the surface of the substrate 501, which in particular instances, may define a generally acute angle (A). In a side orientation, a side surface 305 can be closest to the surface of the substrate 501, and more particularly, may be in direct contact with a surface of the substrate 501.

For certain other abrasive articles herein, at least about 55% of the plurality of shaped abrasive particles 505 on the abrasive article 500 can be coupled to the backing in a predetermined side orientation. Still, the percentage may be greater, such as at least about 60%, at least about 65%, at least about 70%, at least about 75%, at least about 77%, at least about 80%, at least about 81%, or even at least about 82%. And for one non-limiting embodiment, an abrasive article 500 may be formed using the shaped abrasive particles 505 herein, wherein not greater than about 99% of the total content of shaped abrasive particles have a predetermined side orientation.

To determine the percentage of particles in a predetermined orientation, a 2D microfocus x-ray image of the abrasive article 500 is obtained using a CT scan machine run in the conditions of Table 1 below. The X-ray 2D imaging is conducted on shaped abrasive particles on a backing with Quality Assurance software. A specimen mounting fixture utilizes a plastic frame with a 4"×4" window and an Ø0.5" solid metallic rod, the top part of which is half flattened with two screws to fix the frame. Prior to imaging, a specimen is clipped over one side of the frame where the screw heads face the incidence direction of the X-rays. Then five regions within the 4"×4" window area are selected for imaging at 120 kV/80 μA. Each 2D projection is recorded with the X-ray off-set/gain corrections and at a magnification of 15 times.

TABLE 1

| Voltage (kV) | Current (μA) | Magnification | Field of view per image (mm × mm) | Exposure time |
|---|---|---|---|---|
| 120 | 80 | 15× | 16.2 × 13.0 | 500 ms/2.0 fps |

Figure 11:
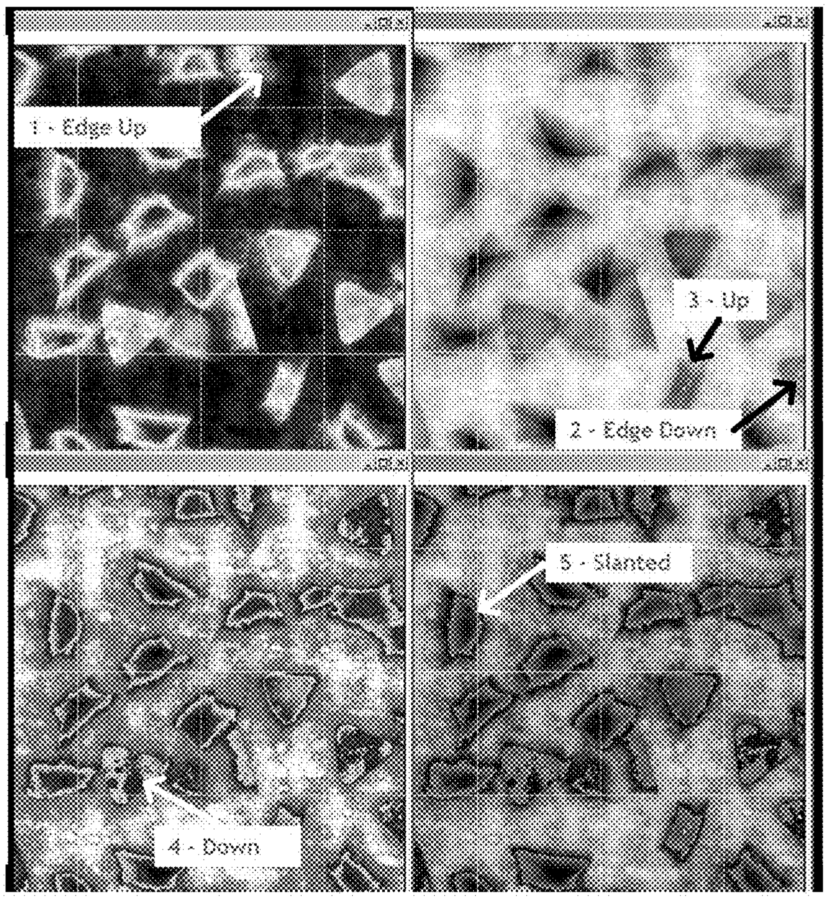
FIG. 11 includes images representative of portions of a coated abrasive according to an embodiment and used to analyze the orientation of shaped abrasive particles on the backing.

The image is then imported and analyzed using the ImageJ program, wherein different orientations are assigned values according to Table 2 below. FIG. 11 includes images representative of portions of a coated abrasive article according to an embodiment, which images can be used to analyze the orientation of shaped abrasive particles on the backing.

TABLE 2

| Cell marker type | Comments |
|---|---|
| 1 | Grains on the perimeter of the image, partially exposed-standing up |
| 2 | Grains on the perimeter of the image, partially exposed-down |
| 3 | Grains on the image, completely exposed-standing vertical |
| 4 | Grains on the image, completely exposed-down |
| 5 | Grains on the image, completely exposed-standing slanted (between standing vertical and down) |

Three calculations are then performed as provided below in Table 3. After conducting the calculations, the percentage of grains in a particular orientation (e.g., side orientation) per square centimeter can be derived.

TABLE 3

| 5) Parameter | Protocol* |
|---|---|
| % grains up | ((0.5 × 1) + 3 + 5)/(1 + 2 + 3 + 4 + 5) |
| Total # of grains per cm$^2$ | (1 + 2 + 3 + 4 + 5) |
| # of grains up per cm$^2$ | (% grains up × Total # of grains per cm$^2$ |

*These are all normalized with respect to the representative area of the image.

+-A scale factor of 0.5 was applied to account for the fact that they are not completely present in the image.

Furthermore, the abrasive articles made with the shaped abrasive particles can utilize various contents of the shaped abrasive particles. For example, the abrasive articles can be coated abrasive articles including a single layer of a plurality of shaped abrasive particles in an open-coat configuration or a closed-coat configuration. For example, the plurality of shaped abrasive particles can define an open-coat abrasive article having a coating density of shaped abrasive particles of not greater than about 70 particles/cm$^2$. In other instances, the open-coat density of shaped abrasive particles per square centimeter of abrasive article may be not greater than about 65 particles/cm$^2$, such as not greater than about 60 particles/cm$^2$, not greater than about 55 particles/cm$^2$, or even not greater than about 50 particles/cm$^2$. Still, in one non-limiting embodiment, the density of the open-coat abrasive article using the shaped abrasive particle herein can be at least about 5 particles/cm$^2$, or even at least about 10 particles/cm$^2$. It will be appreciated that the open-coat density of the coated abrasive article can be within a range between any of the above minimum and maximum values.

In an alternative embodiment, the plurality of shaped abrasive particles can define a closed-coat abrasive article having a coating density of shaped abrasive particles of at least about 75 particles/cm$^2$, such as at least about 80 particles/cm$^2$, at least about 85 particles/cm$^2$, at least about 90 particles/cm$^2$, at least about 100 particles/cm$^2$. Still, in one non-limiting embodiment, the closed-coat density of the coated abrasive article using the shaped abrasive particle herein can be not greater than about 500 particles/cm$^2$. It will be appreciated that the closed coat density of the coated abrasive article can be within a range between any of the above minimum and maximum values.

In certain instances, the abrasive article can have an open-coat density of a coating not greater than about 50% of abrasive particulate material covering the exterior abrasive surface of the article. In other embodiments, the percentage coating of the abrasive particulate material relative to the total area of the abrasive surface can be not greater than about 40%, not greater than about 30%, not greater than about 25%, or even not greater than about 20%. Still, in one non-limiting embodiment, the percentage coating of the abrasive particulate material relative to the total area of the abrasive surface can be at least about 5%, such as at least about 10%, at least about 15%, at least about 20%, at least about 25%, at least about 30%, at least about 35%, or even at least about 40%. It will be appreciated that the percent coverage of shaped abrasive particles for the total area of abrasive surface can be within a range between any of the above minimum and maximum values.

Some abrasive articles may have a particular content of abrasive particles for a length (e.g., ream) of the backing or the substrate 501. For example, in one embodiment, the abrasive article may utilize a normalized weight of shaped abrasive particles of at least about 20 lbs/ream, such as at least about 25 lbs/ ream, or even at least about 30 lbs/ream. Still, in one non-limiting embodiment, the abrasive articles can include a normalized weight of shaped abrasive particles of not greater than about 60 lbs/ream, such as not greater than about 50 lbs/ream, or even not greater than about 45 lbs/ream. It will be appreciated that the abrasive articles of the embodiments herein can utilize a normalized weight of shaped abrasive particles within a range between any of the above minimum and maximum values.

The plurality of shaped abrasive particles on an abrasive article as described herein can define a first portion of a batch of abrasive particles, and the features described in the embodiments herein can represent features that are present in at least a first portion of a batch of shaped abrasive particles. Moreover, according to an embodiment, control of one or more process parameters as already described herein also can control the prevalence of one or more features of the shaped abrasive particles of the embodiments herein. The provision of one or more features of any shaped abrasive particle of a batch may facilitate alternative or improved deployment of the particles in an abrasive article and may further facilitate improved performance or use of the abrasive article. The batch may also include a second portion of abrasive particles. The second portion of abrasive particles can include diluent particles.

In accordance with one aspect of the embodiments herein, a fixed abrasive article can include a blend of abrasive particles. The blend of abrasive particles can include a first type of shaped abrasive particle and a second type of shaped abrasive particle. The first type of shaped abrasive particle can include any features of the shaped abrasive particles of the embodiments herein. The second type of shaped abrasive particle can include any features of the shaped abrasive particles of the embodiments herein. Moreover, it will be appreciated in light of the present disclosure that one or more different types of abrasive particles, including abrasive particles of the embodiments herein and/or conventional abrasive particles may be combined in a fixed abrasive to improve the overall performance of the abrasive article. This may include the use of blends of different types of abrasive particles, wherein the different types of abrasive particles may differ in size, shape, hardness, fracture toughness, strength, tip sharpness, Shape Index, composition, type and/or content of dopants, and a combination thereof.

The blend of abrasive particles can include a first type of shaped abrasive particle present in a first content (C1), which may be expressed as a percentage (e.g., a weight percent) of the first type of shaped abrasive particles as compared to the total content of particles of the blend. Furthermore, the blend of abrasive particles may include a second content (C2) of the second type of shaped abrasive particles, expressed as a percentage (e.g., a weight percent) of the second type of shaped abrasive particles relative to the total weight of the blend. The first content can be the same as or different from the second content. For example, in certain instances, the blend can be formed such that the first content (C1) can be not greater than about 90% of the total content of the blend. In another embodiment, the first content may be less, such as not greater than about 85%, not greater than about 80%, not greater than about 75%, not greater than about 70%, not greater than about 65%, not greater than about 60%, not greater than about 55%, not greater than about 50%, not greater than about 45%, not greater than about 40%, not greater than about 35%, not greater than about 30%, not greater than about 25%, not greater than about 20%, not greater than about 15%, not greater than about 10%, or even not greater than about 5%. Still, in one non-limiting embodiment, the first content of the first type of shaped abrasive particles may be present in at least about 1% of the total content of abrasive particles of the blend. In yet other instances, the first content (C1) may be at least about 5%, such as at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or even at least about 95%. It will be appreciated that the first content (C1) may be present within a range between any of the minimum and maximum percentages noted above.

The blend of abrasive particles may include a particular content of the second type of shaped abrasive particle. For example, the second content (C2) may be not greater than about 98% of the total content of the blend. In other embodiments, the second content may be not greater than about 95%, such as not greater than about 90%, not greater than about 85%, not greater than about 80%, not greater than about 75%, not greater than about 70%, not greater than about 65%, not greater than about 60%, not greater than about 55%, not greater than about 50%, not greater than about 45%, not greater than about 40%, not greater than about 35%, not greater than about 30%, not greater than about 25%, not greater than about 20%, not greater than about 15%, not greater than about 10%, or even not greater than about 5%. Still, in one non-limiting embodiment, the second content (C2) may be present in an amount of at least about 1% of the total content of the blend. For example, the second content may be at least about 5%, such as at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or even at least about 95%. It will be appreciated that the second content (C2) can be within a range between any of the minimum and maximum percentages noted above.

In accordance with another embodiment, the blend of abrasive particles may have a blend ratio (C1/C2) that may define a ratio between the first content (C1) and the second content (C2). For example, in one embodiment, the blend ratio (C1/C2) may be not greater than about 10. In yet another embodiment, the blend ratio (C1/C2) may be not greater than about 8, such as not greater than about 6, not greater than about 5, not greater than about 4, not greater than about 3, not greater than about 2, not greater than about 1.8, not greater than about 1.5, not greater than about 1.2, not greater than about 1, not greater than about 0.9, not greater than about 0.8, not greater than about 0.7, not greater than about 0.6, not greater than about 0.5, not greater than about 0.4, not greater than about 0.3, or even not greater than about 0.2. Still, in another non-limiting embodiment, the blend ratio (C1/C2) may be at least about 0.1, such as at least about 0.15, at least about 0.2, at least about 0.22, at least about 0.25, at least about 0.28, at least about 0.3, at least about 0.32, at least about 0.3, at least about 0.4, at least about 0.45, at least about 0.5, at least about 0.55, at least about 0.6, at least about 0.65, at least about 0.7, at least about 0.75, at least about 0.8, at least about 0.9, at least about 0.95, at least about 1, at least about 1.5, at least about 2, at least about 3, at least about 4, or even at least about 5. It will be appreciated that the blend ratio (C1/C2) may be within a range between any of the minimum and maximum values noted above.

In at least one embodiment, the blend of abrasive particles can include a majority content of shaped abrasive particles. That is, the blend can be formed primarily of shaped abrasive particles, including, but not limited to, a first type of shaped abrasive particle and a second type of shaped abrasive particle. In at least one particular embodiment, the blend of abrasive particles can consist essentially of the first type of shaped abrasive particle and the second type of shaped abrasive particle. However, in other non-limiting embodiments, the blend may include other types of abrasive particles. For example, the blend may include a third type of abrasive particle that may include a conventional abrasive particle or a shaped abrasive particle. The third type of abrasive particle may include a diluent type of abrasive particle having an irregular shape, which may be achieved through conventional crushing and comminution techniques.

According to another embodiment, the blend of abrasive particles can include a plurality of shaped abrasive particles and each of the shaped abrasive particles of the plurality may be arranged in a controlled orientation relative to a backing, such as a substrate of a coated abrasive article. Suitable exemplary controlled orientations can include at least one of a predetermined rotational orientation, a predetermined lateral orientation, and a predetermined longitudinal orientation. In at least one embodiment, the plurality of shaped abrasive particles having a controlled orientation can include at least a portion of the first type of shaped abrasive particles of the blend, at least a portion of the second type of shaped abrasive particles of the blend, and a combination thereof. More particularly, the plurality of shaped abrasive particles having a controlled orientation can include all of the first type of shaped abrasive particles. In still another embodiment, the plurality of shaped abrasive particles arranged in a controlled orientation relative to the backing may include all of the second type of shaped abrasive particles within the blend of abrasive particles.

Figure 7:
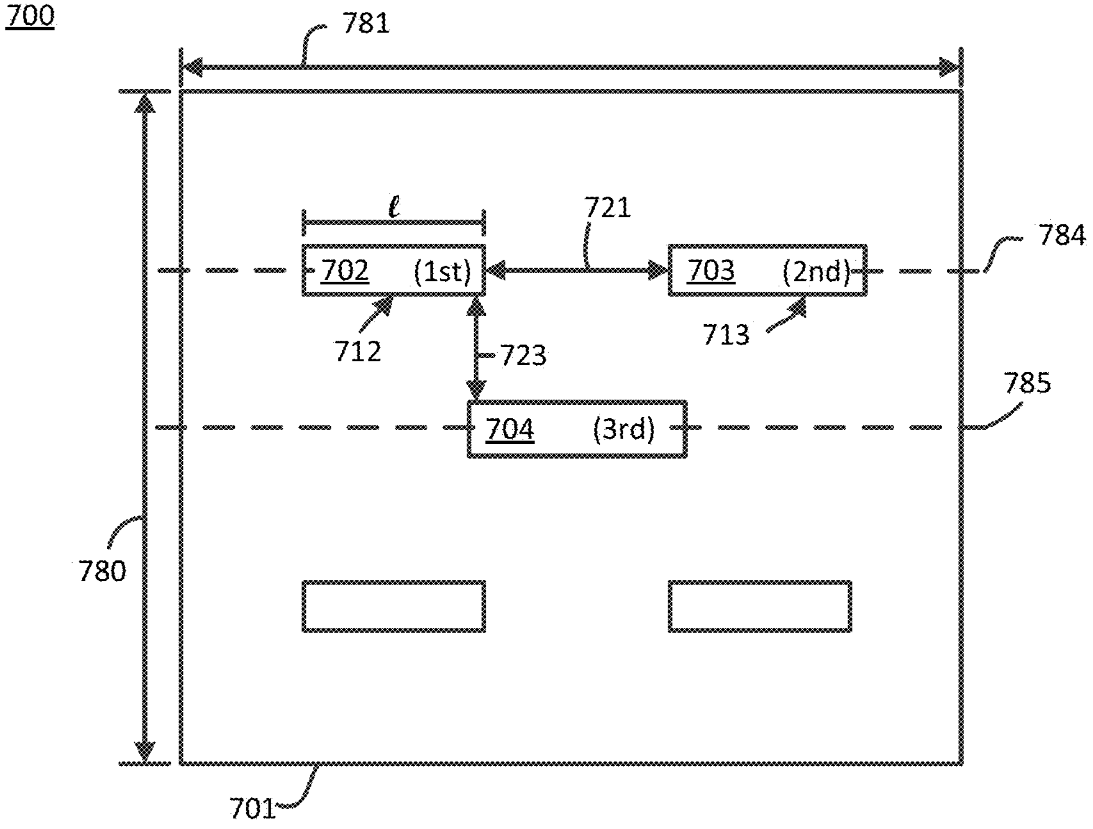
FIG. 7 includes a top-down illustration of a portion of a coated abrasive article according to an embodiment.

FIG. 7 includes a top view illustration of a portion of a coated abrasive article including shaped abrasive particles having controlled orientation. As illustrated, the coated abrasive article 700 includes a backing 701 that can be defined by a longitudinal axis 780 that extends along and defines a length of the backing 701 and a lateral axis 781 that extends along and defines a width of the backing 701. In accordance with an embodiment, a shaped abrasive particle 702 can be located in a first, predetermined position 712 defined by a particular first lateral position relative to the lateral axis of 781 of the backing 701 and a first longitudinal position relative to the longitudinal axis 780 of the backing 701. Furthermore, a shaped abrasive particle 703 may have a second, predetermined position 713 defined by a second lateral position relative to the lateral axis 781 of the backing 701, and a first longitudinal position relative to the longitudinal axis 780 of the backing 701 that is substantially the same as the first longitudinal position of the shaped abrasive particle 702. Notably, the shaped abrasive particles 702 and 703 may be spaced apart from each other by a lateral space 721, defined as a smallest distance between the two adjacent shaped abrasive particles 702 and 703 as measured along a lateral plane 784 parallel to the lateral axis 781 of the backing 701. In accordance with an embodiment, the lateral space 721 can be greater than zero, such that some distance exists between the shaped abrasive particles 702 and 703. However, while not illustrated, it will be appreciated that the lateral space 721 can be zero, allowing for contact and even overlap between portions of adjacent shaped abrasive particles.

As further illustrated, the coated abrasive article 700 can include a shaped abrasive particle 704 located at a third, predetermined position 714 defined by a second longitudinal position relative to the longitudinal axis 780 of the backing 701 and also defined by a third lateral position relative to a lateral plane 785 parallel to the lateral axis 781 of the backing 701 and spaced apart from the lateral axis 784. Further, as illustrated, a longitudinal space 723 may exist between the shaped abrasive particles 702 and 704, which can be defined as a smallest distance between the two adjacent shaped abrasive particles 702 and 704 as measured in a direction parallel to the longitudinal axis 780. In accordance with an embodiment, the longitudinal space 723 can be greater than zero. Still, while not illustrated, it will be appreciated that the longitudinal space 723 can be zero, such that the adjacent shaped abrasive particles are touching, or even overlapping each other.

Figure 8A:
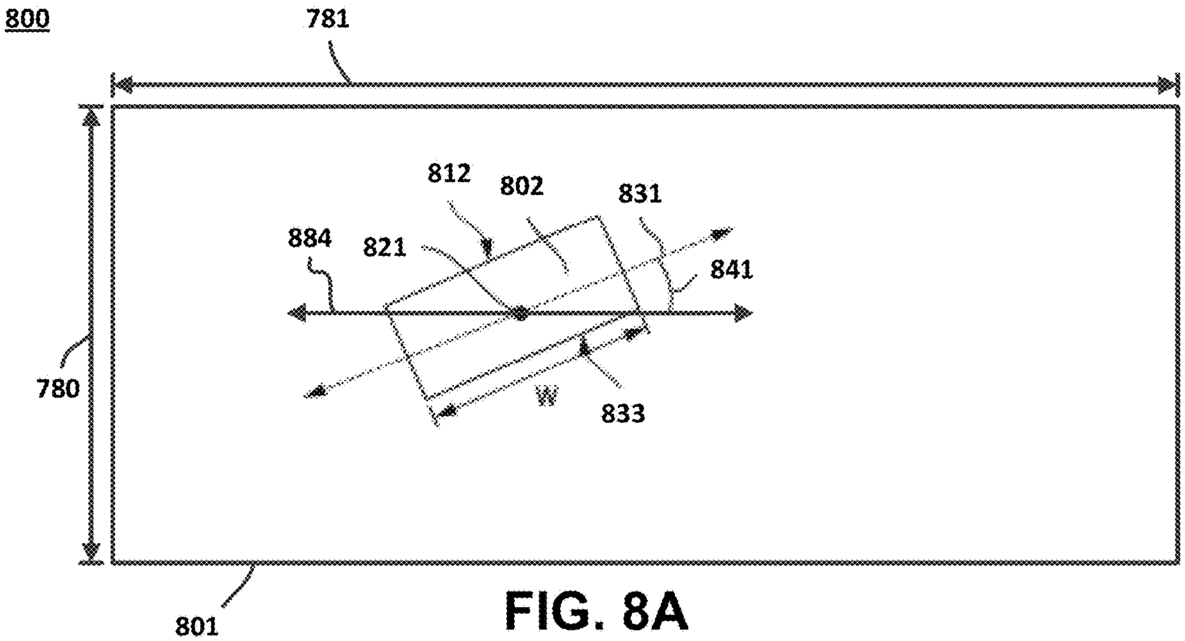
FIG. 8A includes a top-down illustration of a portion of a coated abrasive article according to an embodiment.

FIG. 8A includes a top view illustration of a portion of an abrasive article including shaped abrasive particles in accordance with an embodiment. As illustrated, the abrasive article 800 can include a shaped abrasive particle 802 overlying a backing 801 in a first position having a first rotational orientation relative to a lateral axis 781 defining the width of the backing 801. In particular, the shaped abrasive particle 802 can have a predetermined rotational orientation defined by a first rotational angle between a lateral plane 884 parallel to the lateral axis 781 and a dimension of the shaped abrasive particle 802. Notably, reference herein to a dimension of the shaped abrasive particle 802 can include reference to a bisecting axis 831 of the shaped abrasive particle 802, such bisecting axis 831 extending through a center point 821 of the shaped abrasive particle 802 along a surface (e.g., a side or an edge) connected to (directly or indirectly) the backing 801. Accordingly, in the context of a shaped abrasive particle positioned in a side orientation, (see, e.g., FIG. 6), the bisecting axis 831 can extend through a center point 821 and in the direction of the width (w) of a side 833 closest to the surface of the backing 801.

In certain embodiments, the predetermined rotational orientation of the shaped abrasive particle 802 can be defined by a predetermined rotational angle 841 that defines the smallest angle between the bisecting axis 831 and the lateral plane 884, both of which extend through the center point 821 as viewed from the top down in FIG. 8A. In accordance with an embodiment, the predetermined rotational angle 841, and thus the predetermined rotational orientation, can be 0°. In other embodiments, the predetermined rotational angle defining the predetermined rotational orientation can be greater, such as at least about 2°, at least about 5°, at least about 10°, at least about 15°, at least about 20°, at least about 25°, at least about 30°, at least about 35°, at least about 40°, at least about 45°, at least about 50°, at least about 55°, at least about 60°, at least about 70°, at least about 80°, or even at least about 85°. Still, the predetermined rotational orientation as defined by the rotational angle 841 may be not greater than about 90°, such as not greater than about 85°, not greater than about 80°, not greater than about 75°, not greater than about 70°, not greater than about 65°, not greater than about 60°, such as not greater than about 55°, not greater than about 50°, not greater than about 45°, not greater than about 40°, not greater than about 35°, not greater than about 30°, not greater than about 25°, not greater than about 20°, such as not greater than about 15°, not greater than about 10°, or even not greater than about 5°. It will be appreciated that the predetermined rotational orientation can be within a range between any of the above minimum and maximum angles.

Figure 8B:
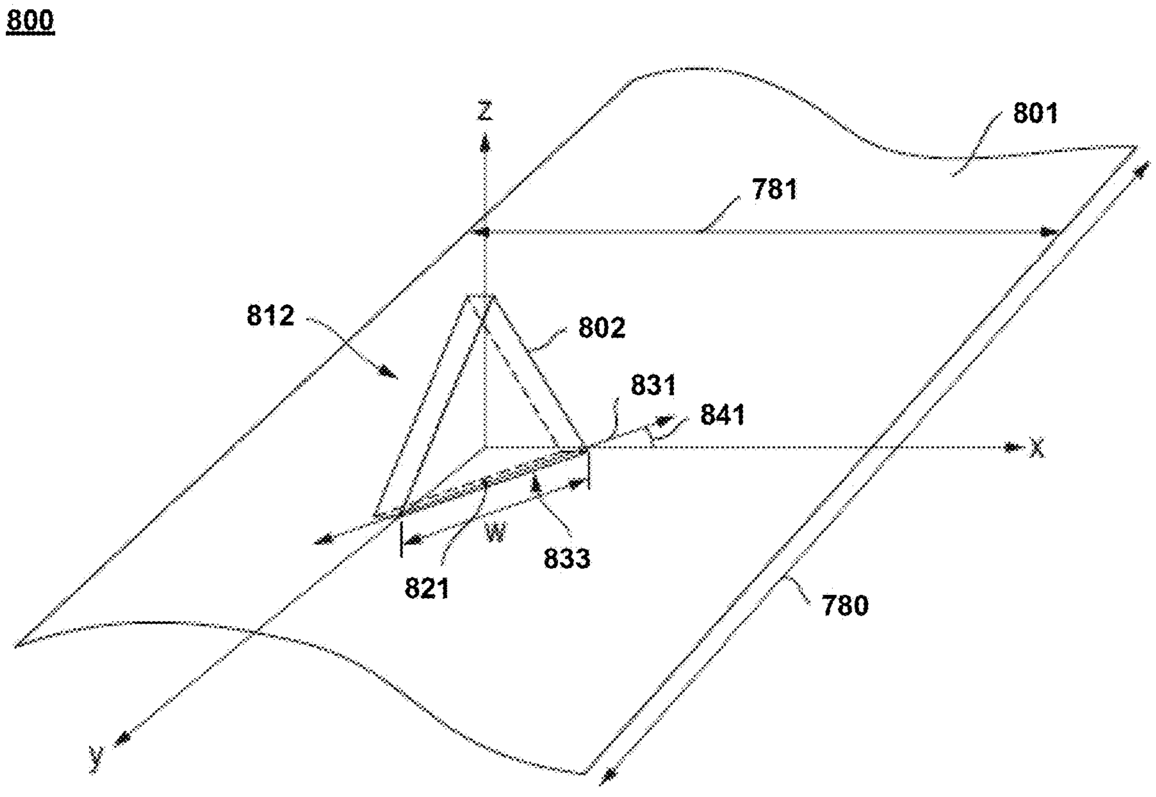
FIG. 8B includes a perspective view illustration of a portion of a coated abrasive article according to an embodiment.

FIG. 8B includes a perspective view illustration of a portion of the abrasive article 800 including the shaped abrasive particle 802 having a triangular two-dimensional shape. The referenced shaped abrasive particle having a triangular two-dimensional shape is merely illustrative, and it will be appreciated that any shaped abrasive particle having any of the shapes of the embodiments herein can be substituted for the triangular shaped abrasive particle of FIG. 8B. As illustrated, the abrasive article 800 can include the shaped abrasive particle 802 overlying the backing 801 in a first position 812 such that the shaped abrasive particle 802 includes a first rotational orientation relative to the lateral axis 781 defining the width of the backing 801. Certain aspects of the predetermined orientation of a shaped abrasive particle may be described by reference to a x, y, z three-dimensional axis as illustrated. For example, the predetermined longitudinal orientation of the shaped abrasive particle 802 may be described by reference to the position of the shaped abrasive particle 802 relative to the y-axis, which extends parallel to the longitudinal axis 780 of the backing 801. Moreover, the predetermined lateral orientation of the shaped abrasive particle 802 may be described by reference to the position of the shaped abrasive particle on the x-axis, which extends parallel to the lateral axis 781 of the backing 801. Furthermore, the predetermined rotational orientation of the shaped abrasive particle 802 may be defined with reference to a bisecting axis 831 that extends through the center point 821 of the side 833 of the shaped abrasive particle 802. Notably, the side 833 of the shaped abrasive particle 802 may be connected either directly or indirectly to the backing 801. In a particular embodiment, the bisecting axis 831 may form an angle with any suitable reference axis including, for example, the x-axis that extends parallel to the lateral axis 781. The predetermined rotational orientation of the shaped abrasive particle 802 may be described as a rotational angle formed between the x-axis and the bisecting axis 831, which rotational angle is depicted in FIG. 8B as angle 841. Notably, the controlled placement of a plurality of shaped abrasive particles on the backing of the abrasive article may facilitate improved performance of the abrasive article.

Figure 9:
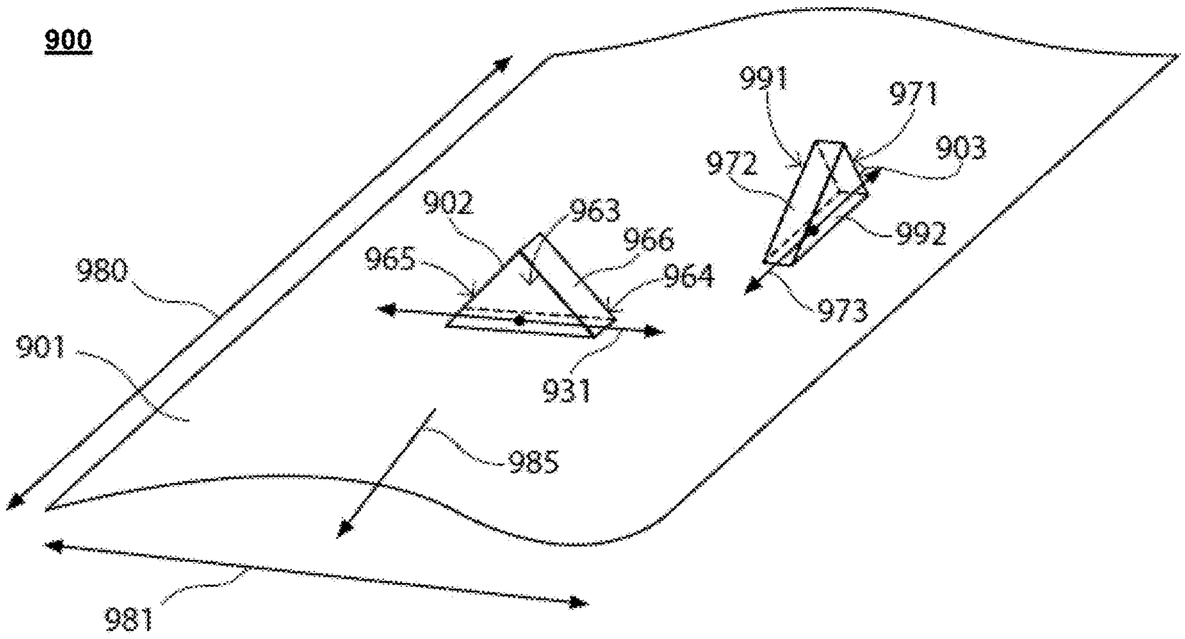
FIG. 9 includes a perspective view illustration of a portion of a coated abrasive article according to an embodiment.

FIG. 9 includes a perspective view illustration of a portion of an abrasive article including shaped abrasive particles having predetermined orientation characteristics relative to a grinding direction in accordance with an embodiment. Notably, as with FIG. 8B, the shaped abrasive particles have a triangular two-dimensional shape, which is done merely for illustration and discussion of certain features of the abrasive article. It will be appreciated that any of shaped abrasive particles of the embodiments herein can be substituted for the shaped abrasive particles illustrated in FIG. 9. In one embodiment, the abrasive article 900 can include a shaped abrasive particle 902 having a predetermined orientation relative to another shaped abrasive particle 903 and/or relative to a grinding direction 985. The grinding direction 985 may be an intended direction of movement of the abrasive article relative to a workpiece in a material removal operation. In particular instances, the grinding direction 985 may be defined relative to the dimensions of the backing 901. For example, in one embodiment, the grinding direction 985 may be substantially perpendicular to the lateral axis 981 of the backing and substantially parallel to the longitudinal axis 980 of the backing 901. The predetermined orientation characteristics of the shaped abrasive particle 902 may define an initial contact surface of the shaped abrasive particle 902 with a workpiece. For example, the shaped abrasive particle 902 can include major surfaces 963 and 964 and side surfaces 965 and 966, each of which can extend between the major surfaces 963 and 964. The predetermined orientation characteristics of the shaped abrasive particle 902 can position the particle 902 such that the major surface 963 is configured to make initial contact with a workpiece before the other surfaces of the shaped abrasive particle 902 during a material removal operation. Such an orientation may be considered a major surface orientation relative to the grinding direction 985. More particularly, the shaped abrasive particle 902 can have a bisecting axis 931 having a particular orientation relative to the grinding direction 985. For example, as illustrated, the vector of the grinding direction 985 and the bisecting axis 931 are substantially perpendicular to each other. It will be appreciated that, just as any range of predetermined rotational orientations relative to the backing are contemplated for a shaped abrasive particle, any range of orientations of the shaped abrasive particles relative to the grinding direction 985 are contemplated and can be utilized.

The shaped abrasive particle 903 can have one or more different predetermined orientation characteristics as compared to the shaped abrasive particle 902 and the grinding direction 985. As illustrated, the shaped abrasive particle 903 can include major surfaces 991 and 992, each of which can be joined by side surfaces 971 and 972. Moreover, as illustrated, the shaped abrasive particle 903 can have a bisecting axis 973 forming a particular angle relative to the vector of the grinding direction 985. As illustrated, the bisecting axis 973 of the shaped abrasive particle 903 can have a substantially parallel orientation with the grinding direction 985 such that the angle between the bisecting axis 973 and the grinding direction 985 is essentially 0 degrees. Accordingly, the predetermined orientation characteristics of the shaped abrasive particle 903 facilitate initial contact of the side surface 972 with a workpiece before any of the other surfaces of the shaped abrasive particle 903. Such an orientation of the shaped abrasive particle 903 may be considered a side surface orientation relative to the grinding direction 985.

Still, in one non-limiting embodiment, it will be appreciated that an abrasive article can include one or more groups of shaped abrasive particles that can be arranged in one or more predetermined distributions relative to the backing, a grinding direction, and/or each other. For example, one or more groups of shaped abrasive particles, as described herein, can have a predetermined orientation relative to a grinding direction. Moreover, the abrasive articles herein can have one or more groups of shaped abrasive particles, each of the groups having a different predetermined orientation relative to a grinding direction. Utilization of groups of shaped abrasive particles having different predetermined orientations relative to a grinding direction may facilitate improved performance of the abrasive article.

Figure 10:
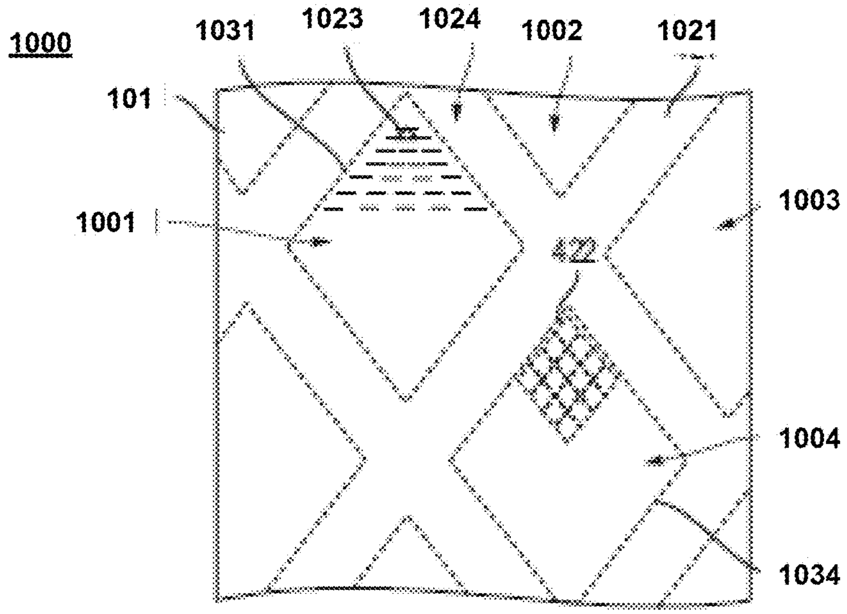
FIG. 10 includes a top view illustration of a portion of an abrasive article in accordance with an embodiment.

FIG. 10 includes a top view illustration of a portion of an abrasive article in accordance with an embodiment. In particular, the abrasive article 1000 can include a first group 1001 including a plurality of shaped abrasive particles. As illustrated, the shaped abrasive particles can be arranged relative to each other one the backing 101 to define a predetermined distribution. More particularly, the predetermined distribution can be in the form of a pattern 1023 as viewed top-down, and more particularly defining a triangular shaped two-dimensional array. As further illustrated, the first group 1001 can be arranged on the abrasive article 1000 defining a predetermined macro-shape 1031 overlying the backing 101. In accordance with an embodiment, the macro-shape 1031 can have a particular two-dimensional shape as viewed top-down. Some exemplary two-dimensional shapes can include polygons, ellipsoids, numerals, Greek alphabet characters, Latin alphabet characters, Russian alphabet characters, Arabic alphabet characters, Kanji characters, complex shapes, irregular shapes, designs, any a combination thereof. In particular instances, the formation of a group having a particular macro-shape may facilitate improved performance of the abrasive article.

As further illustrated, the abrasive article 1000 can include a group 1004 including a plurality of shaped abrasive particles which can be arranged on the surface of the backing 101 relative to each other to define a predetermined distribution. Notably, the predetermined distribution can include an arrangement of the plurality of the shaped abrasive particles that define a pattern 422, and more particularly, a generally quadrilateral pattern. As illustrated, the group 1004 can define a macro-shape 1034 on the surface of the abrasive article 1000. In one embodiment, the macro-shape 1034 of the group 1004 can have a two-dimensional shape as viewed top down, including for example a polygonal shape, and more particularly, a generally quadrilateral (diamond) shape as viewed top down on the surface of the abrasive article 1000. In the illustrated embodiment of FIG. 10, the group 1001 can have a macro-shape 1031 that is substantially the same as the macro-shape 1034 of the group 1004. However, it will be appreciated that in other embodiments, various different groups can be used on the surface of the abrasive article, and more particularly wherein each of the different groups has a different macro-shape relative to each other.

As further illustrated, the abrasive article can include groups 1001, 1002, 1003, and 1004 which can be separated by channel regions 1021 and 1024 extending between the groups 1001-1004. In particular instances, the channel regions 1021 and 1024 can be substantially free of shaped abrasive particles. Moreover, the channel regions 1021 and 1024 may be configured to move liquid between the groups 1001-1004 and further improve swarf removal and grinding performance of the abrasive article. Furthermore, in a certain embodiment, the abrasive article 1000 can include channel regions 1021 and 1024 extending between groups 1001-1004, wherein the channel regions 1021 and 1024 can be patterned on the surface of the abrasive article 1000. In particular instances, the channel regions 1021 and 1024 can represent a regular and repeating array of features extending along a surface of the abrasive article.

The fixed abrasive articles of the embodiments herein can be utilized in various material removal operations. For example, fixed abrasive articles herein can be used in methods of removing material from a workpiece by moving the fixed abrasive article relative to the workpiece. The relative movement between the fixed abrasive and the workpiece can facilitate removal of the material from the surface of the workpiece. Various workpieces can be modified using the fixed abrasive articles of the embodiments herein, including but not limited to, workpieces comprising inorganic materials, organic materials, and a combination thereof. In a particular embodiment, the workpiece may include a metal, such as a metal alloy. In one particular instance, the workpiece can consist essentially of a metal or metal alloy, such as stainless steel.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Reference to any of the features of the abrasive particles herein will be understood to be reference to a feature that is present in at least one grain. In certain instances, one or more of the features of the embodiments are present in a significant portion of a randomly selected and statistically relevant sample of abrasive particles of a batch or a randomly selected and statistically relevant sample abrasive particles part of a fixed abrasive article. For example, one or more of the features of the embodiments are present in at least a majority of the particles from a randomly selected and statistically relevant sample. In other instances, the prevelance of such features can be greater, representing at least 60% or at least 70% or at least 80% or at least 90% or essentially all of the particles from a randomly selected and statistically relevant sample.

Certain features, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Items

Item 1. A shaped abrasive particle comprising a body having a first major surface, a second major surface, and a side surface joined to the first major surface and the second major surface, and wherein the body comprises at least one partial cut extending from the side surface into the interior of the body.

Item 2. The shaped abrasive particle of item 1, wherein the partial cut comprises a two-dimensional shape selected from the group consisting of a polygon, an irregular polygon, ellipsoidal, irregular, cross-shaped, star-shaped, and a combination thereof, wherein the partial cut comprises a two-dimensional shape selected from the group consisting of a triangle, a quadrilateral, a trapezoid, a pentagon, a hexagon, a heptagon, an octagon, and a combination thereof.

Item 3. The shaped abrasive particle of item 1, wherein the body comprises at least one partial cut having a length (Lpc) and width (Wpc) and wherein the length of the partial cut (Lpc) is different than the width of the partial cut (Wpc), or wherein the length of is greater than the width.

Item 4. The shaped abrasive particle of item 1, wherein the partial cut extends entirely though the height of the body but only a fraction of an entire width and/or length of the body.

Item 5. The shaped abrasive particle of item 1, wherein the partial cut comprises a length (Lpc) defining a longitudinal axis extending substantially perpendicular to the side surface.

Item 6. A shaped abrasive particle comprising a body having a first surface, a second surface, and a side surface joined to the first surface and the second surface, wherein the body comprises at least one partial cut having a length (Lpc) and width (Wpc) and wherein the body comprises a strength, and wherein the combination of the length of the partial cut (Lpc), width of the partial cut (Wpc) and strength of the body have a relationship configured to control the friability of the body.

Item 7. The shaped abrasive particle of item 6, wherein the partial cut comprises a two-dimensional shape selected from the group consisting of a polygon, an irregular polygon, ellipsoidal, irregular, cross-shaped, star-shaped, and a combination thereof, wherein the partial cut comprises a two-dimensional shape selected from the group consisting of a triangle, a quadrilateral, a trapezoid, a pentagon, a hexagon, a heptagon, an octagon, and a combination thereof.

Item 8. The shaped abrasive particle of item 6, wherein the body comprises at least one partial cut having a length (Lpc) and width (Wpc) and wherein the length of the partial cut (Lpc) is different than the width of the partial cut (Wpc), or wherein the length of is greater than the width.

Item 9. The shaped abrasive particle of item 6, wherein the partial cut extends entirely though the height of the body but only a fraction of an entire width and/or length of the body.

Item 10. The shaped abrasive particle of item 6, wherein the partial cut comprises a length (Lpc) defining a longitudinal axis extending substantially perpendicular to the side surface.

Item 11. A shaped abrasive particle comprising a body having a first major surface, a second major surface, and a side surface joined to the first major surface and the second major surface, and wherein at least one edge defined by the joining of the side surface with the first major surface comprises a depression having a curved contour.

Item 12. The shaped abrasive particle of item 11, wherein the depression comprises two edges having curved contours joined together at a first corner and second corner.

Item 13. The shaped abrasive particle of item 12, wherein the first and second corners are substantially intersecting an edge between the side surface and the first major surface.

Item 14. The shaped abrasive particle of item 12, wherein the two edges have rounded cross-sectional contours.

Item 15. The shaped abrasive particle of item 12, wherein the depression comprises a length defining a longitudinal axis, and wherein the longitudinal axis of the depression is substantially parallel with the at least one edge.

Item 16. The shaped abrasive particle of item 12, wherein the depression defines a concave contour in the at least one edge.

Item 17. A shaped abrasive particle comprising a body having a first major surface, a second major surface, and a side surface joined to the first major surface and the second major surface, and wherein the body comprises a first exterior corner, a second exterior corner, and a third exterior corner, and wherein at least one of the first exterior corner, the second exterior corner, and the third exterior corner comprises a discrete stepped depression.

Item 18. The shaped abrasive particle of item 17, wherein the at least one discrete stepped depression comprises a first depression having a first depth (D1), a second depression surrounding the first depression and having a second depth (D2), and wherein D1 and D2 are different compared to each other.

Item 19. The shaped abrasive particle of item 18, wherein D1 is greater than D2.

Item 20. The shaped abrasive particle of item 18, wherein the first exterior corner comprises a first discrete stepped depression having the first depression and second depression, and wherein the first depression encompasses the first exterior corner.

Item 21. The shaped abrasive particle of item 18, wherein the first depression comprises a curved two-dimensional contour.

Item 22. The shaped abrasive particle of item 18, wherein the first depression comprises a rounded corner as viewed in cross-section.

Item 23. The shaped abrasive particle of item 18, wherein the second depression comprises a curved two-dimensional contour.

Item 24. The shaped abrasive particle of item 18, wherein the second depression comprises a rounded corner as viewed in cross-section.

Item 25. The shaped abrasive particle of item 18, wherein the first depression is encompassed entirely by the second depression.

Item 26. A shaped abrasive particle comprising a body having a first major surface, a second major surface, and a side surface joined to the first major surface and the second major, and wherein the body comprises a first exterior corner, second exterior corner, and third exterior corner, and wherein the body comprises at least one discrete stepped depression extending between the first, second, and third exterior corners and further spaced apart from the first, second, and third exterior corners.

Item 27. The shaped abrasive particle of item 26, wherein the body is a hybrid polygonal shape.

Item 28. The shaped abrasive particle of item 26, wherein at least a portion of the side surface comprises an arcuate contour.

Item 29. The shaped abrasive particle of item 26, wherein at least one discrete stepped depression comprises a first depression having a first depth (D1) and a second depression surrounding the first depression having a second depth (D2), and wherein D1 and D2 are different compared to each other.

Item 30. The shaped abrasive particle of item 29, wherein D1 is greater than D2.

Item 31. The shaped abrasive particle of item 29, wherein the first depression comprises a curved two-dimensional contour.

Item 32. The shaped abrasive particle of item 29, wherein the first depression comprises a rounded corner as viewed in cross-section.

Item 33. The shaped abrasive particle of item 29, wherein the second depression comprises a curved two-dimensional contour.

Item 34. The shaped abrasive particle of item 29, wherein the second depression comprises a rounded corner as viewed in cross-section.

Item 35. The shaped abrasive particle of item 29, wherein the first depression is encompassed entirely by the second depression.

Item 36. A shaped abrasive particle comprising a body having a first major surface, a second major surface, and a side surface joined to the first major surface and the second major surface, wherein the side surface comprises a first region extending for a majority of the height of the body and a second region comprising a flange extending outward from the side surface of the body and wherein the second region comprises a maximum height extending for a minority of the height of the body.

Item 37. The shaped abrasive particle of item 36, wherein the flange has a length greater than a maximum height.

Item 38. The shaped abrasive particle of item 36, wherein the flange has a substantially rectangular cross-sectional contour.

Item 39. The shaped abrasive particle of item 36, wherein the flange is joined to the side surface and the second major surface of the body.

Item 40. A shaped abrasive particle comprising a body having a first major surface, a second major surface, and a side surface joined to the first major surface and the second major surface, and further comprising a protrusion extending for a distance above the first major surface, wherein the protrusion has a base and an upper region and wherein the base comprises a different thickness compared to a thickness of the upper portion.

Item 41. A shaped abrasive particle comprising a body having a first major surface, a second major surface, and a side surface joined to the first major surface and the second major surface, wherein the side surface comprises a depression extending peripherally around the body at a central region of the body and wherein the body comprises at least one exterior corner with an average tip sharpness of not greater than 250 microns.

Item 42. The shaped abrasive particle of item 41, wherein the tip sharpness is within a range of at least 1 micron and not greater than 200 microns.

Item 43. The shaped abrasive particle of item 41, wherein the body comprises an hourglass cross-sectional shape.

Item 44. The shaped abrasive particle of item 41, wherein the depression is positioned between two convex portions extending from the first and second opposite major surfaces.

Item 45. The shaped abrasive particle of any one of items 1, 6, 11, 17, 26, 36, 40, and 41, wherein the body comprises a Shape Index of at least about 0.01 and not greater than about 0.99.

Item 46. The shaped abrasive particle of any one of items 1, 6, 11, 17, 26, 36, 40, and 41, wherein the body comprises a strength of at least about 100 MPa and not greater than 1500 MPa.

Item 47. The shaped abrasive particle of any one of items 1, 6, 11, 17, 26, 36, 40, and 41, wherein the body comprises a tip sharpness of at least about 1 micron and not greater than about 80 microns.

Item 48. The shaped abrasive particle of any one of items 1, 6, 11, 17, 26, 36, 40, and 41, wherein the body comprises an additive comprising dopant material selected from the group consisting of an alkali element, an alkaline earth element, a rare earth element, a transition metal element, and a combination thereof.

Item 49. The shaped abrasive particle of any one of items 1, 6, 11, 17, 26, 36, 40, and 41, wherein the body comprises a polycrystalline material including crystalline grains, wherein the average grain size is not greater than about 10 microns.

Item 50. The shaped abrasive particle of any one of items 1, 6, 11, 17, 26, 36, 40, and 41, wherein the body comprises a two-dimensional shape selected from the group consisting of quadrilateral, rectangular, trapezoidal, pentagonal, hexagonal, heptagonal, octagonal, regular polygons, irregular polygons, ellipsoids, numerals, Greek alphabet characters, Latin alphabet characters, Russian alphabet characters, complex shapes having a combination of polygonal shapes, a shape with linear and curved portions, and a combination thereof.

Item 51. The shaped abrasive particle of any one of items 1, 6, 11, 17, 26, 36, 40, and 41, wherein the body is coupled to a substrate as part of a fixed abrasive selected from the group consisting of a bonded abrasive article, a coated abrasive article, and a combination thereof.

Item 52. The shaped abrasive particle of any one of items 1, 6, 11, 17, 26, 36, 40, and 41, wherein the body comprises a material selected from the group consisting of oxides, carbides, nitrides, borides, oxycarbides, oxynitrides, oxyborides, natural minerals, synthetic materials, carbon-based materials, and a combination thereof.

Item 53. The shaped abrasive particle of any one of items 1, 6, 11, 17, 26, 36, 40, and 41, wherein the body comprises alpha alumina.

Item 54. The shaped abrasive particle of any one of items 1, 6, 11, 17, 26, 36, 40, and 41, wherein the body consists essentially of alpha alumina.

Item 55. The shaped abrasive particle of any one of items 1, 6, 11, 17, 26, 36, 40, and 41, wherein the body of the shaped abrasive particle comprises a length≥width≥height.

Item 56. The shaped abrasive particle of any one of items 1, 6, 11, 17, 26, 36, 40, and 41, wherein at least one side surface of the body has a partially-concave shape.

Item 57. The shaped abrasive particle of any one of items 1, 6, 11, 17, 26, 36, 40, and 41, wherein the body can have an average draft angle of not greater than 95° and at least 80°.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A shaped abrasive particle comprising a body comprising a length defined by a longitudinal axis, a width defined by a lateral axis, a height defined by a vertical axis, a first major surface, a second major surface, and a side surface joined to the first major surface and the second major surface, wherein the body has a tertiary aspect ratio of width:height of at least 2:1, wherein the body comprises at least one partial cut extending from the side surface into the interior of the body, wherein the at least one partial cut includes a midpoint of the body, and wherein the at least one partial cut extends through the entire height of the body and extends only for a fraction of the entire length of the body, wherein the at least one partial cut comprises a rectangular two-dimensional shape as viewed from the top-down and is defined by a first side surface, a second side surface and a third side surface, wherein the body is essentially free of a binder, wherein the shaped abrasive particle comprises at least 90 wt % alpha alumina for a total weight of the particle, and wherein the body defines a polygonal shape wherein a sum of three external corners of the polygonal shape defining three external corner angle values is substantially 180 degrees.

2. The shaped abrasive particle of claim 1, wherein the at least one partial cut having a length (Lpc) and width (Wpc) and wherein the length of the partial cut (Lpc) is different than the width of the partial cut (Wpc), or wherein the length is greater than the width.

3. The shaped abrasive particle of claim 1, wherein the at least one partial cut extends through only a fraction of an entire width of the body.

4. The shaped abrasive particle of claim 1, wherein the at least one partial cut comprises a length (Lpc) defining a longitudinal axis extending substantially perpendicular to the side surface.

5. The shaped abrasive particle of claim 1, wherein the at least one partial cut comprises a length (Lpc) and width (Wpc) and wherein the body comprises a strength, and wherein a combination of the length of the partial cut (Lpc), width of the partial cut (Wpc) and strength of the body have a relationship configured to control the friability of the body.

6. The shaped abrasive particle of claim 1, wherein the body comprises a plurality of partial cuts.

7. The shaped abrasive particle of claim 6, wherein at least two partial cuts of the plurality of partial cuts are different from each other in size, shape, and/or contour.

8. The shaped abrasive particle of claim 1, wherein the at least one partial cut is located at a midpoint of the side surface of the body.

9. The shaped abrasive particle of claim 1, wherein the at least one partial cut comprises a corner with an interior angle of less than 180 degrees.

10. The shaped abrasive particle of claim 1, wherein the at least one partial cut comprises a corner with an interior angle of less than 100 degrees.

11. The shaped abrasive particle of claim 1, wherein the shaped abrasive particle consists essentially of alpha alumina.

12. The shaped abrasive particle of claim 1, wherein the shaped abrasive particle comprises a material selected from the group consisting of oxides, carbides, nitrides, borides, oxycarbides, oxynitrides, oxyborides, natural minerals, synthetic materials, carbon-based materials, and a combination thereof.

* * * * *